United States Patent
Takizawa et al.

(10) Patent No.: US 6,934,959 B2
(45) Date of Patent: Aug. 23, 2005

(54) DISK RECORDING AND/OR REPRODUCING DEVICE

(75) Inventors: Kazuyuki Takizawa, Chiba (JP); Tomohiro Watanabe, Kanagawa (JP); Toru Hama, Kanagawa (JP)

(73) Assignee: Sony Corporation, Tokyo (JP)

( * ) Notice: Subject to any disclaimer, the term of this patent is extended or adjusted under 35 U.S.C. 154(b) by 400 days.

(21) Appl. No.: 10/203,540

(22) PCT Filed: Nov. 26, 2001

(86) PCT No.: PCT/JP01/10262
§ 371 (c)(1),
(2), (4) Date: Aug. 9, 2002

(87) PCT Pub. No.: WO02/49033
PCT Pub. Date: Jun. 20, 2002

(65) Prior Publication Data
US 2003/0026192 A1 Feb. 6, 2003

(30) Foreign Application Priority Data
Dec. 11, 2000 (JP) .................................. 2000-375973
Nov. 1, 2001 (JP) .................................. 2001-336230

(51) Int. Cl.⁷ ............................................. G11B 33/08
(52) U.S. Cl. .................................. 720/651; 720/657
(58) Field of Search ................... 369/30.77, 30.84, 369/30.85, 178.01; 720/619, 657, 651

(56) References Cited
U.S. PATENT DOCUMENTS 5,046,059 A * 9/1991 Yoshida et al. .......... 369/30.89
5,636,198 A * 6/1997 Maeng ..................... 369/30.98
5,970,042 A * 10/1999 Fujimoto et al. ......... 369/30.78
6,081,494 A * 6/2000 Morimoto et al. .......... 720/632
6,445,672 B1 * 9/2002 Suzuki et al. .......... 369/178.01

FOREIGN PATENT DOCUMENTS

| JP | 61296560 A | * | 12/1986 | ........... G11B/17/04 |
| JP | 04362563 A | * | 12/1992 | ........... G11B/17/04 |
| JP | 10083611 A | * | 3/1998 | ........... G11B/17/26 |
| JP | 11066679 A | * | 3/1999 | ........... G11B/17/04 |
| WO | WO 9910890 A2 | * | 3/1999 | ........... G11B/33/08 |

* cited by examiner

Primary Examiner—William J Klimowicz
(74) Attorney, Agent, or Firm—Jay H. Maioli

(57) ABSTRACT

A disk recording and/or reproducing apparatus includes a mechanical deck having a disk receiver with a disk carrying unit for carrying a disk, a disk recording and/or reproducing section for recording and/or reproducing the disk received in the disk receiver, and an outer case housing the mechanical deck. A relaxation mechanism and a lock mechanism are disposed between the mechanical deck and the outer case. The relaxation mechanism prevents vibration from being transmitted mutually between the mechanical deck and the outer case. The lock mechanism locks the mechanical deck to the outer case in such a manner as to oppose a relaxing operation of the relaxation mechanism. Thereby, operational vibration, noise and the like caused to the mechanical deck during recordation and/or reproduction can be prevented from being transmitted to the outer case's side.

3 Claims, 47 Drawing Sheets

Fig. 8
(a)
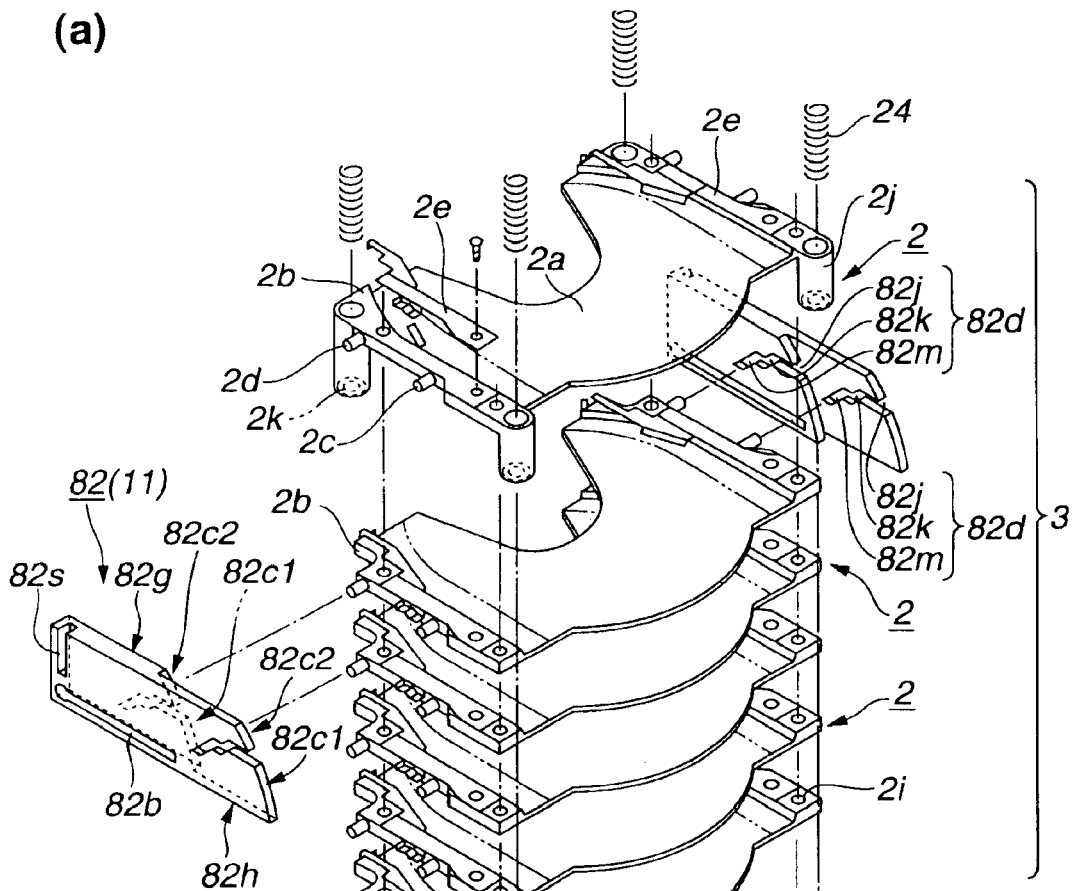
(b)
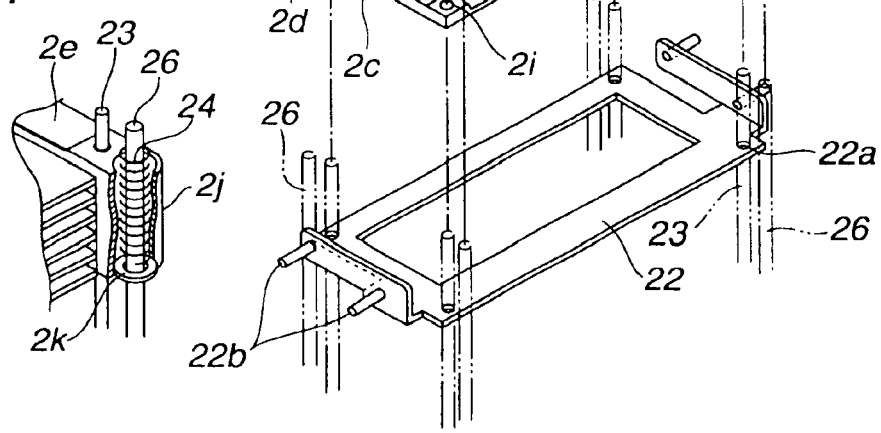

Fig. 9
(a)
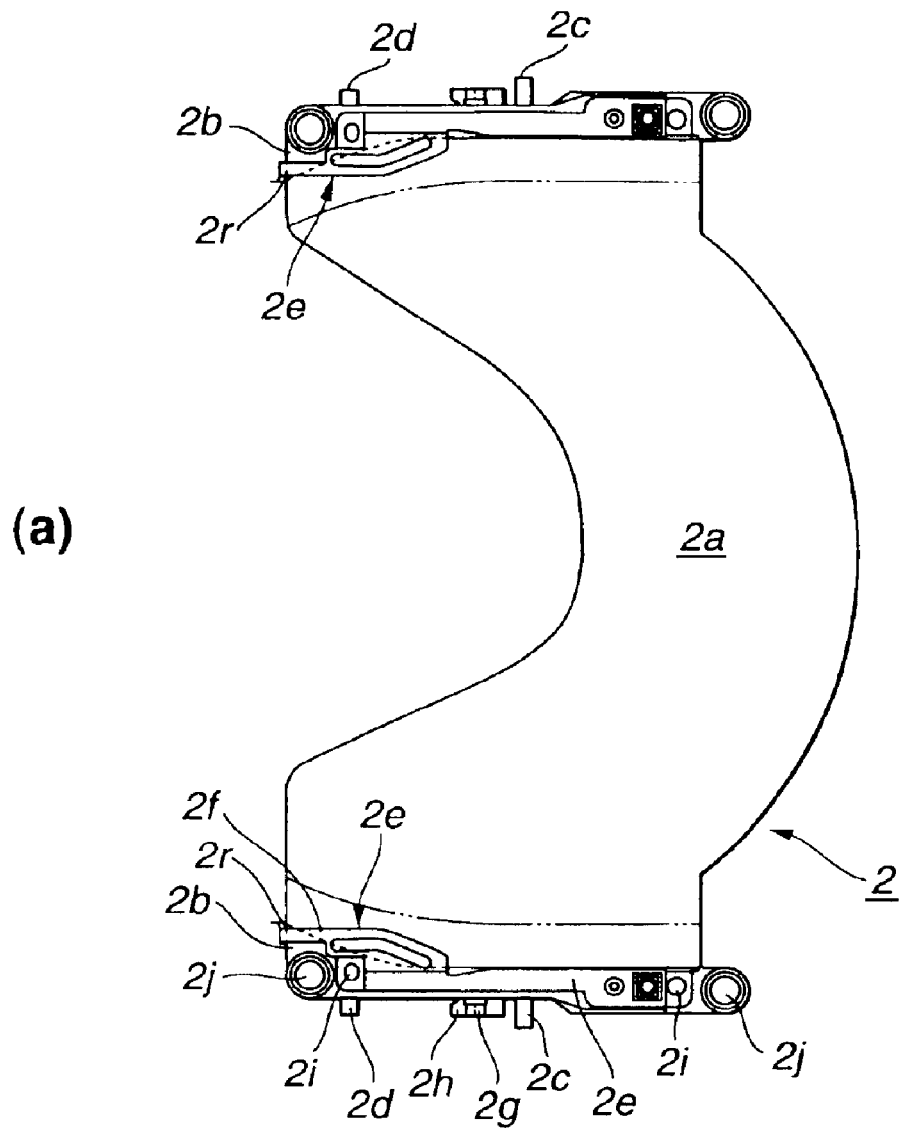
(b)
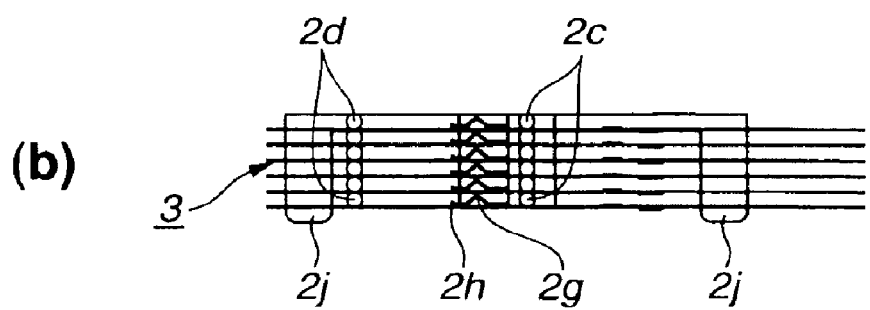

Fig. 14
(a)
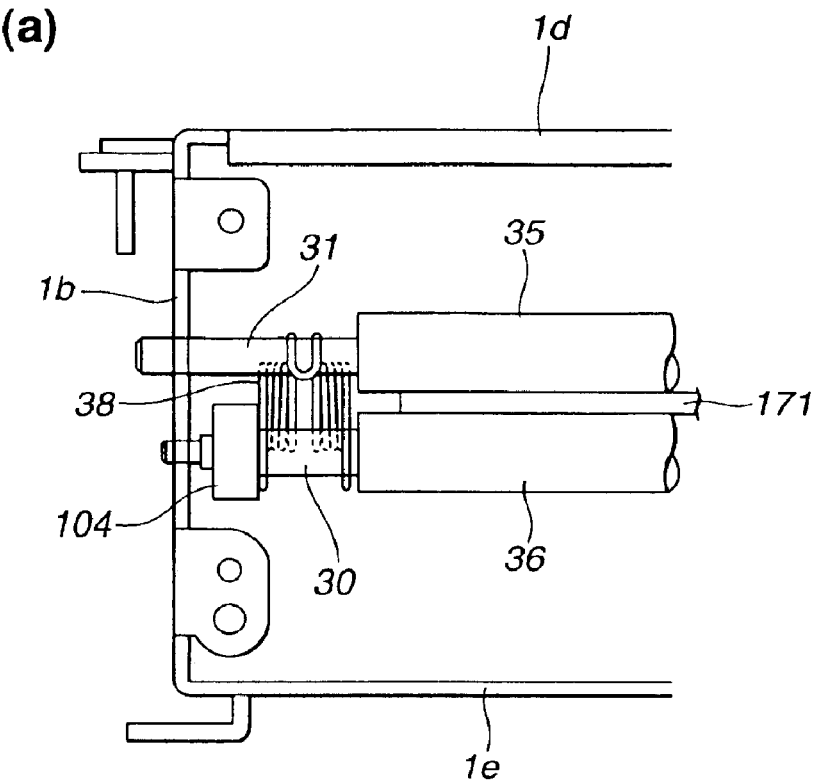
(b)
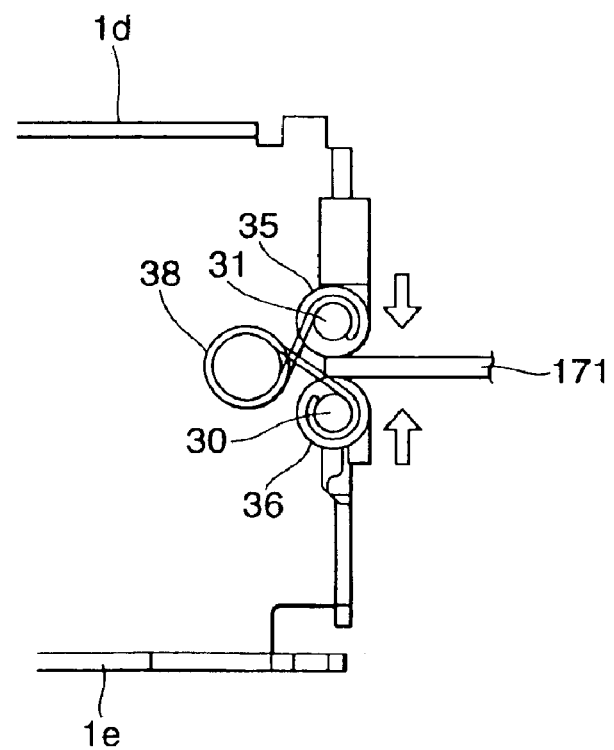

Fig. 16
(a)
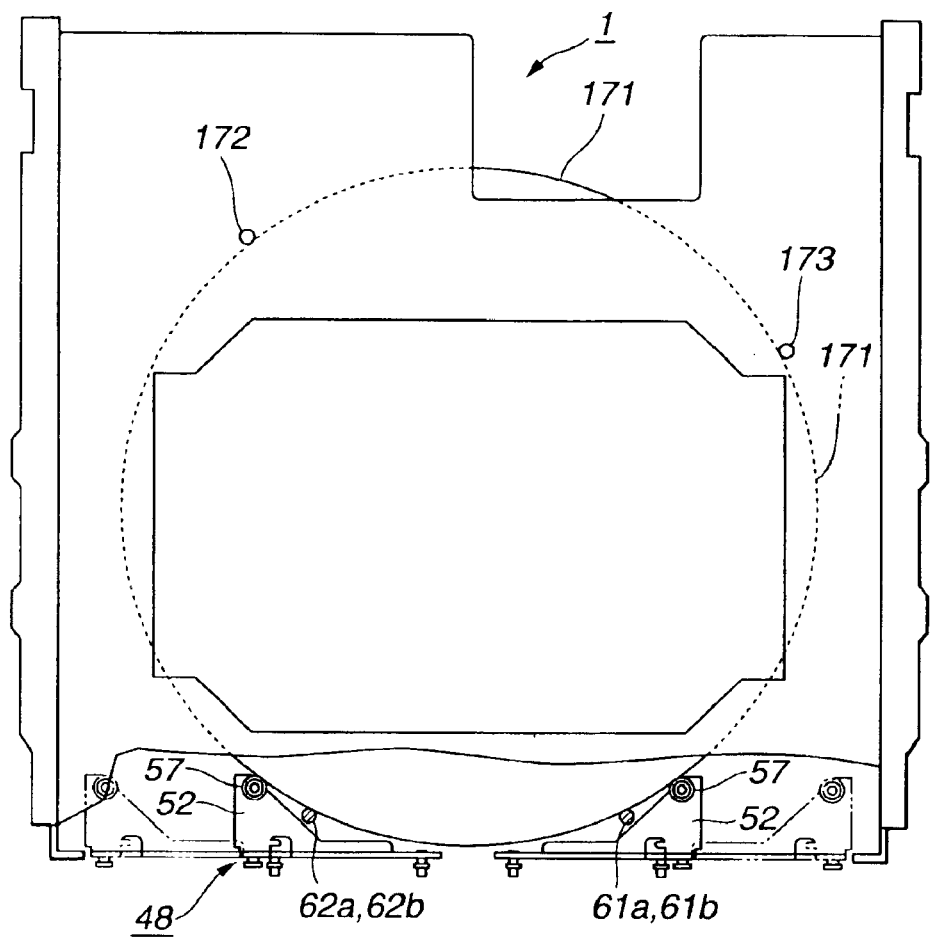
(b)
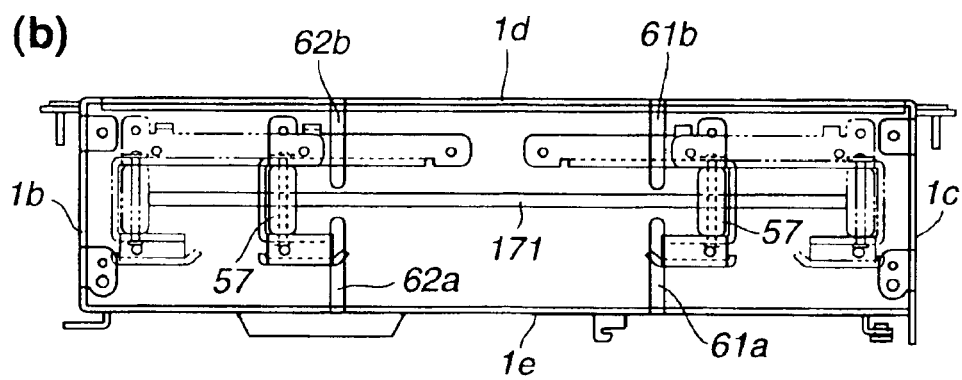

Fig. 22
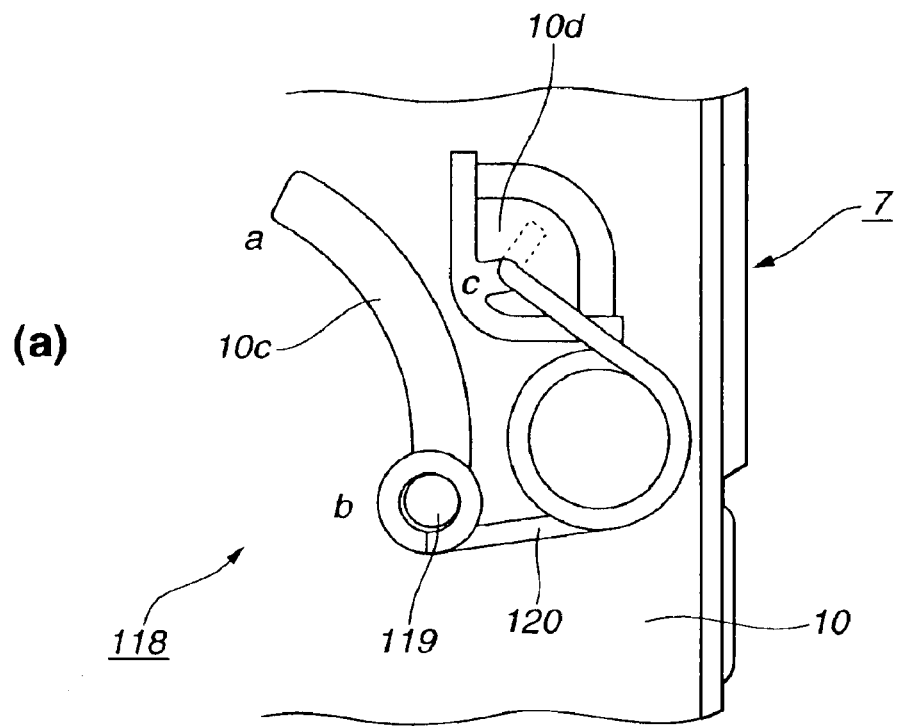
(a)
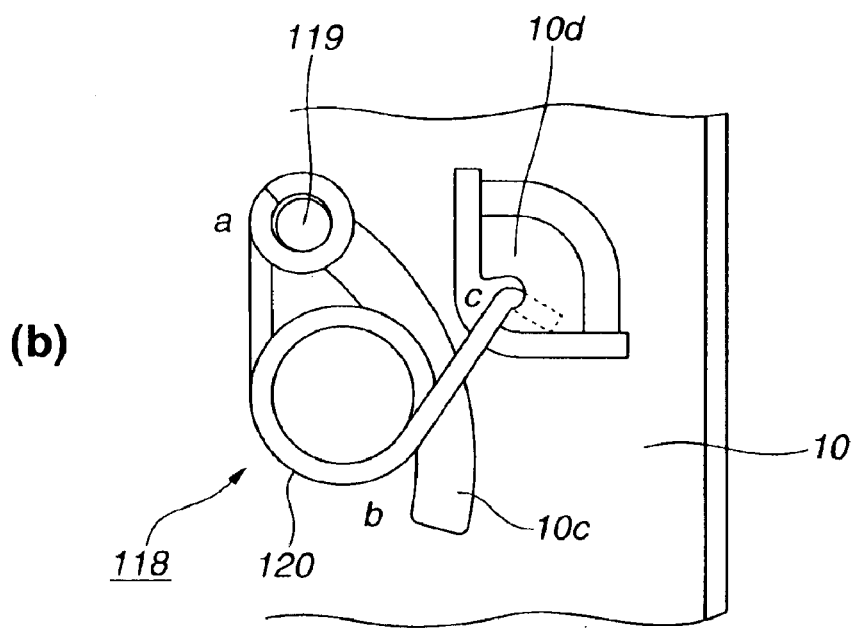
(b)

Fig. 25
(a)
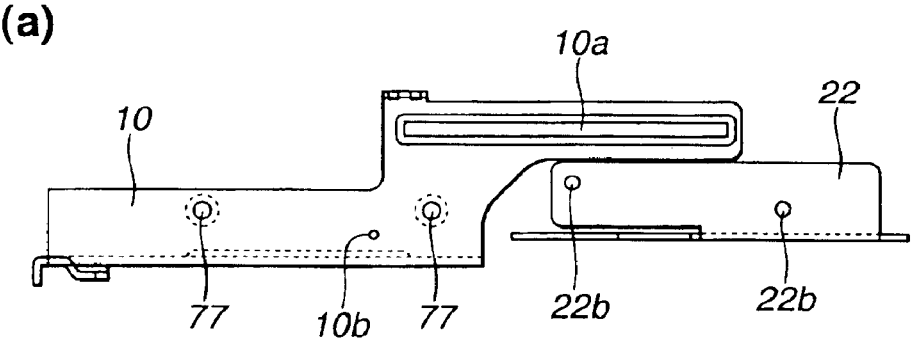
(b)
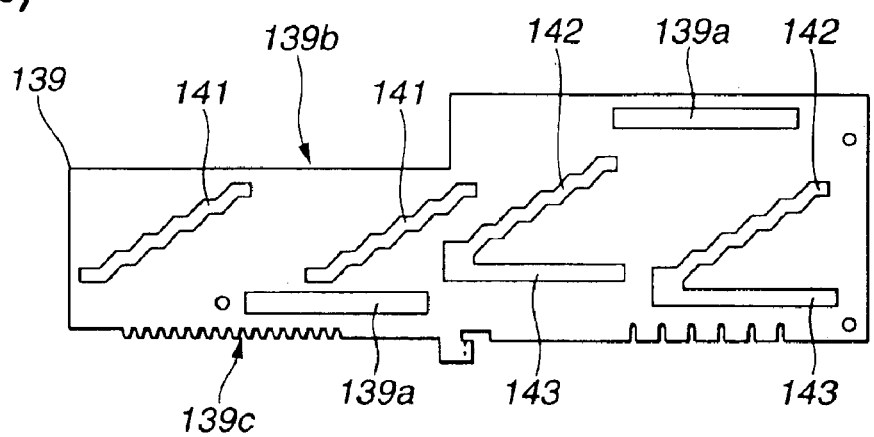
(c)
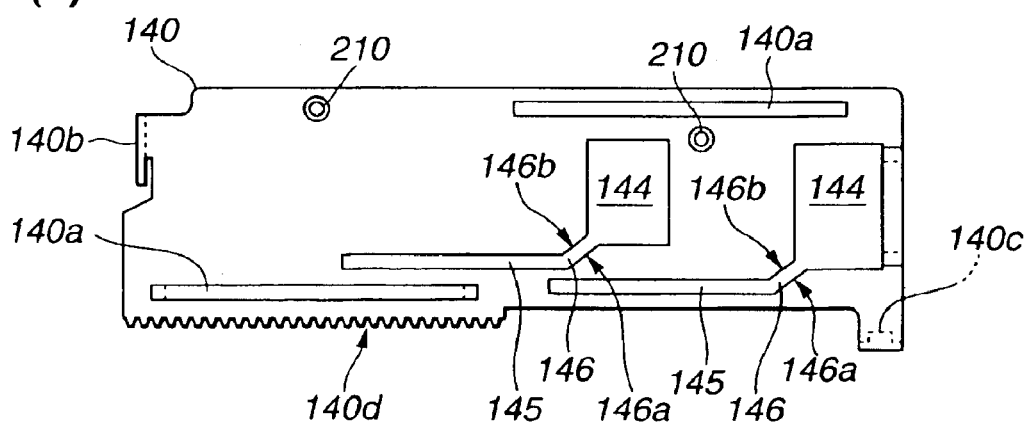

Fig. 26
(a)
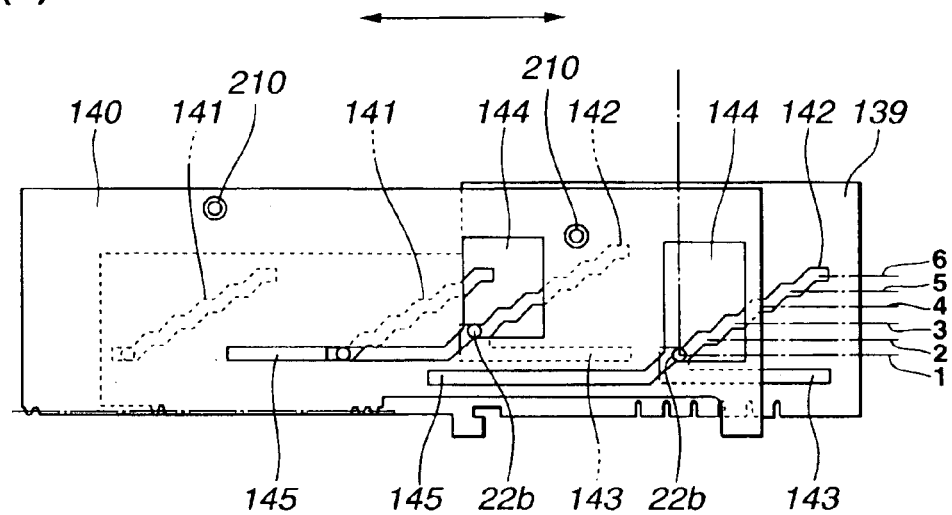
(b)
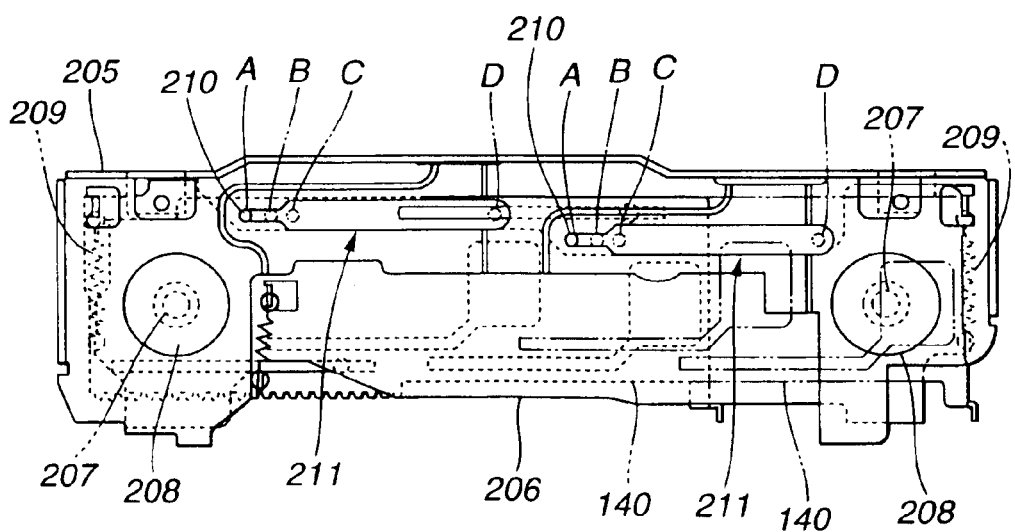

Fig. 27
(a)
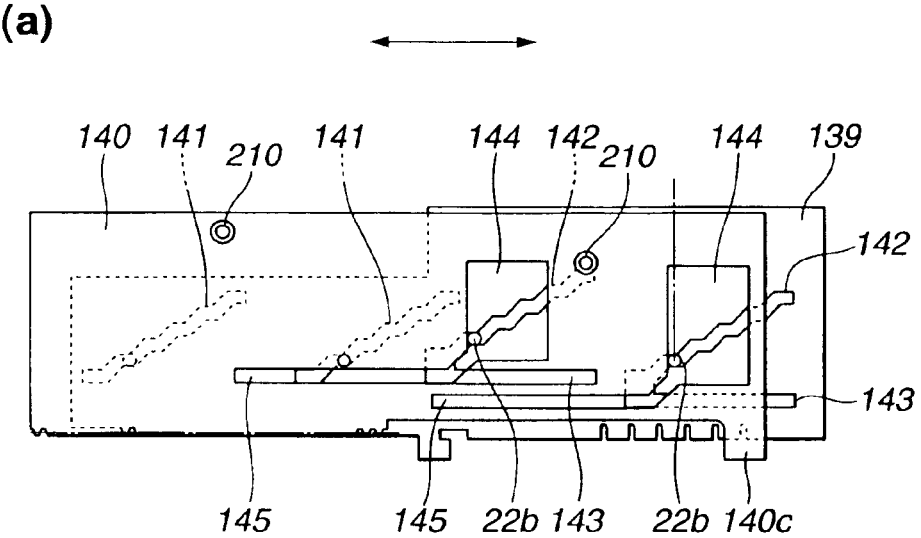
(b)
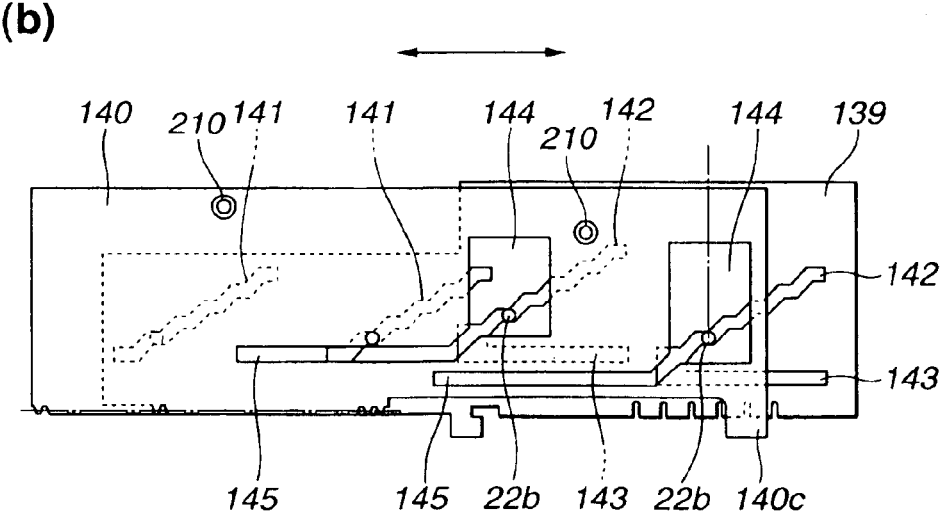

Fig. 29
(a)
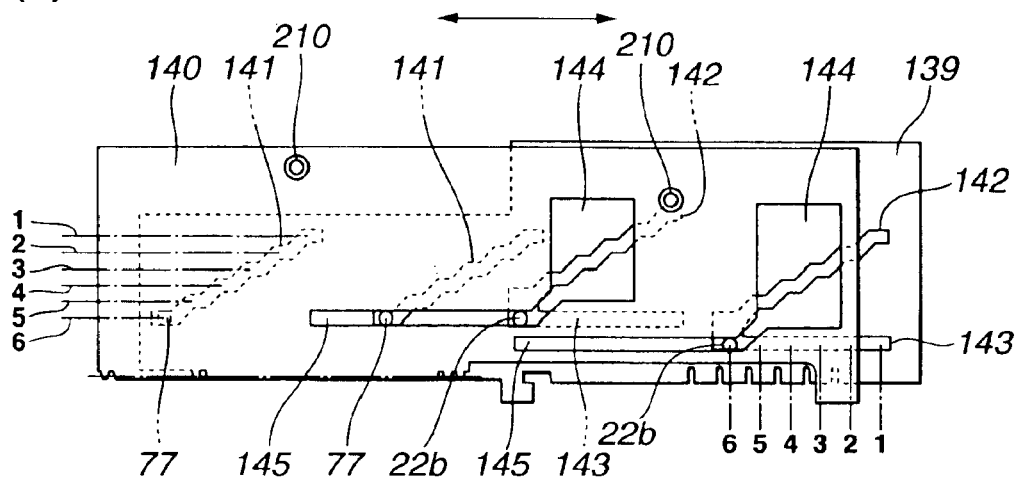
(b)
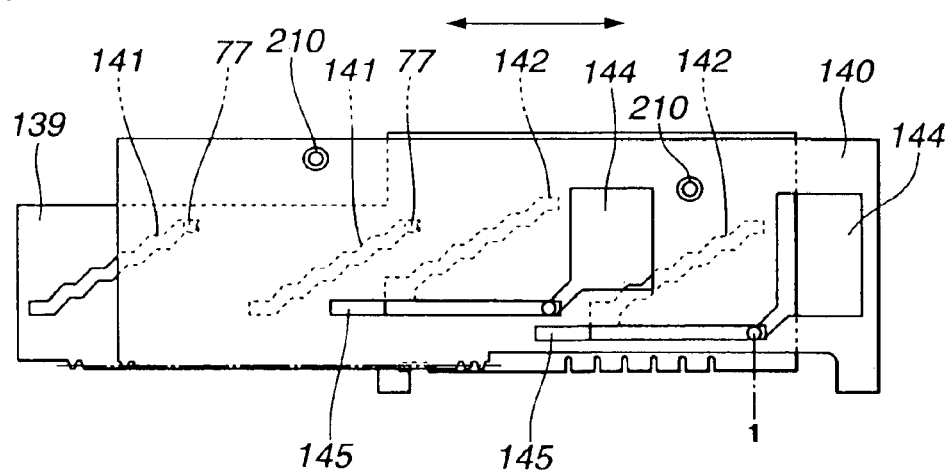

Fig. 30
(a)
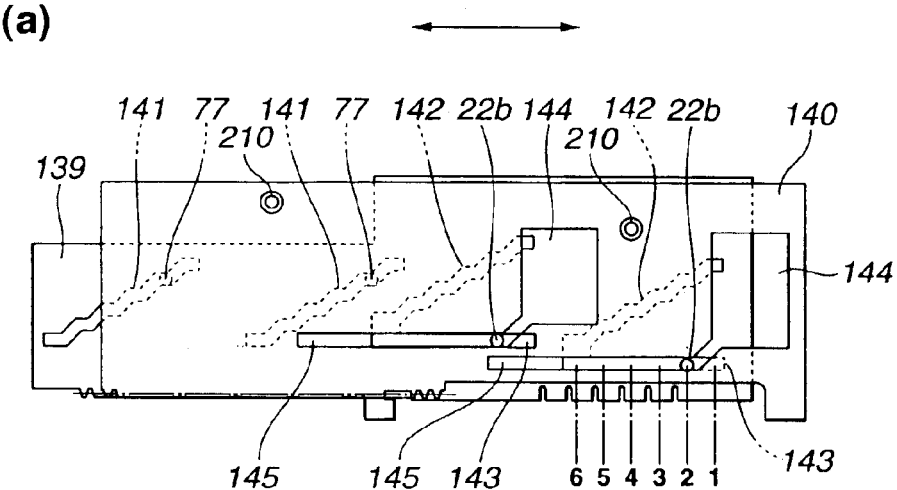
(b)
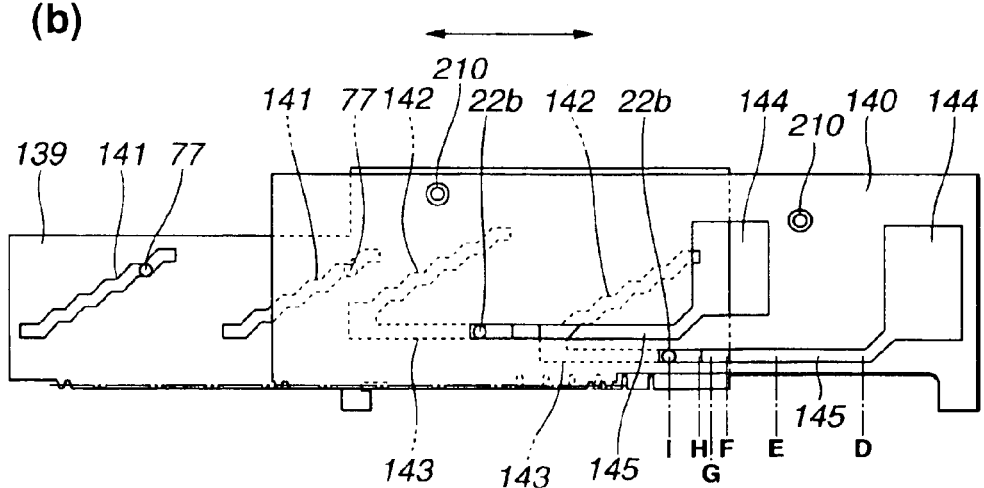

Fig. 31
(a)
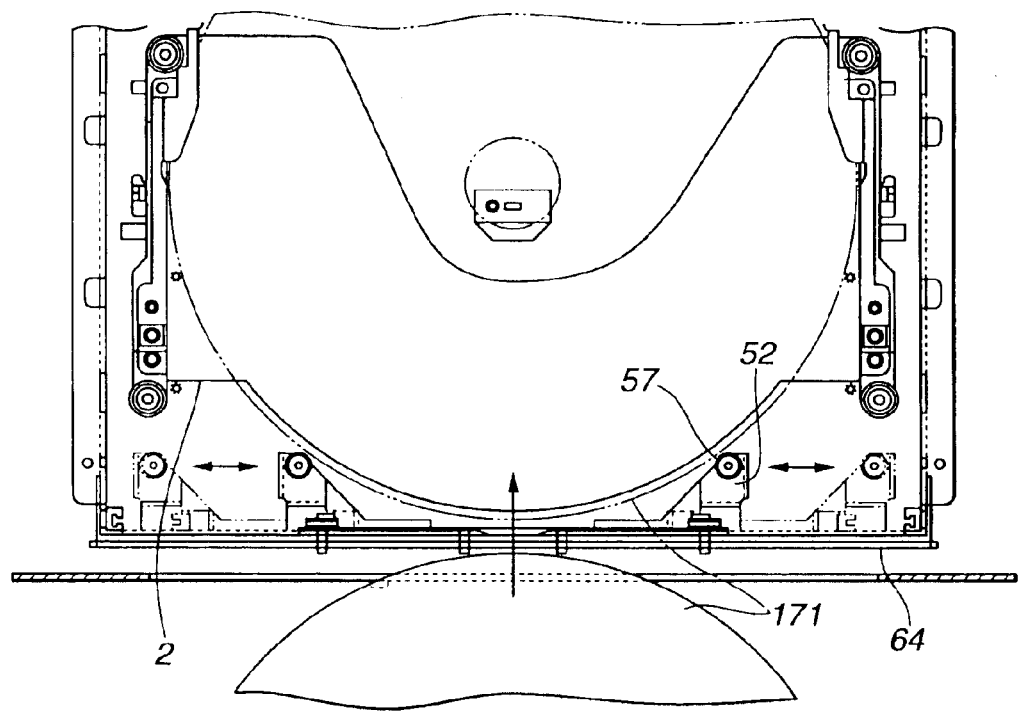
(b)
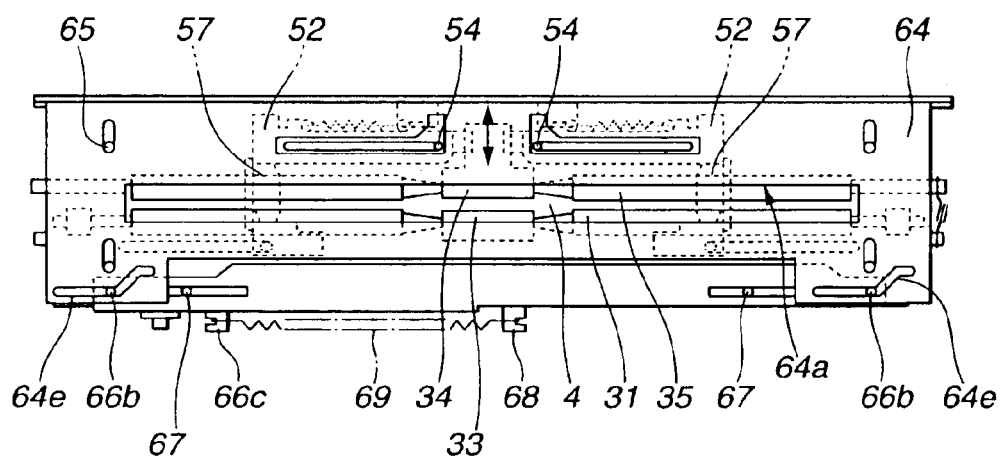

Fig. 33
(a)
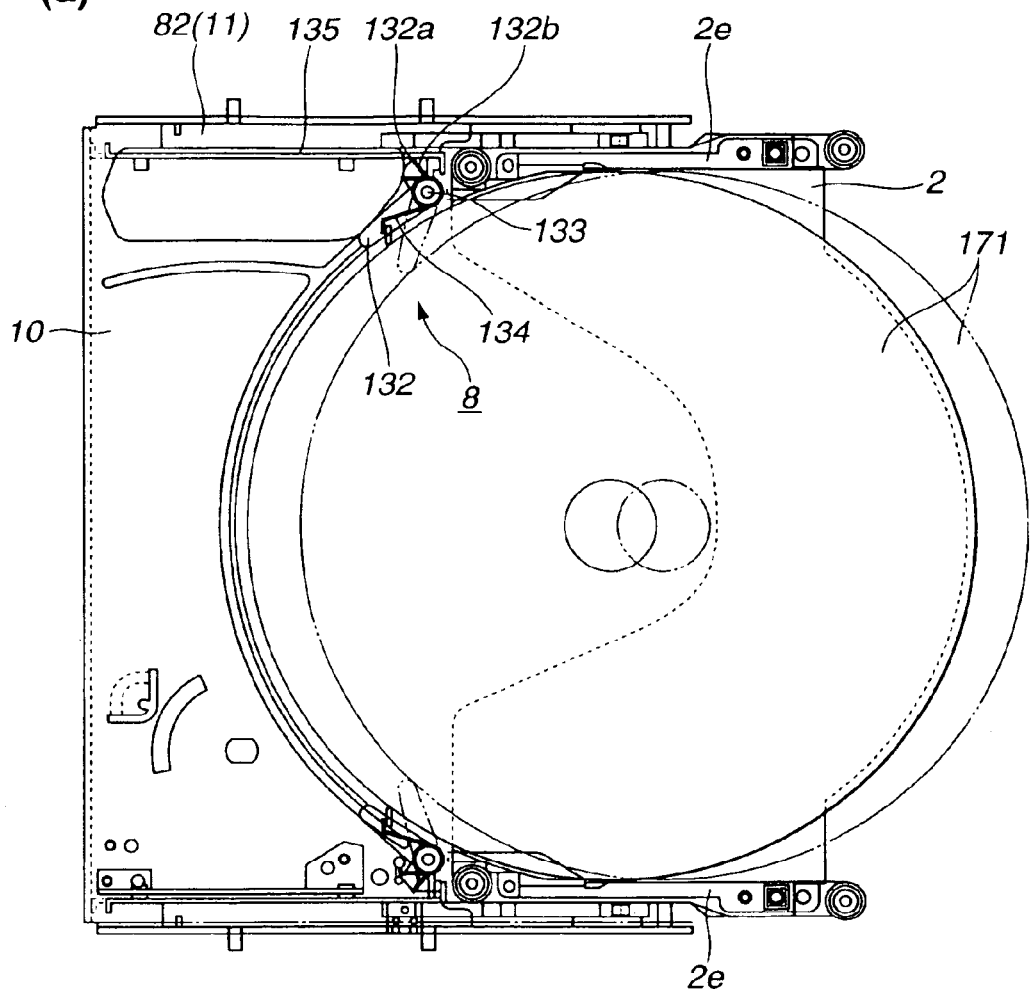
(b)
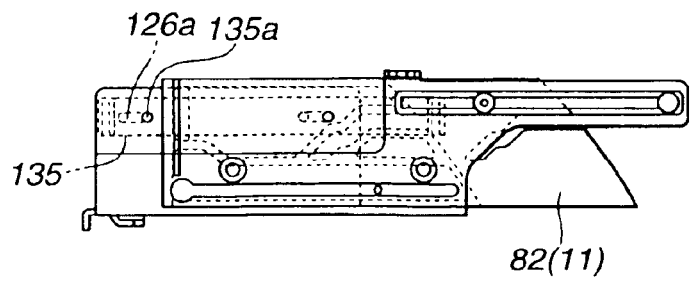

Fig. 35
(a)
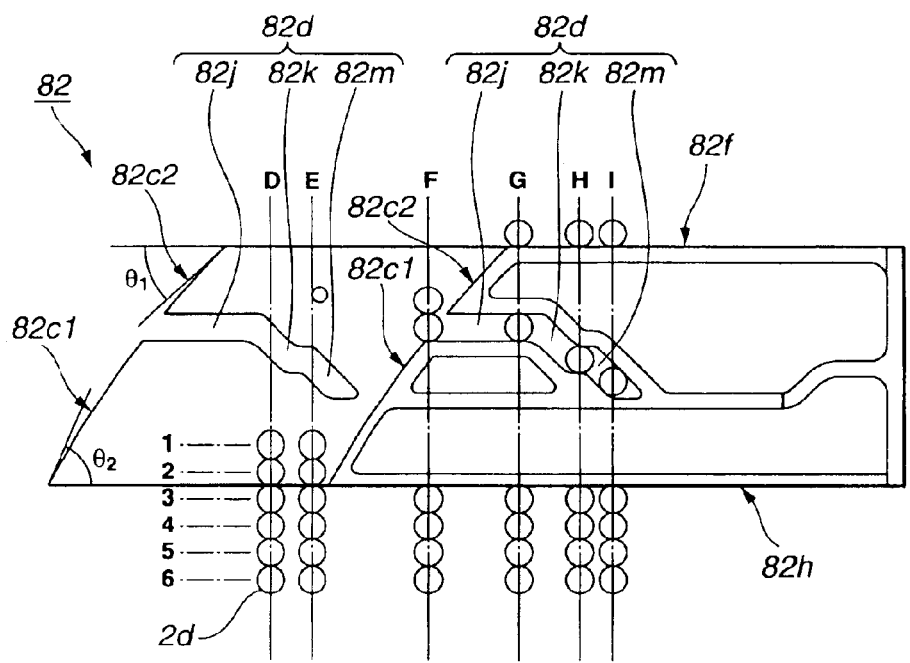
(b)
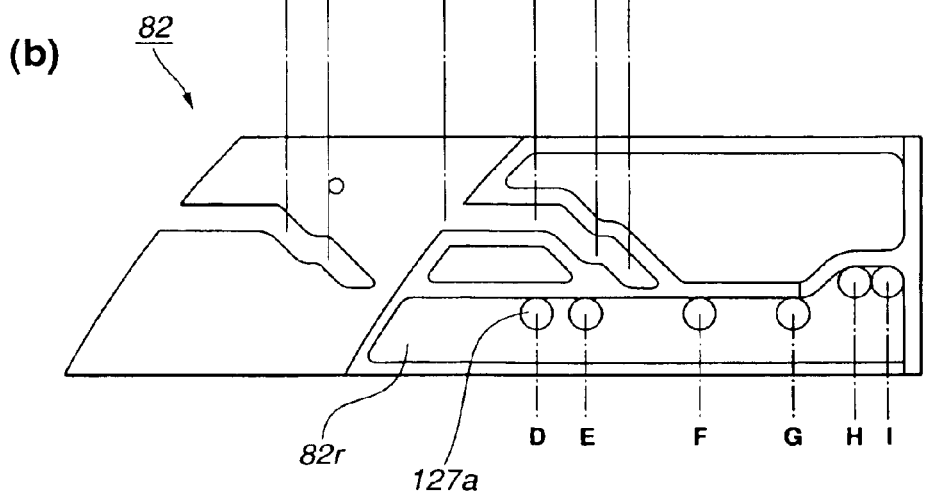

Fig. 36
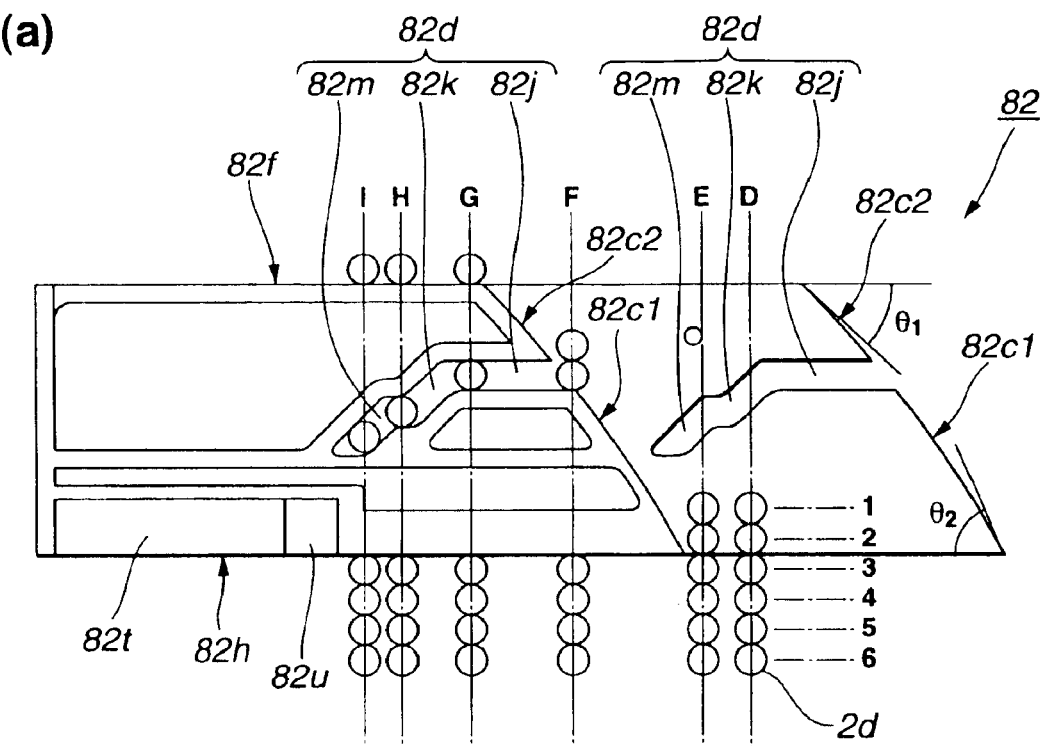
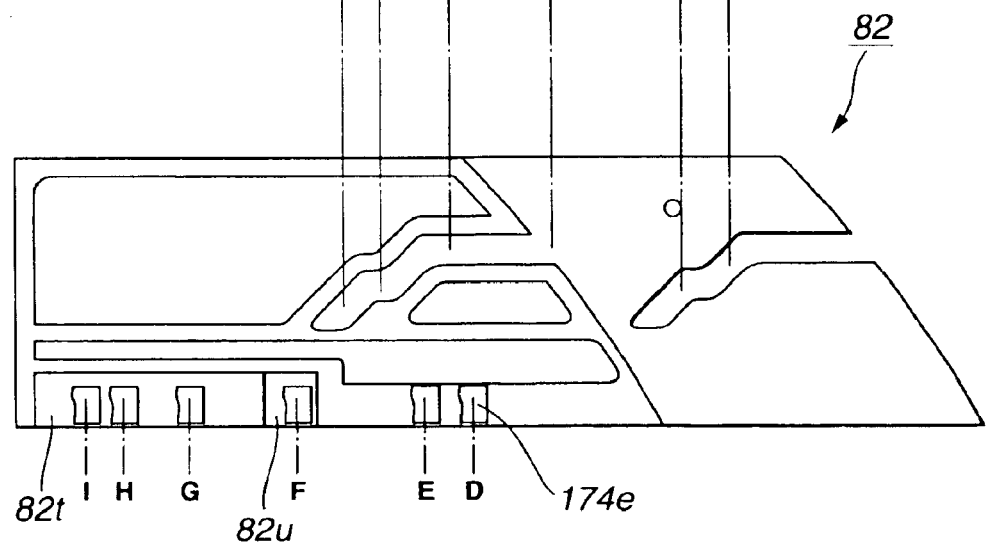

Fig. 43
(a)
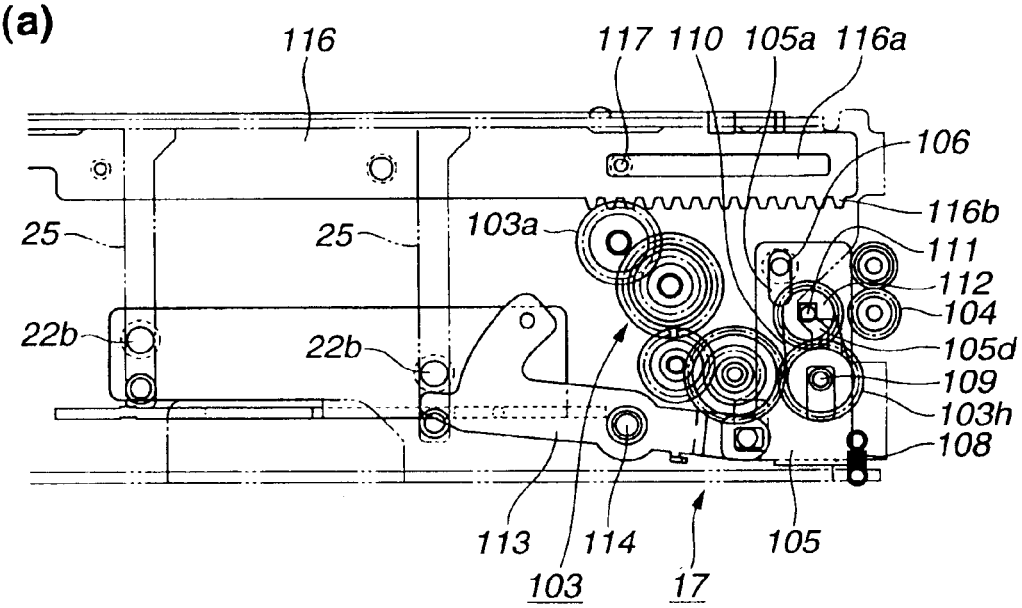
(b)
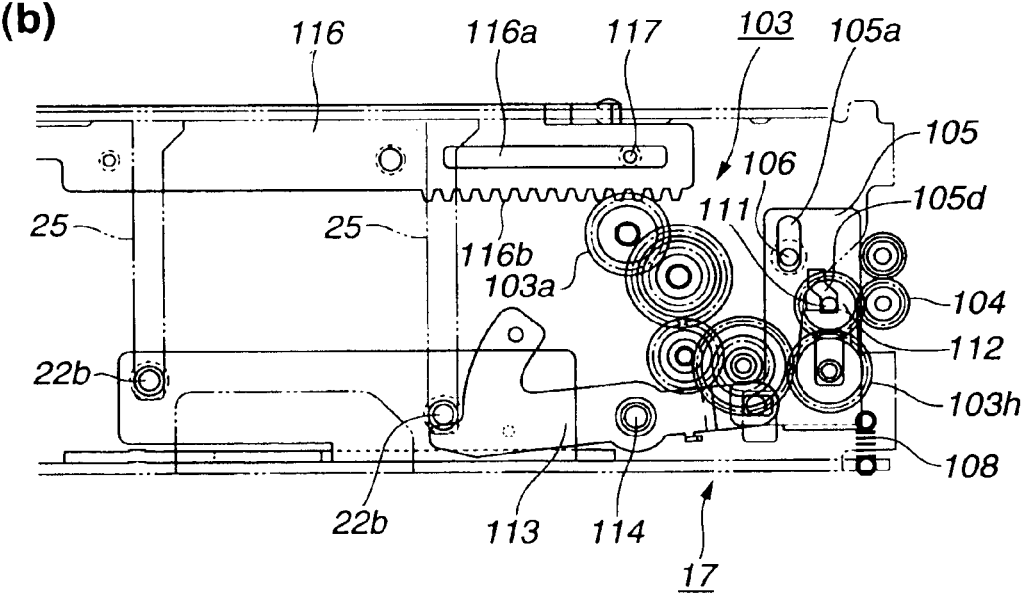

Fig. 47
(a)
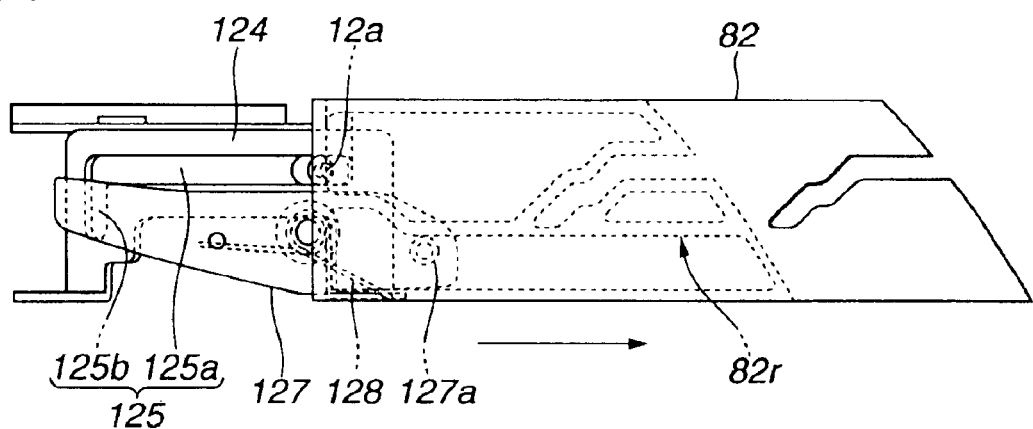
(b)
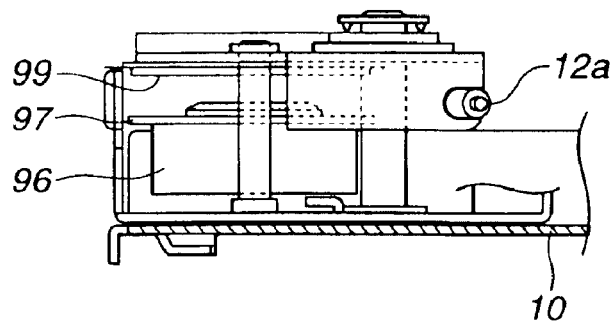

Fig. 48
(a)
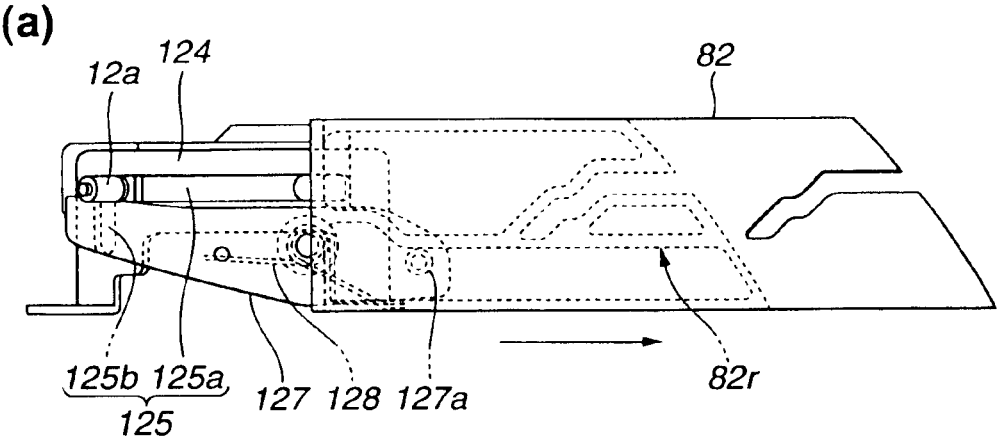
(b)
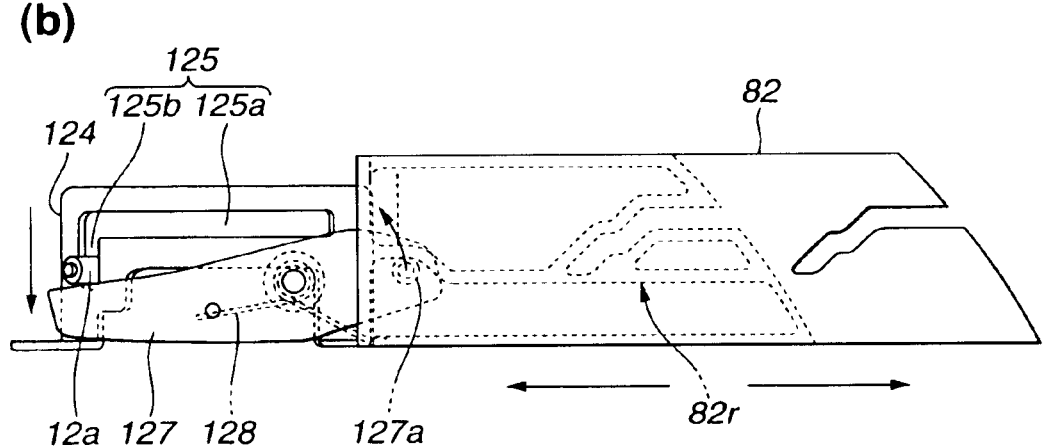
Fig. 49
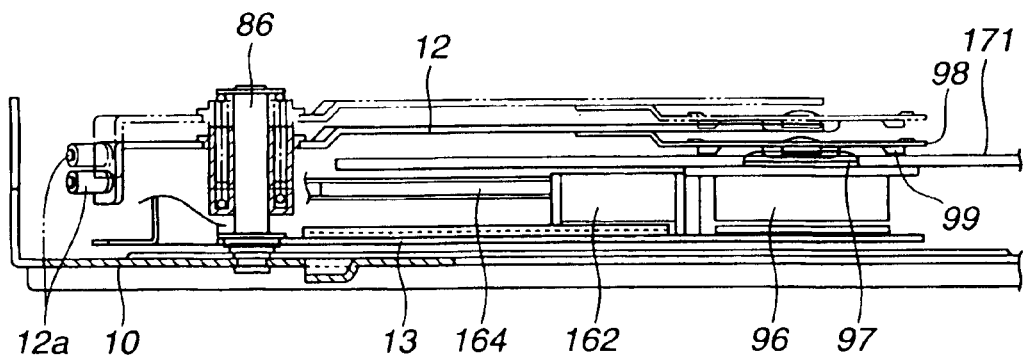

DISK RECORDING AND/OR REPRODUCING DEVICE

TECHNICAL FIELD

The present invention relates to a disk recording and/or reproducing apparatus receiving therein a plurality of disks for recordation and/or reproduction of the disks.

BACKGROUND TECHNIQUE

As a disk recording and/or reproducing apparatus installed in a vehicle for the purpose of reproducing a sound, there is provided a disk player. The disk player employs a method of receiving a plurality of disks, for example, compact disks {hereinafter referred to as "CD(s)"} in a magazine, and replacing the plurality of the CDs all together in the magazine (as a unit) for once. Since the disk player is made large in size due to above arrangement, a main body of the disk player is received in a trunk, while installed in a passenger compartment are only portions (of the disk player) necessary for operations. However, since the CDs cannot be replaced during vehicle travel, it is necessary to stop the vehicle and open the trunk for replacing the CDs, causing inconveniences.

In response to the above inconvenience, an on-vehicle disk player to be put in the passenger compartment has been developed in recent years. The on-vehicle disk player is required to receive the plurality of the CDs, and is put in a predetermined space of a dashboard in the passenger compartment. Therefore, it is important to make the on-vehicle disk player small in size.

The on-vehicle disk player has a mechanical deck and an outer case casing the mechanical deck. The mechanical deck has a disk receiver, and a recording and/or reproducing section for recordation and reproduction of the CDs received in the disk receiver. More specifically, the disk receiver is the one that has, for example, six-stacked trays each carrying thereon the CD in a chassis which has predetermined size such as 1 DIN and the like.

The above recording and/or reproducing section is floatably supported to the mechanical deck via a relaxation mechanism (floating mechanism) such that the recording and/or reproducing section can reproduce the CD with any external vibration shut off.

The above conventional disk player has the recording and/or reproducing section which is, as described above, floatably supported to the mechanical deck via the relaxation mechanism (floating mechanism), thus preventing the external vibration from being transmitted to the recording and/or reproducing section. On the contrary, the above conventional disk player cannot, however, prevent vibration, noise and the like caused by the mechanical deck, from leaking externally via the outer case.

It is therefore an object of the present invention to solve the above conventional problems, and to thereby provide the disk recording and/or reproducing apparatus which can prevent the vibration, noise and the like caused during operation of the mechanical deck, from leaking externally via the outer case.

DISCLOSURE OF THE INVENTION

Under the present invention, a disk recording and/or reproducing apparatus is provided with:
a mechanical deck which is provided with:
 a disk receiver in which disk carrying means for carrying a disk is(are) stacked, and
 a disk recording and/or reproducing section for recording and/or reproducing the disk received in the disk receiver; and
an outer case casing the mechanical deck.

In the disk recording and/or reproducing apparatus, a relaxation mechanism and a lock mechanism are disposed between the mechanical deck and the outer case. The relaxation mechanism prevents vibration from being transmitted mutually between the mechanical deck and the outer case. The lock mechanism locks the mechanical deck to the outer case in such a manner as to oppose a relaxing operation of the relaxation mechanism.

The relaxation mechanism can allow the mechanical deck in a floating state such that the disk can be recorded and/or reproduced without any external vibration transmitted to the recording and/or reproducing section. In addition, operational vibration, noise and the like caused to the mechanical deck can be prevented from being transmitted to the outer case's side during recordation and/or reproduction.

Moreover, under the present invention, the lock mechanism is so constituted as to lock the mechanical deck in a disk insertion-ejection mode, and unlock the mechanical deck in a mode other than the disk insertion-ejection mode where the mechanical deck is in operation.

With the constitution of the lock mechanism described above, the operational vibration, noise and the like caused to the mechanical deck can be prevented from being transmitted to the outer case' side even in the mode other than the disk insertion-ejection mode.

BRIEF EXPLANATION OF THE DRAWINGS

FIG. 8(a) is an exploded perspective view of a disk receiver of the disk player, while FIG. 8(b) is a perspective view showing a tray with its essential part broken.

FIG. 9 shows the disk receiver of the disk player, in which;
 FIG. 9(a) is a plan view, and
 FIG. 9(b) is a front view.

FIG. 13 is an exploded perspective view of a conveying means, a rotary force supplying means, and the like.

FIG. 14 shows a spring disposed between a dive shaft and a follower shaft, in which;
 FIG. 14(a) is a constitution of the spring, and
 FIG. 14(b) is a left side view of FIG. 14(a).

FIG. 16 shows positioning rods relative to longitudinal rollers which are disposed in the chassis, in which;

FIG. 16(a) is a plan view, and

FIG. 16(b) is a front view.

FIG. 22 shows a positioning means, in which;

FIG. 22(a) is a back face view where a sandwiching means is disposed in a standby position, and FIG. 22(b) is the back face view where the sandwiching means is disposed in a reproduction position.

FIG. 25 shows an operating means, in which;

FIG. 25(a) is a front view of a pickup lift base and a disk lift base,

FIG. 25(b) is a front view of an inner slider, and

FIG. 25(c) is a front view of an outer slider.

FIG. 26(a) is an explanatory view of the operating means showing a mode switching position in an insertion-ejection mode for inserting and ejecting the CD, and FIG. 26(b) is an explanatory view showing positioning of the locked portion relative to a locking portion.

FIG. 27 shows a state for inserting and ejecting the second uppermost CD, in which;

FIG. 27(a) is an explanatory view for showing operation of the operating means in the standby state wherein the second uppermost CD is selected, and FIG. 27(b) is an explanatory view for showing operation of the operating means when the shutter is open.

FIG. 29 shows a state for reproducing the CD, in which;

FIG. 29(a) is an explanatory view showing operation of the operating means when a sixth uppermost CD is reproduced, and FIG. 29(b) is an explanatory view showing operation of the operating means when an uppermost CD is reproduced.

FIG. 30 shows a state for reproducing a second uppermost CD, in which;

FIG. 30(a) is an explanatory view showing operation of the operating means when a pin is disposed in a position D in the standby state, and FIG. 30(b) is an explanatory view showing operation of the operating means when the pin is disposed in a position I in a reproduction state.

FIG. 31 shows the disk player before inserting the CD, in which;

FIG. 31(a) is a plan view, and

FIG. 31(b) is a front view.

FIG. 33 shows an ejecting means when ejecting the CD, in which;

FIG. 33(a) is a plan view, and

FIG. 33(b) is a front view.

FIG. 35 shows operation of one of the separating cams, in which;

FIG. 35(a) is an explanatory view showing movement of the tray relative to the separating cam, and FIG. 35(b) is an explanatory view showing upward-downward movement of the upper arm relative to the separating cam.

FIG. 36 shows operation of the other of the separating cams, in which;

FIG. 36(a) is an explanatory view showing movement of the tray relative to the separating cam, and FIG. 36(b) is an explanatory view showing the arm locking means relative to the separating cam.

FIG. 43 shows the rotary force supplying means, in which;

FIG. 43(a) is an explanatory view showing a state that the rotary force is not supplied, and FIG. 43(b) is an explanatory view showing a state that the rotary force is supplied.

FIG. 47 is an explanatory operation view showing a state of a regulating means when the sandwiching means occupies the standby position.

FIG. 48 shows the regulating means with the sandwiching means occupying the reproduction position, in which;

FIG. 48(a) is an explanatory operation view showing that sandwiching operation is prevented, and FIG. 48(b) is an explanatory operation view showing that the prevention of the sandwiching operation is released.

FIG. 49 is an explanatory operation view showing a state that the sandwiching means sandwiches the CD after the regulating means releases the prevention of the sandwiching operation.

BEST MODE FOR CARRYING OUT THE INVENTION

Hereinafter described is a mode for carrying out the present invention on a disk recording and/or reproducing apparatus.

Figure 1:
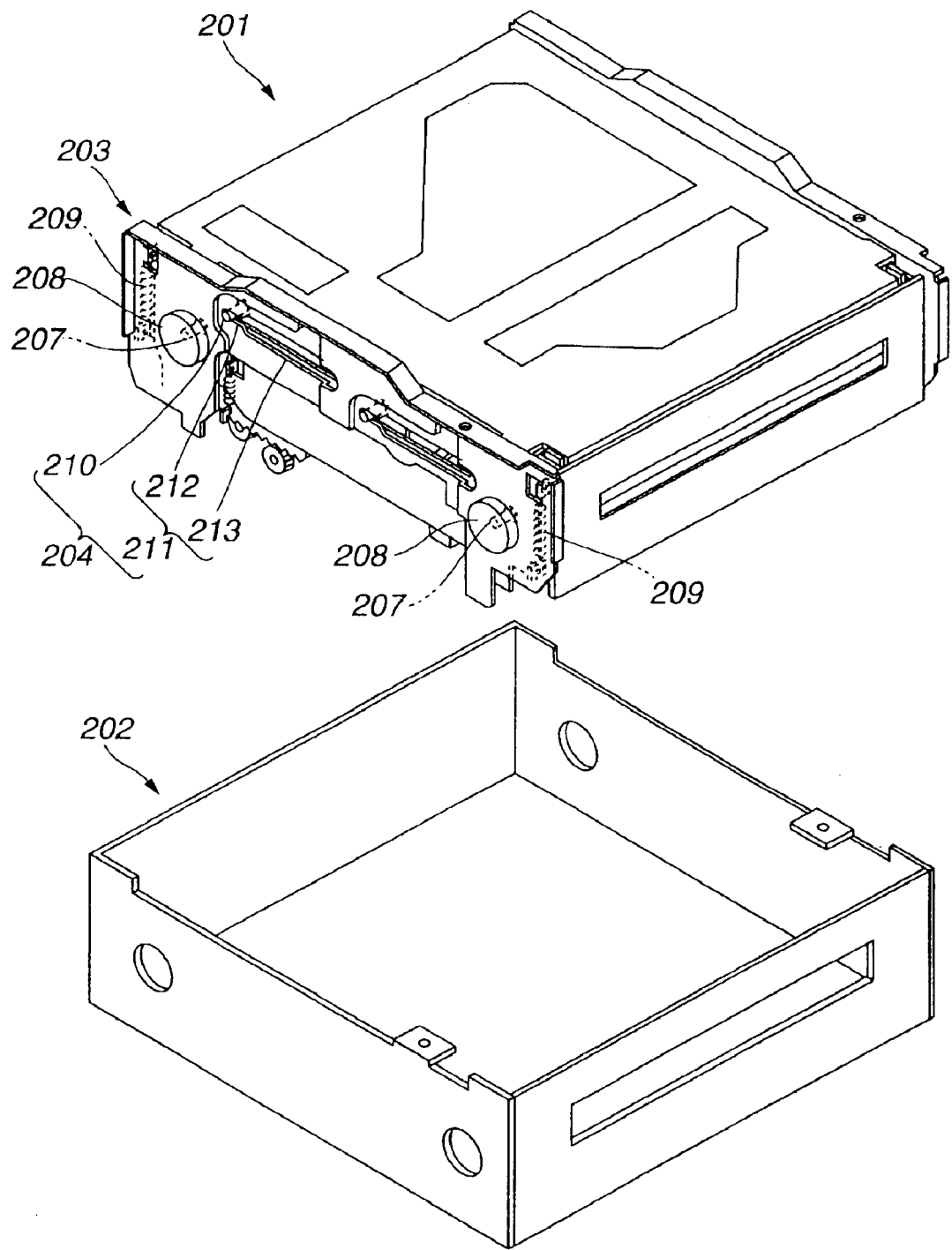
FIG. 1 is a perspective view of a mechanical deck taken out of an outer case.
Figure 2:
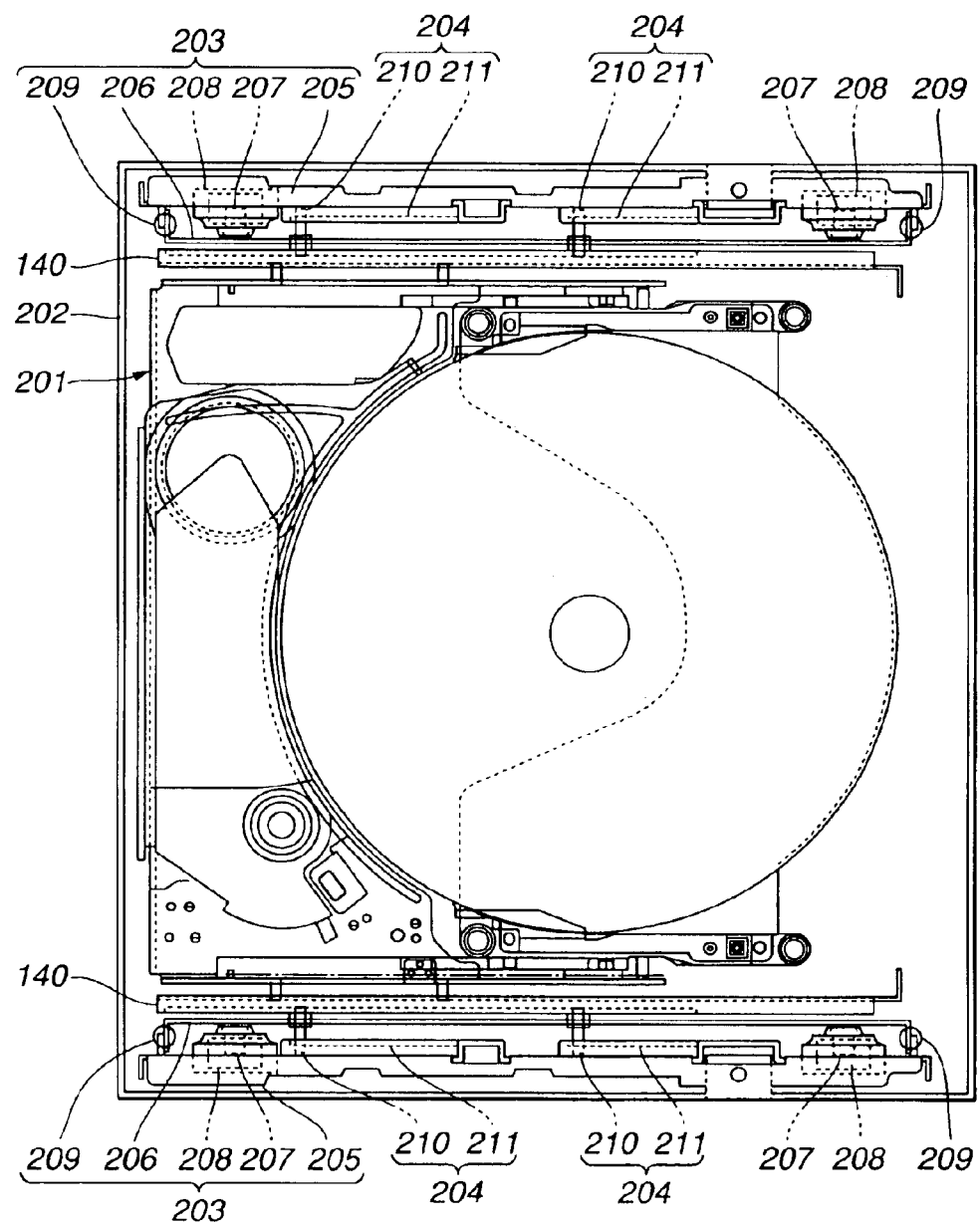
FIG. 2 is a plan view of the mechanical deck cased in the outer case.

According to the mode for carrying out the invention, the present invention is applied to a disk player which reproduces sound. FIG. 1 is a perspective view of a mechanical deck which is taken out of an outer case. FIG. 2 is a plan view of the mechanical deck cased in the outer case. The above disk player is constituted of a mechanical deck 201, an outer case 202, a relaxation mechanism 203, and a lock mechanism 204. The mechanical deck 201 is equipped with a disk receiver in which disk carrying means is(are) stacked, and a recording and/or reproducing section for recording and/or reproducing the disk which is received in the disk receiver. The mechanical deck 201 is cased in the outer case 202. The relaxation mechanism 203 is disposed between the mechanical deck 201 and the outer case 202, and prevents vibration from being transmitted mutually between the mechanical deck 201 and the outer case 202. The lock mechanism 204 locks the mechanical deck 201 to the outer case 202's side in such a manner as to oppose relaxation attributable to the relaxation mechanism 203.

Figure 3:
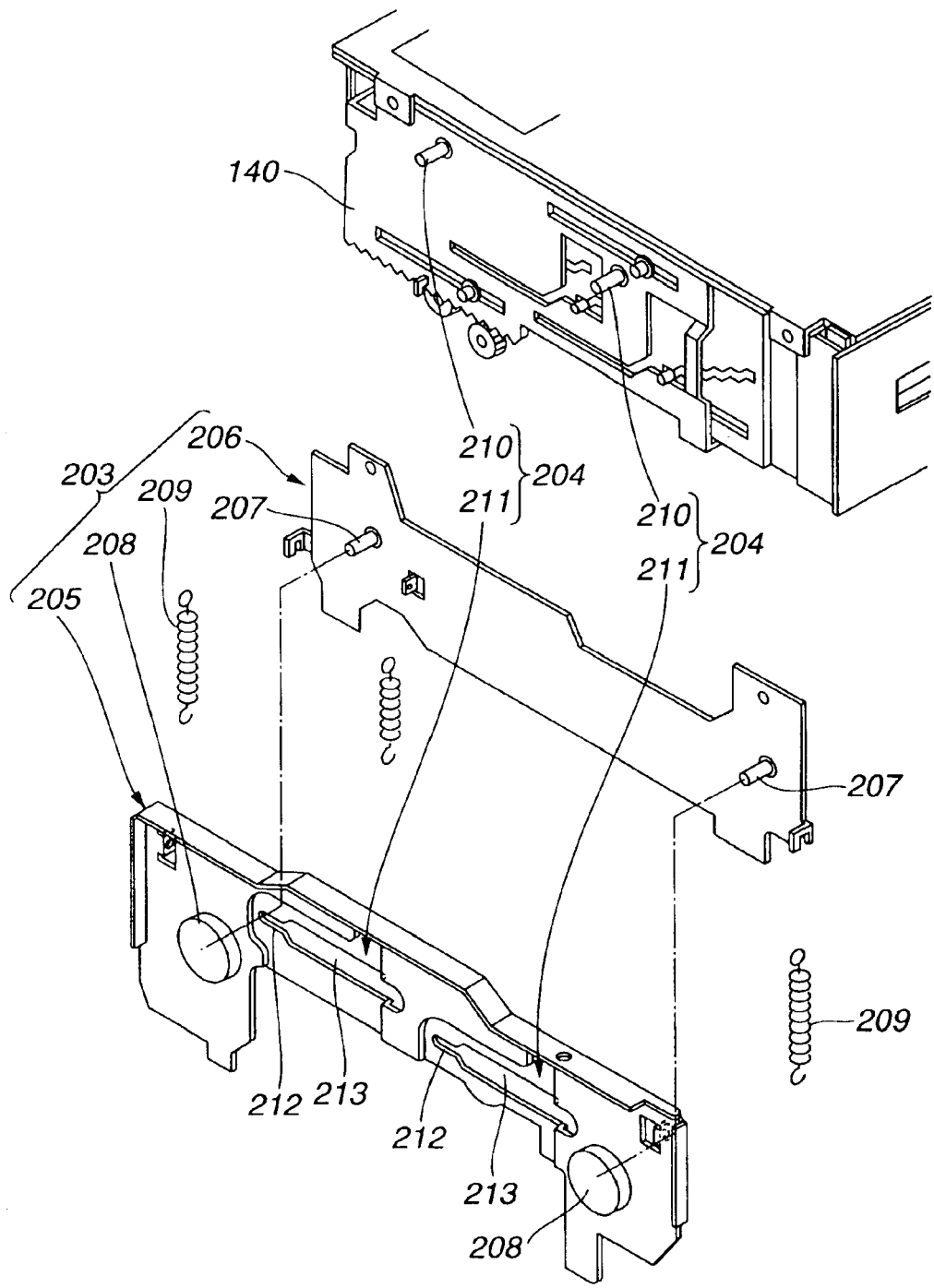
FIG. 3 is an exploded perspective view of a relaxation mechanism.

As is seen in an exploded perspective view in FIG. 3, the relaxation mechanism 203 is constituted of a first plate 205, a second plate 206, a pair of rubber dampers 208, a plurality of tensile coil springs 209. The first plate 205 is mounted to a side face of the outer case 202. The second plate 206 is mounted to a side face of the mechanical deck 201. By means of a pair of pins 207 of the second plate 206, the pair of the rubber dampers 208 are disposed between the fist plate 205 and the second plate 206. The tensile coil spring 209 has a first end engaging with the first plate 205 and a second end (opposite to the first end) engaging with the second plate 206, thereby hanging the mechanical deck 201 on the outer case 202. The relaxation mechanisms 203 are disposed on both sides of the mechanical deck 201.

The lock mechanism 204 is constituted of a locked portion 210 disposed on the mechanical deck 201's side, and a locking portion 211 disposed on the outer case 202's side.

The locked portion 210 is formed by mounting a pin to an outer slider 140 (an outer slider of an operating means 9 to be described afterward) which is slidably disposed on the side face of the mechanical deck 201.

The locking portion 211 is formed by making a long groove on the first plate 205 of the relaxation mechanism 203. The locking portion 211 has a lock groove 212 engaging with the locked portion 210 in a disk insertion-ejection mode, and an unlock groove 213 disengaging from the locked portion 210 in a mode other than the disk insertion-ejection mode.

Figure 4:
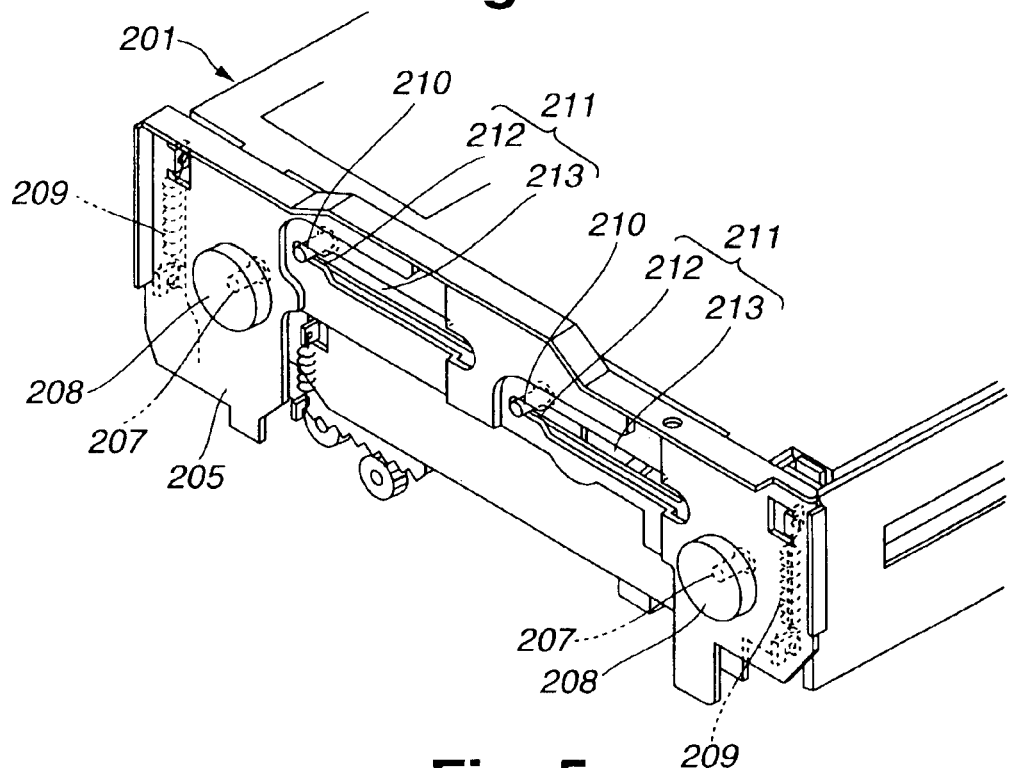
FIG. 4 is a perspective view showing a locked portion is positioned in a lock groove.
Figure 5:
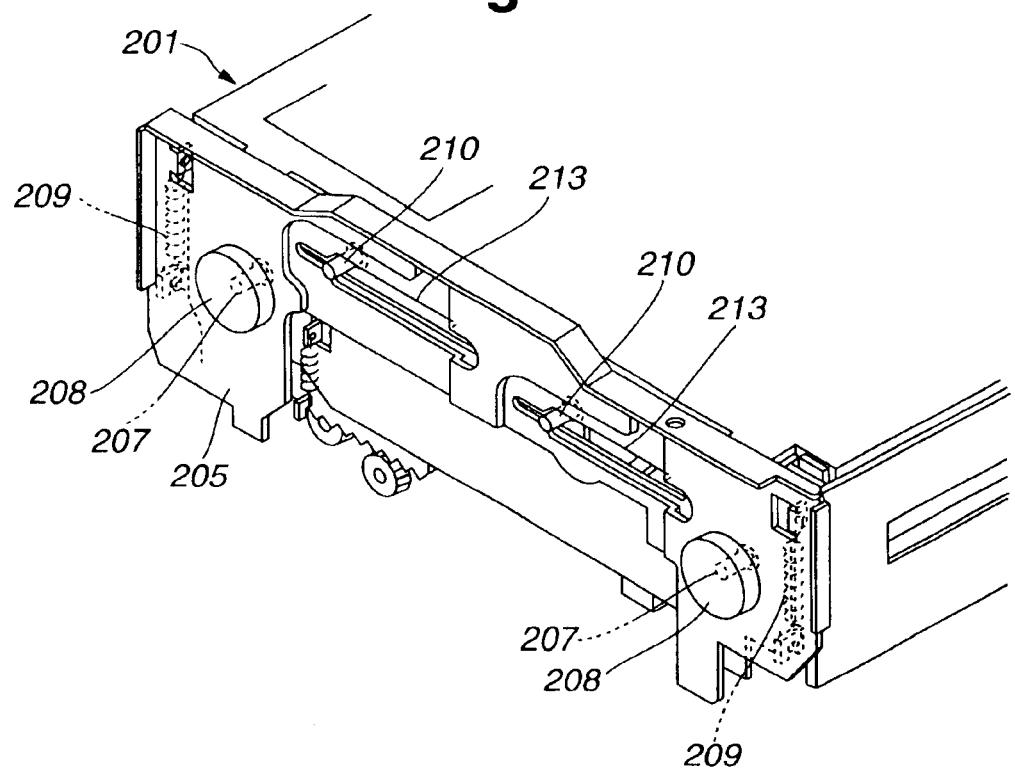
FIG. 5 is a perspective view showing the locked portion is positioned in an unlock groove.

As is seen in FIG. 4, the locked portion 210 movably engages with the lock groove 212 in the disk insertion-ejection mode, with the mechanical deck 201 locked to the outer case 202. Contrary to this, as is seen in FIG. 5, the locked portion 210 is movably disposed in the unlock groove 213 in the mode other than the insertion-ejection mode, with the mechanical deck 201 unlocked. Hereinafter described are particulars of each portion.

(A) Overall Constitution of Disk Player

As is seen in FIG. 6 to FIG. 25, the disk player is, as a whole, constituted of the outer case 202 (defining an overall configuration of the disk player), a chassis 1 (of the mechanical deck 201), a disk receiver 3, a conveying means 5, an opening-closing means 6, a reproducing means 7, an ejecting means 8, and the operating means 9. The disk receiver 3 is disposed on a front side of the chassis 1, and receives the CD. The conveying means 5 is disposed at an insertion-ejection hole 4 of a front plate 1a of the chassis 1. The conveying means 5 inserts the CD into the disk receiver 3 and ejects the CD from the disk receiver 3. The opening-closing means 6 is disposed on a front side of the conveying means 5, and opens/closes the insertion-ejection hole 4 of the front plate 1a. The reproducing means 7 is disposed on a back side of the chassis 1, and reproduces any one of the CDs that is selected from those received in the disk receiver 3. The ejecting means 8 is disposed on right and left sides on a back side of the disk receiver 3, and ejects the CD (in a process of ejection) toward the conveying means 5. The operating means 9 are principally disposed outside a left side plate 1b and a right side plate 1c of the chassis 1, and operates the disk receiver 3, the reproducing means 7 and the like.

The reproducing means 7 is constituted of a controlling means 11, a sandwiching means 14, a disk driving means 15, a pickup unit 16, a rotary force supplying means 17, and a regulating means 18. The controlling means 11 are disposed on both sides of a pickup lift base 10, and forms spaces above and below (or upper and lower spaces for) the CD which is selected from a plurality of the CDs received in the disk receiver 3. The sandwiching means 14 is constituted of a lower arm 13 and an upper arm 12 which are rotatably disposed on the pickup lift base 10. Moreover, the sandwiching means 14 intrudes into the upper and lower spaces for sandwiching the selected CD. The disk driving means 15 is mounted on the lower arm 13, and turns the thus sandwiched CD. The pickup unit 16 is mounted on the lower arm 13, and reads information from the thus turned CD. The rotary force supplying means 17 supplies a driving force of the conveying means 5 to the sandwiching means 14 (for pivoting the sandwiching means 14), only in the reproduction mode for reproducing the CD, instead of the disk insertion-ejection mode. The regulating means 18 regulates (sets up) time for allowing the sandwiching means 14 to sandwich the CD.

(B) Chassis

Described at first is the chassis 1. The chassis 1 is constituted of the front plate 1a, the left plate 1b, the right side plate 1c, a ceiling plate 1d, and a base plate 1e. The back face of the chassis 1 is open. The left side plate 1b, the right side plate 1c, and the base plate 1e are united.

(C) Disk Receiver

As is seen in FIG. 8(a), the disk receiver 3 is constituted of six trays 2 as disk carrying means, and a disk lift base 22 for carrying the six trays 2. On the front side of the chassis 1, there are provided four guide supports 23 extending vertically as supporting means. Each of the guide supports 23 has a first end coupled to the ceiling plate id and a second end coupled to the base plate 1e.

As is seen in FIG. 9, the tray 2 is formed in such a manner that a resin 2b (as guide member) attaches to an upper face on both sides of a thin aluminum plate 2a. Each resin 2b is formed with a pair of a long pin 2c and a short pin 2d protruding sideward. More specifically, the long pins 2c is disposed on a middle section of the resin 2b, while the short pin 2d is disposed on a back section of the resin 2b. Height of the resin 2b is set substantially the same as thickness of the CD.

Figure 10:
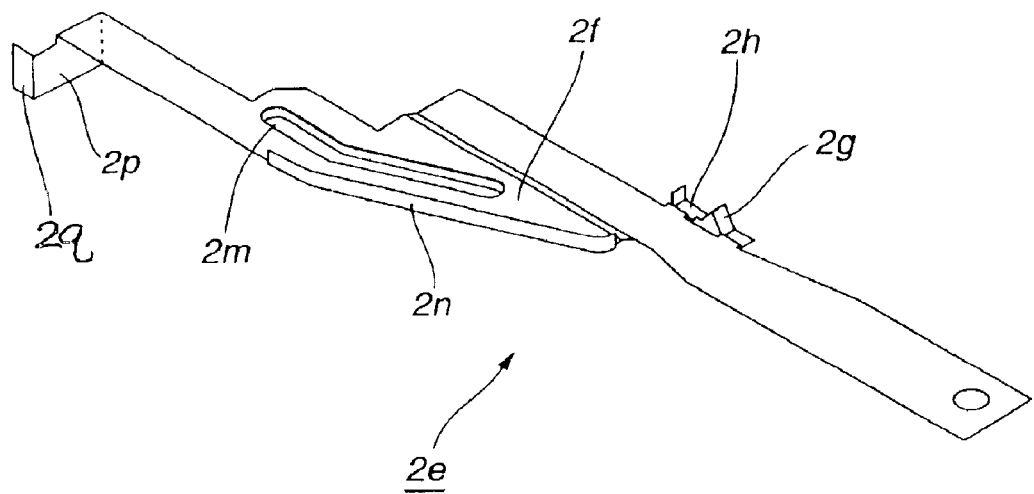
FIG. 10 is a perspective view of a plate spring.
Figure 11:
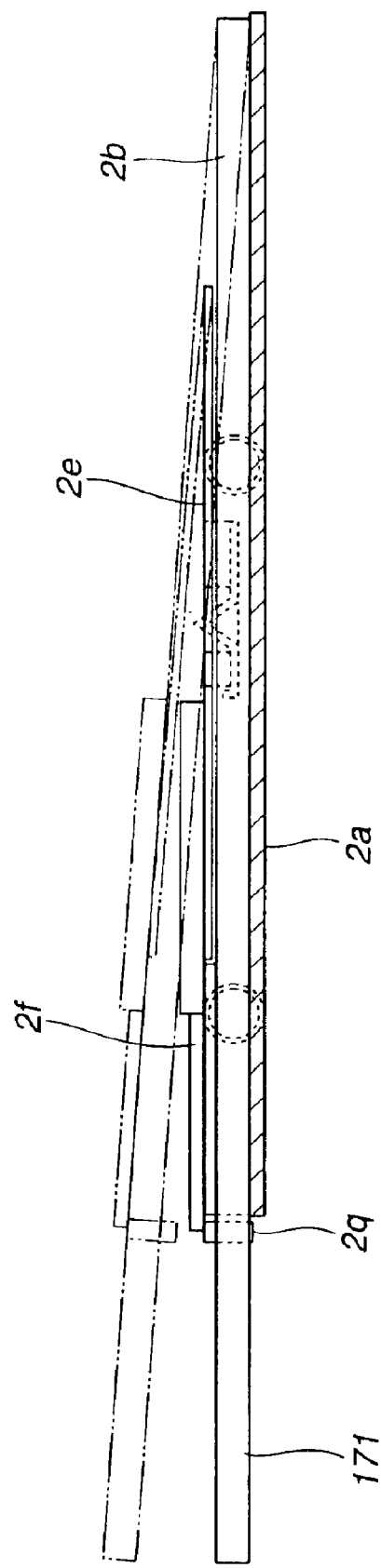
FIG. 11 is a view showing that the plate spring is lifted.

There is provided a plate spring 2e which acts as a biasing means for sandwiching the CD between the plate spring 2e and the aluminum plate 2a. The plate spring 2e has a front side which is fixed to an upper face of the resin 2b. As is seen in FIG. 10, the plate spring 2e has a back side protruding inward which is formed with a suppress portion 2f for suppressing the CD. Moreover, the plate spring 2e has a middle section formed with a receiving portion 2g protruding outward which is suppressed downward by a lower face of a separating cam 82 (to be described afterward). Moreover, there is formed a receiving portion 2h for receiving an upward force which is caused by a lower face of an upper mating portion 82j (to be described afterward). Described hereinafter is a constitution of the suppress portion 2f of the plate spring 2e. The suppress portion 2f is so bent as to become slightly higher than other portions around the suppress portion 2f. The suppress portion 2f is formed with a rib protrusion 2m protruding downward to abut on an upper face of the CD. The suppress portion 2f has an inclined inside which is formed with a standing guide 2n. The guide 2n can guide the CD to below the suppress portion 2f, when the CD is pressed in on the tray 2. There are defined a pair of positioning portions 2r on a back inside of a pair of the resins 2b. The positioning portions 2r abutting on the CD can determine a center of the CD. In case some causes may lift the backside of the plate-spring 2e such that the CD is put on the resin 2b, the CD 171 is movable leftward in FIG. 11. As a result, the CD 171 cannot be positioned. Thus, there is provided an auxiliary positioning portion 2p which is formed by bending downward the back end of the plate spring 2e. There is also provided an abutting portion 2q abutting on the CD in such a manner as to protrude backward from the auxiliary positioning portion 2p, thus defining an R portion so as to prevent the plate spring 2e from damaging the CD.

On both front side and back side of each of the resins 2b, there is defined a guide hole 2i into which the guide support 23 penetrates. The guide hole 2i extends through the resin 2b and the aluminum plate 2a. In a portion abutting on an outer periphery of the CD on both sides of the aluminum plate 2a, there is provided a cushion material (not shown) which is attached circumferentially in a form of an arc. On both sides of the resin 2b of the uppermost tray 2, there is united a cylindrical spring receiver 2j, as is seen in FIG. 8(a). The spring receiver 2j receives a coil spring 24 which acts as a biasing means between the ceiling plate 1d and the uppermost tray 2. As is seen in FIG. 8(b), the spring receiver 2j has a lower end protruding slightly inward as to form a receiver 2k. The receiver 2k receives a lower end of the coil spring 24. Even when a long spring involves a great compression length, the receiver 2k can prevent compression load from becoming too great.

On the other hand, the disk lift base 22 has a left end and a right end bent upward. The disk lift base 22 defines a horizontal area which is formed with a guide hole 22a through which the guide support 23 penetrates. Each of the left end and the right end of the disk lift base 22 has a vertical outside which is formed with a pair of pins 22b for lifting the disk lift base 22. The pins 22b are so fixed to the disk lift base 22 as to protrude horizontally. The pair of the pins 22b are inserted through respective two vertical slits 25 formed on each of the left side plate 1b and the right side plate 1c of the chassis 1. The pair of the pins 22b protrude outward from the chassis 1.

With the guide support 23 inserted through the guide holes 22a and the guide holes 2i, the disk lift base 22 and the six trays 2 are supported in such a manner as to move upward and downward. Moreover, there are provided four spring guides 26. Each spring guide 26 has an upper end fixed to the ceiling plate 1d of the chassis 1, and a lower end fixed to the base plate 1e of the chassis 1. Each spring guide 26 is inserted through the spring receiver 2j. The coil spring 24 (as biasing means) which is so disposed as to surround the spring guide 26 has a lower end abutting on the receiver 2k disposed at the lower end of the spring receiver 2j.

(D) Conveying Means

Figure 7:
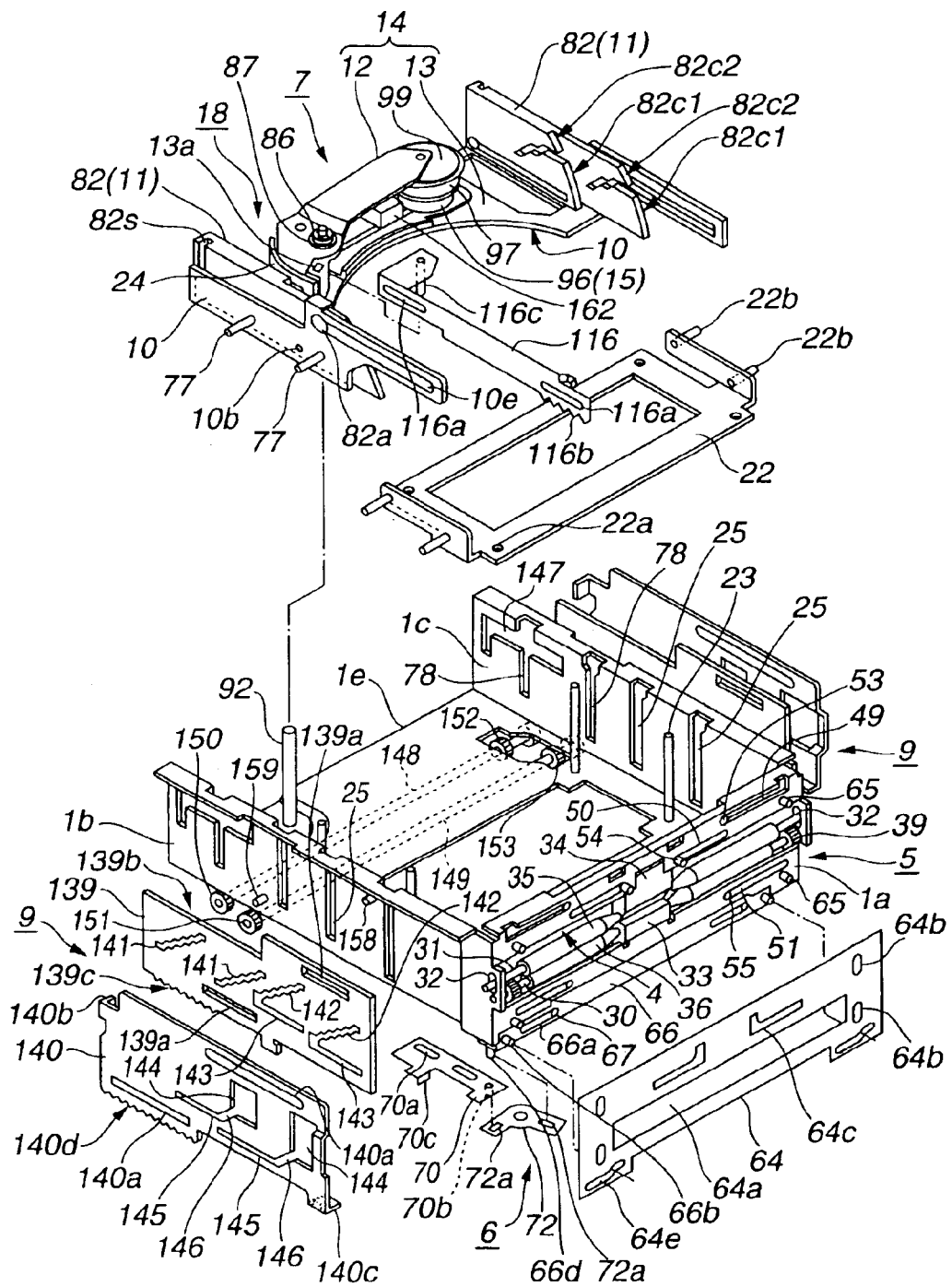
FIG. 7 is an exploded perspective view of the disk player.
Figure 12:
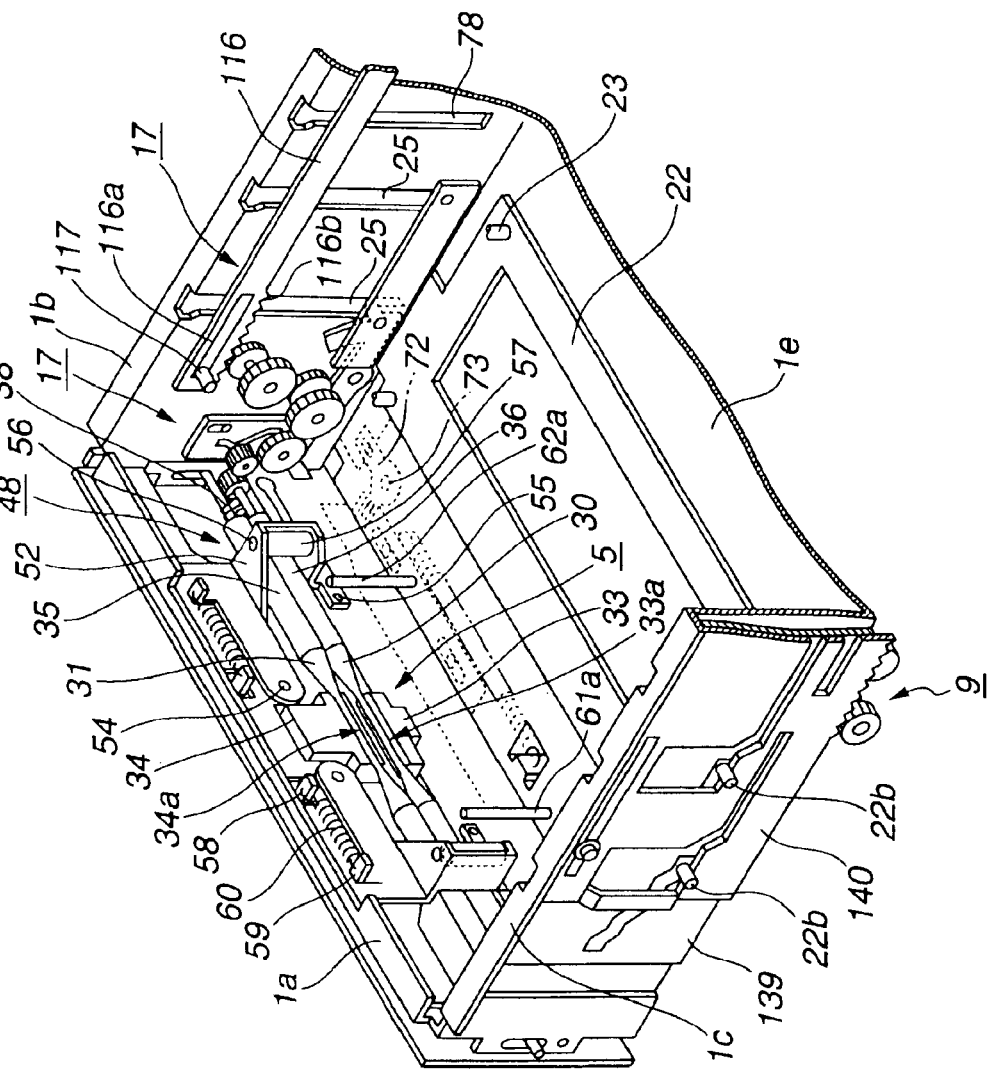
FIG. 12 is a perspective view of an inside of front part of a chassis, viewed from back side of the chassis.

As is seen in FIG. 7, the conveying means 5 is disposed on the front plate 1a of the chassis 1. The front plate 1a is formed with the insertion-ejection hole 4. A drive shaft 30 and a follower shaft 31 are rotatably supported in the insertion-ejection hole 4. Both ends of the drive shaft 30 are mounted to the front plate 1a. Both ends of the follower shaft 31 are inserted into respective vertical long holes 32 which are formed on side faces of the front plate 1a. For supporting middle sections of the drive shaft 30 and the follower shaft 31, the following measures are taken: As is seen in FIG. 12, a small diameter section in the middle of the drive shaft 30 rotatably mates with a groove 33a which is formed on a back side of a resin bearing 33 whose downward movement is restricted. Moreover, a small diameter section in the middle of the follower shaft 31 rotatably mates with a groove 34a which is formed on a back side of a resin bearing 34. Hereinabove, the resin bearing 34 can move upward and downward freely by way of a pair of guide protrusions (not shown) and a pair of guide grooves (not shown). A pair of rollers 35 made of resin mount to the follower shaft 31, while a pair of rollers 36 made of rubber mount to the drive shaft 30. Retain rings (not shown) retain slide of the respective rollers 35 and rollers 36 in a direction toward axial center.

Figure 15:
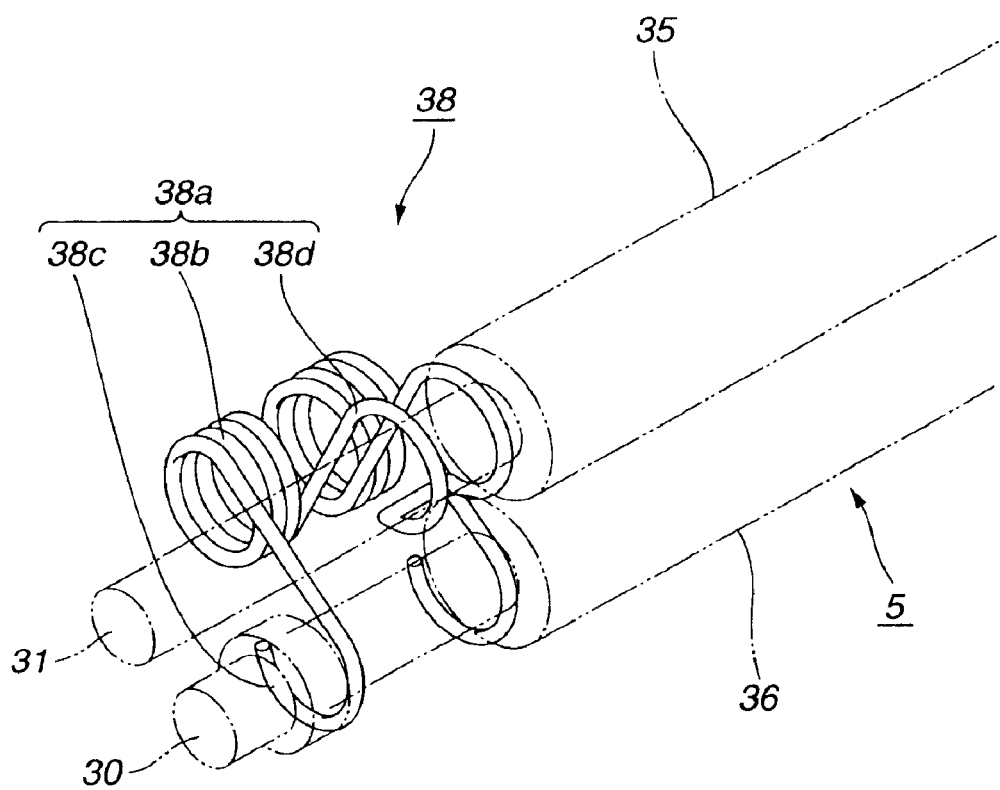
FIG. 15 is a perspective view of the spring disposed between the drive shaft and the follower shaft.

Between the follower shaft 31 and the drive shaft 30, there is provided a spring 38 for biasing the follower shaft 31 toward the drive shaft 30. A pair of the springs 38 are disposed outside the pair of the rollers 35 and the pair of the rollers 36, and inside the left side plate 1b and the right side plate 1c. As is seen in FIG. 15, the spring 38 is constituted of a pair of spring pieces 38a. The spring piece 38a has a torsion coil portion 38b, a hook portion 38c into which the drive shaft 30 is inserted, and a hook portion 38d for hooking the follower shaft 31. Uniting the two hook portions 38d to form a united spring piece 38a can securely mount the spring 38 without inclination. A sleeve may be interposed between the hook portion 38c and the drive shaft 30, and between the hook portion 38d and the follower shaft 31.

Figure 13:
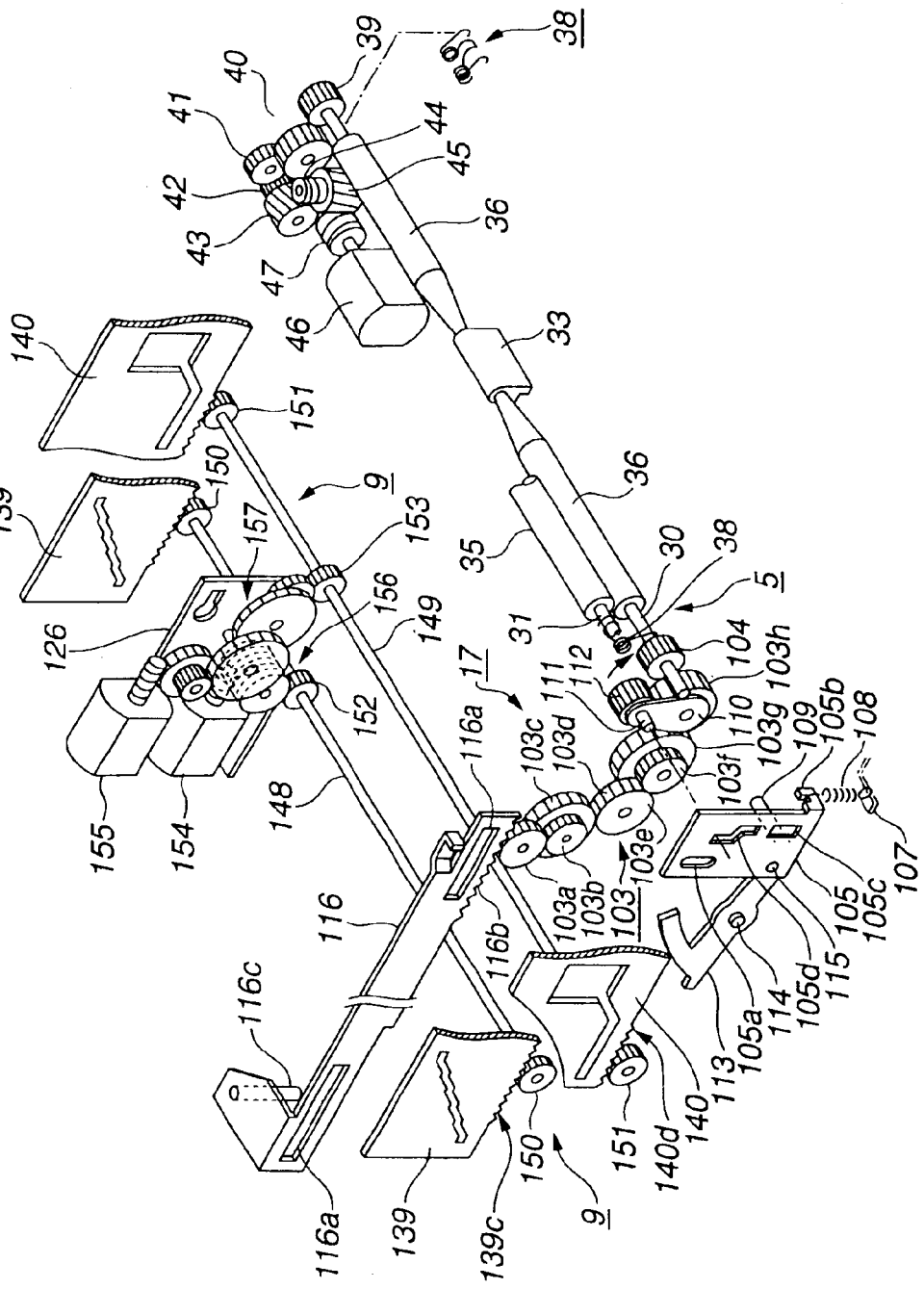

Described hereinafter is measures for driving the drive shaft 30. As is seen in FIG. 13, a gear 39 is fixed to a right end of the drive shaft 30. Inside the right side plate 1c, there are provided a gear 40, a gear 41, a gear 42, and a gear 43 which are rotatably supported. The gear 42 is integrated with the gear 43. Above the base plate 1e, there are provided a worm gear 44 and a gear 45 which are rotatably supported. The worm gear 44 meshes with the gear 43, and integrates with the gear 45. Moreover, a worm gear 47 is fixed to an output shaft of a conveyer motor 46 mounted to the base plate 1e, and meshes with the gear 45.

As is seen in FIG. 12, there is provided a pressing means 48 which automatically presses the CD by several millimeters after the roller 35 and roller 36 insert the CD. A set of three long guide holes, namely, a guide hole 49, a guide hole 50, and a guide hole 51 are formed horizontally above and below the insertion-ejection hole 4 of the front plate 1a. On right and left side of back side of the front plate 1a, there are provided a pair of slide bases 52. Three guide pins, namely, a guide pin 53, a guide pin 54, and a guide pin 55 are fixed to the slide base 52, and irremovably inserted, respectively, into the guide hole 49, the guide hole 50, and the guide hole 51. On a back side of each of the slide bases 52, there is provided a longitudinal roller 57 which is rotatably supported by way of a vertical shaft 56. The longitudinal roller 57 acts as a pressing means and is made of resin. For biasing the pair of the slide bases 52 toward each other, there are provided press-in springs 60 each of which is disposed between a spring hook 58 and a spring hook 59. The spring hook 58 is formed on the front plate 1a, while the spring hook 59 is formed on the slide base 52.

A pair of the longitudinal rollers 57 act as a pressing means 48. In addition, the pair of the longitudinal rollers 57 position the CD (positioning means of the CD). As is seen in FIG. 16(*a*) and FIG. 16(*b*), on the back side between the base plate 1*e* and the ceiling plate 1*d*, there are provided a positioning rod 172 and a positioning rod 173. On the other hand, as is seen in FIG. 12, there are provided a positioning rod 61*a* and a positioning rod 62*a* standing on the base plate 1*e*. Moreover, a positioning rod 61*b* is disposed on a line extending from the positioning rod 61*a*, while a positioning rod 62*b* is disposed on a line extending from the positioning rod 62*a*. As a result, the CD can be positioned at four points circumferentially.

Figure 17:
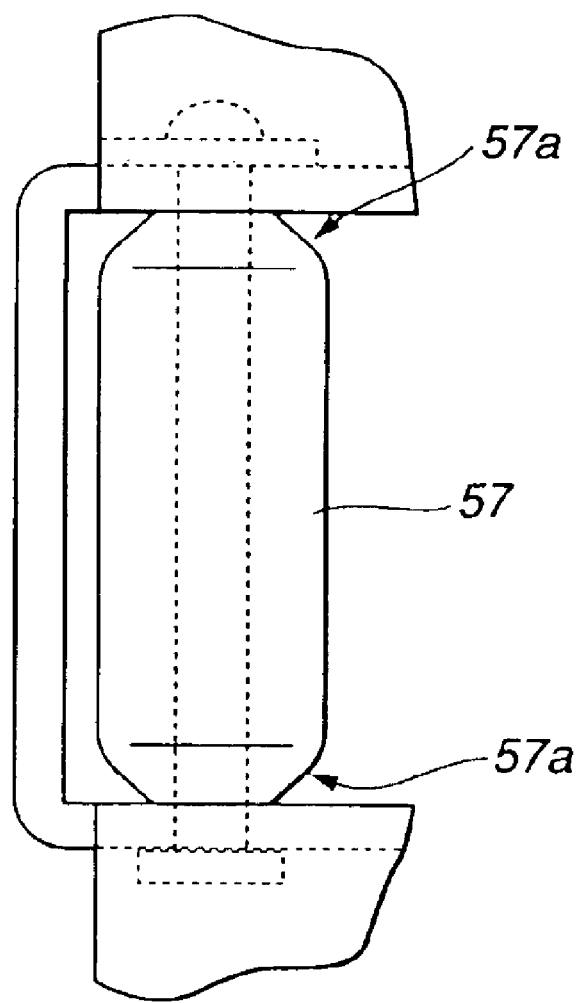
FIG. 17 is an enlarged view of the longitudinal roller.

On the other hand, for allowing insertion and ejection of the CD, a movable area is defined between the positioning rod 61*a* and the positioning rod 61*b* and between the positioning rod 62*a* and the positioning rod 62*b*. The CD in the movable area cannot be positioned by means of the positioning rod 61*a*, the positioning rod 61*b*, the positioning rod 62*a*, and the positioning rod 62*b*. In this case, the pair of the longitudinal rollers 57 may replace the positioning rod 61*a*, the positioning rod 61*b*, the positioning rod 62*a*, and the positioning rod 62*b*. The CD moves upward and downward together with the disk lift base 22. Therefore, as is seen in FIG. 17, the longitudinal roller 57 defines an upper end taper face 57*a* and a lower end taper face 57*a* for preventing the CD from interfering with the longitudinal roller 57.

(E) Opening-Closing Means

Described hereinafter is the opening-closing means 6 for opening and closing the insertion-ejection hole 4 of the front plate 1*a*. As is seen in FIG. 7, on the front side of the front plate 1*a*, there is provided a shutter 64 in such a manner as to move upward and downward. The shutter 64 is formed with a hole 64*a* for allowing the CD to pass therethrough. When the shutter 64 moves upward, a longitudinal intermediate position of the hole 64*a* occupies a boundary (hereinafter referred to as "insertion-ejection height") between the roller 35 and the roller 36, to thereby cause "open state." Downward movement of the shutter 64 causes "closed state."

A pair of guide pins 65 stand in upper and lower positions on right and left sides of the front plate 1*a*, while the shutter 64 is formed with a pair of guide holes 64*b* extending vertically. The guide pin 65 is inserted into the guide hole 64*b*, and has a head end mating with a retain ring. The pair of the guide pins 54 disposed in the vicinity of the center are longer than the guide pins 53 and the guide pins 55 so that the pair of the slide bases 52 can be largely spaced apart from each other only when the shutter 64 moves upward to "open state." The shutter 64 is formed with an L-shaped guide hole 64*c* into which the guide pin 54 is inserted.

Hereinafter described is a link mechanism for opening and closing the shutter 64. There is provided a right-left slide plate 66 having a cross section shaped substantially into an alphabetical L. Each of left side and right side of the right-left slide plate 66 has a front face and a lower face, each of which is formed with a long guide hole 66*a* extending rightward and leftward. On the other hand, guide pins 67 inserted into the guide holes 66*a* are fixed, respectively, to the front plate 1*a* and the base plate 1*e*. Lower ends on both sides of the shutter 64 are formed with cam holes 64*e*. Slide pins 66*b* are fixed respectively, to a right end and a left end on the front side of the right-left slide plate 66. The slide pin 66*b* is inserted into the cam hole 64*e*. As is seen in FIG. 31(*b*), a lower face of the right-left slide plate 66 is formed with a spring hook 66*c* protruding downward, while a lower face of the base plate 1*e* is formed with a spring hook 68 protruding downward. A return spring 69 is hooked between the spring hook 66*c* and the spring hook 68. On a left lower face of the base plate 1*e*, there is provided a forward-backward slide plate 70 moving forward and backward. More specifically, the forward-backward slide plate 70 is formed with a pair of guide holes 70*a*, while a headed pin (not shown) inserted into the guide hole 70*a* is fixed to the base plate 1*e*. As is seen in FIG. 12, there is provided a substantially L-shaped lever 72 having a bent section which is rotatably mounted to the lower face of the base plate 1*e* by way of a stationary shaft 73. The lever 72 has head ends formed respectively with long holes 72*a*. A pin 66*d* fixed to the right-left slide plate 66 mates with one of the long holes 72 defining therebetween a play, while a pin 70*b* fixed to the forward-backward slide plate 70 mates with the other of the long holes 72 defining therebetween a play. The forward-backward slide plate 70 is formed with a pressed portion 70*c* which is pressed by means of the outer slider 140 (to be described afterward).

(F) Reproducing Means

The reproducing means 7 is disposed in the vicinity of the back of the disk receiver 3 such that the disk player can be as small as possible in length. As is seen in FIG. 7, the sandwiching means 14 of the reproducing means 7 is mounted on the pickup lift base 10. Therefore, hereinafter described at first is the pickup lift base 10.

The pickup lift base 10 has a horizontal plate and vertical plates which are united on both sides of the horizontal plate. The horizontal plate has a front side which is formed with a cutout 10*a* shaped into a circular arc for receiving the CD. For moving the pickup lift base 10 upward and downward, a pair of pins 77 are fixed to each of the vertical plates in such a manner as to protrude horizontally. The pair of the pins 77 are disposed equal in height, and are shorter than the pair of the pins 22*b* of the disk lift base 22. The pins 77 are inserted into a pair of vertical slits 78 formed on each of the left side plate 1*b* and the right side plate 1*c* of the chassis 1, thereby protruding outward from the chassis 1.

(1) Controlling Means

As is seen in FIG. 7, there are provided separating cams 82 made of resin, which act as the controlling means 11. The separating cams 82 are disposed inside both vertical plates of the pickup left base 10 in such a manner as to move forward and backward. Moreover, the separating cams 82 are inserted into between adjacent trays 2 stacked upward and downward, to thereby form spaces above and below the CD (hereinafter such CD is referred to as "selected CD"). Moreover, the separating cams 82 control operations of inserting, ejecting and supporting the disk. Namely, an upper-front section of the vertical plate of the pickup lift base 10 is formed with a guide hole 10*e*, and a headed guide pin 82*a* inserted into the guide hole 10*e* is fixed to the separating cam 82. On the other hand, a guide hole 82*b* is formed on a lower section of the separating cam 82 as is seen in FIG. 8(*a*), and a headed guide pin 10*b* inserted into the guide hole 82*b* is fixed in an intermediate position [forward-backward] of the vertical plate of the pickup lift base 10.

The separating cams 82 are inserted toward the trays 2. Then, the separating cams 82 lift four pins (namely, two long pins 2*c* and two short pins 2*d*) on both sides of the tray 2, to thereby securely support the tray 2. Moreover, the separating cams 82 form spaces above and below the tray 2 that carries the CD to be reproduced. The separating cam 82 is formed of two laminated plates which are different in forward-backward length and formed with respective slits. Sliding the separating cams 82 to both sides of the tray 2 allows front section (of the separating cams 82) to move upward the pair of the long pins 2*c* of the tray 2, and allows back section (of the separating cams 82) to move upward the pair of the short pins 2*d* of the tray 2.

More specifically, as is seen in FIG. 35, there are formed a pair of first separating controllers 82c1 for moving upward the "selected tray 2 (for carrying the selected CD)" as well as the tray(s) 2 which is(are) disposed higher than the "selected tray 2." Above each of the first separating controllers 82c1, there is also provided a second separating controller 82c2 for moving upward the tray(s) 2 which is(are) disposed higher than the "selected tray 2." Between the first separating controller 82c1 and the second separating controller 82c2, there is formed a third separating controller 82d for holding only the selected tray 2. The first separating controllers 82c1, the second separating controllers 82c2, and the third separating controllers 82d constitute a separating controller. An upper face 82f and a lower face 82h are formed in a direction of the separating cam 82's movement. The upper faces 82f maintain positions of the long pin 2c and the short pin 2d of the tray 2 that is disposed higher than the selected tray 2. The lower faces 82h maintain positions of the long pin 2c and the short pin 2d of the tray 2 that is disposed lower than the selected tray 2. Moreover, the lower faces 82h act as a position restricting means for suppressing the receiving portion 2g of the plate spring 2e.

Progression of the first separating controllers 82c1 and the second separating controllers 82c2 moves upward the long pins 2c and the short pins 2d of the selected tray 2 and the tray(s) 2 which is disposed higher than the selected tray 2. Therefore, an angle θ is set at 45° and the like (constant). Herein, however, the trays 2 are moved upward with the coil spring 24 compressed. The higher the tray 2 is, the more compressed the coil spring 24 is. This increases a load which is applied when the tray 2 is moved upward. In other words, during the initial period of compression of the coil spring 24, the load is small. Therefore, as is seen in FIG. 35(a), the first separating controller 82c1 (upper) defines angle, for example, angle θ1=45°, while the second separating controller 82c2 (lower) defines, for example, angle θ2=60°. With θ1=45° and θ2=60°, a middle section between the angle θ1 and the angle θ2 can be formed into a circular arc, to thereby make the load constant.

Described hereinafter is the third separating controllers 82d, 82d. The third separating controllers 82d, 82d are constituted of the upper mating portions 82j, 82j, middle mating portions 82k, 82k as downward controlling section, and lower mating portions 82m, 82m. The upper mating portions 82k, 82j form spaces above and below the selected tray 2. The middle mating portions 82k, 82k drop the selected tray 2 together with the selected CD, so as to put the selected CD on a turn table 97 of the lower arm 13. The lower mating portions 82m, 82m drop again the selected tray 2 only, to thereby separate the selected tray 2 from the selected CD.

(2) Sandwiching Means

Figure 18:
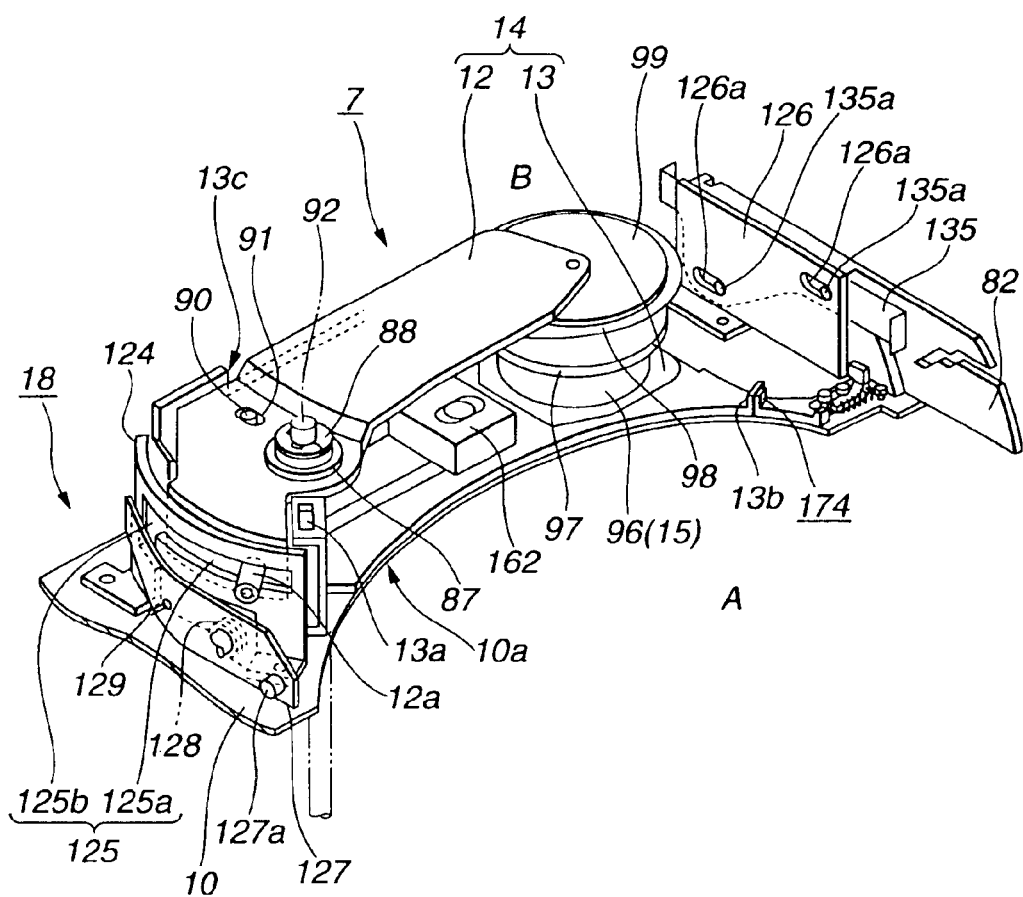
FIG. 18 is a perspective view of a reproducing means.
Figure 19:
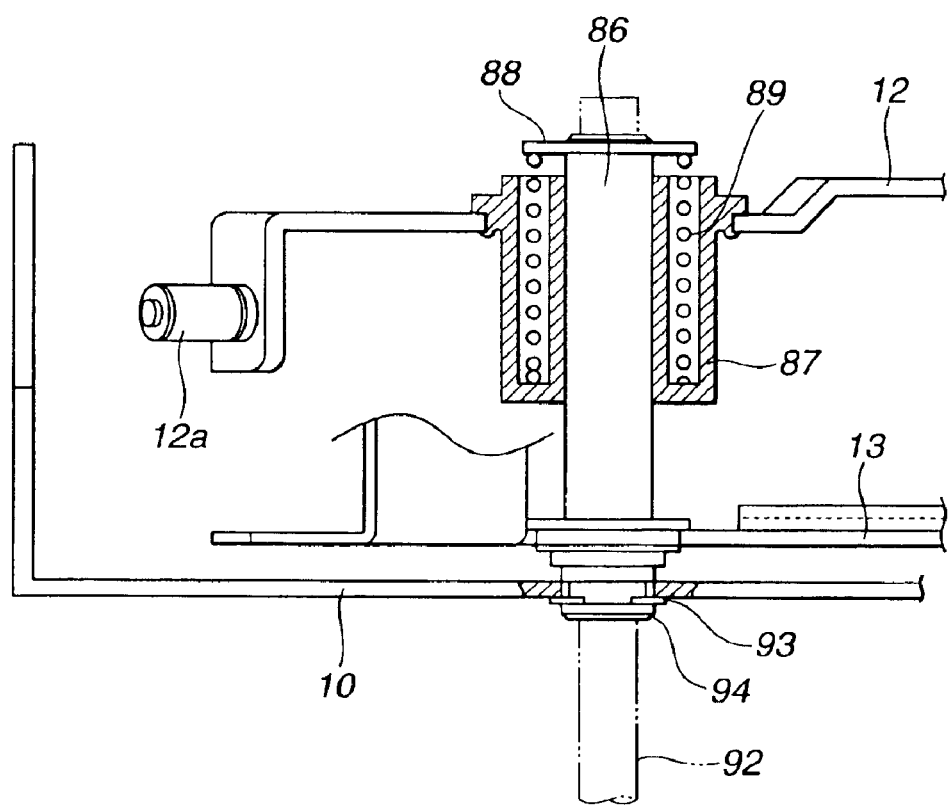
FIG. 19 shows an essential cross section of a sandwiching means.

Hereinafter described is the sandwiching means 14 for turning the selected CD toward the spaces (above and below the CD) formed by the controlling means 11, so as to sandwich the selected CD. Base ends of the lower arm 13 and the upper arm 12 are rotatably mounted on the left side of the pickup lift base 10. More specifically described as follows: As is seen in FIG. 19, a substantially lower end of a hollow shaft 86 is fixed to the lower arm 13. The lower end of the hollow shaft 86 rotatably penetrates through the pickup lift base 10. For retaining the hollow shaft 86, a flat washer 93 and a retain ring 94 are mounted to the lower end of the hollow shaft 86. A sleeve 87 made of copper alloy fixedly penetrates through the base end of the upper arm 12. The sleeve 87 penetrating through the hollow shaft 86 drops the selected CD for sandwiching the selected CD, with the lower arm 13 parallel to the upper arm 12. An upper end of the hollow shaft 86 fitted with a retain ring penetrates through a flat washer 88. Between the flat washer 88 and the sleeve 87, there is provided a hold spring 89 for biasing the upper arm 12 downward. Moreover, as is seen in FIG. 18, a slide pin 90 standing on the lower arm 13 penetrates through a hole 91 formed on the upper arm 12 so that the lower arm 13 and the upper arm 12 can make a synchronized and united revolution, instead of relative revolution. A support 92 standing on the base plate 1e penetrates through the hollow shaft 86 disposed on the pickup lift base 10, so as to improve accuracy of positioning the turn table 97 (to be described afterward) on the lower arm 13 relative to the CD when turning the sandwiching means 14.

Figure 20:
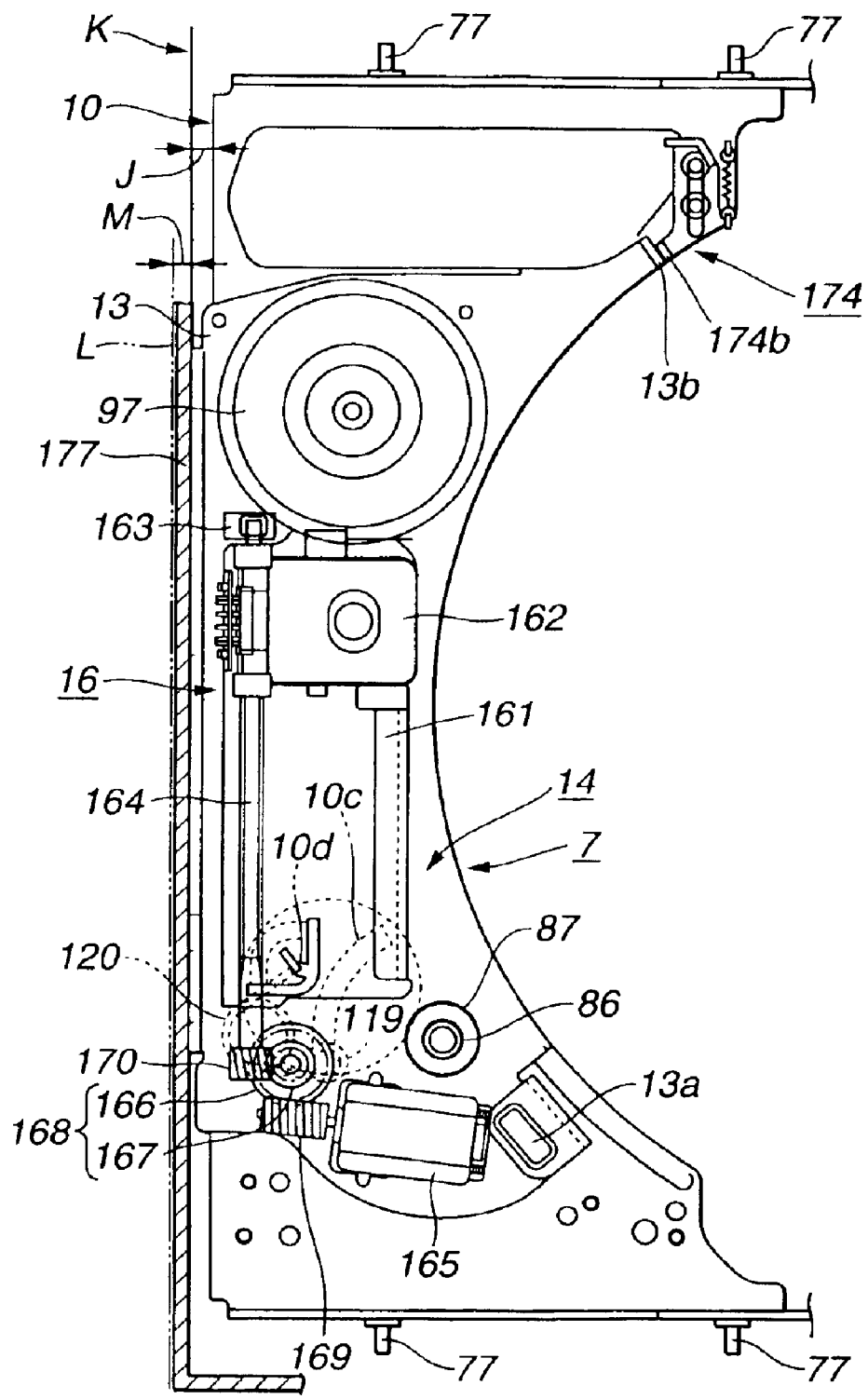
FIG. 20 is a plan view of a pickup unit.

As is seen in FIG. 20, during a period when CD is not reproduced, the sandwiching means 14 protrudes backward by a dimension J from the pickup left base 10 and from the chassis 1. The protrusion of the sandwiching means 14 appears to be a shift (by dimension J) of the sandwiching means 14 from its original position to left in FIG. 20 (backward). As a matter of fact, however, the chassis 1 is reduced in size by the dimension J for the following cause: The disk player is preferred as small as possible in backward length, since the disk player is to be received in a space defined in a dashboard in the vehicle. On the other hand, the vibration caused by vehicle travel is to be prevented from being transmitted to the disk player during a period when the CD is reproduced, which requires defining a gap between the chassis 1 and an inner wall (K) (of a case 177) for supporting floatably the chassis 1 in the case 177 via a spring (relaxation means). During non-reproduction period of the CD, however, the above gap between the chassis 1 and the inner wall (of the case 177) is not a must.

Figure 45:
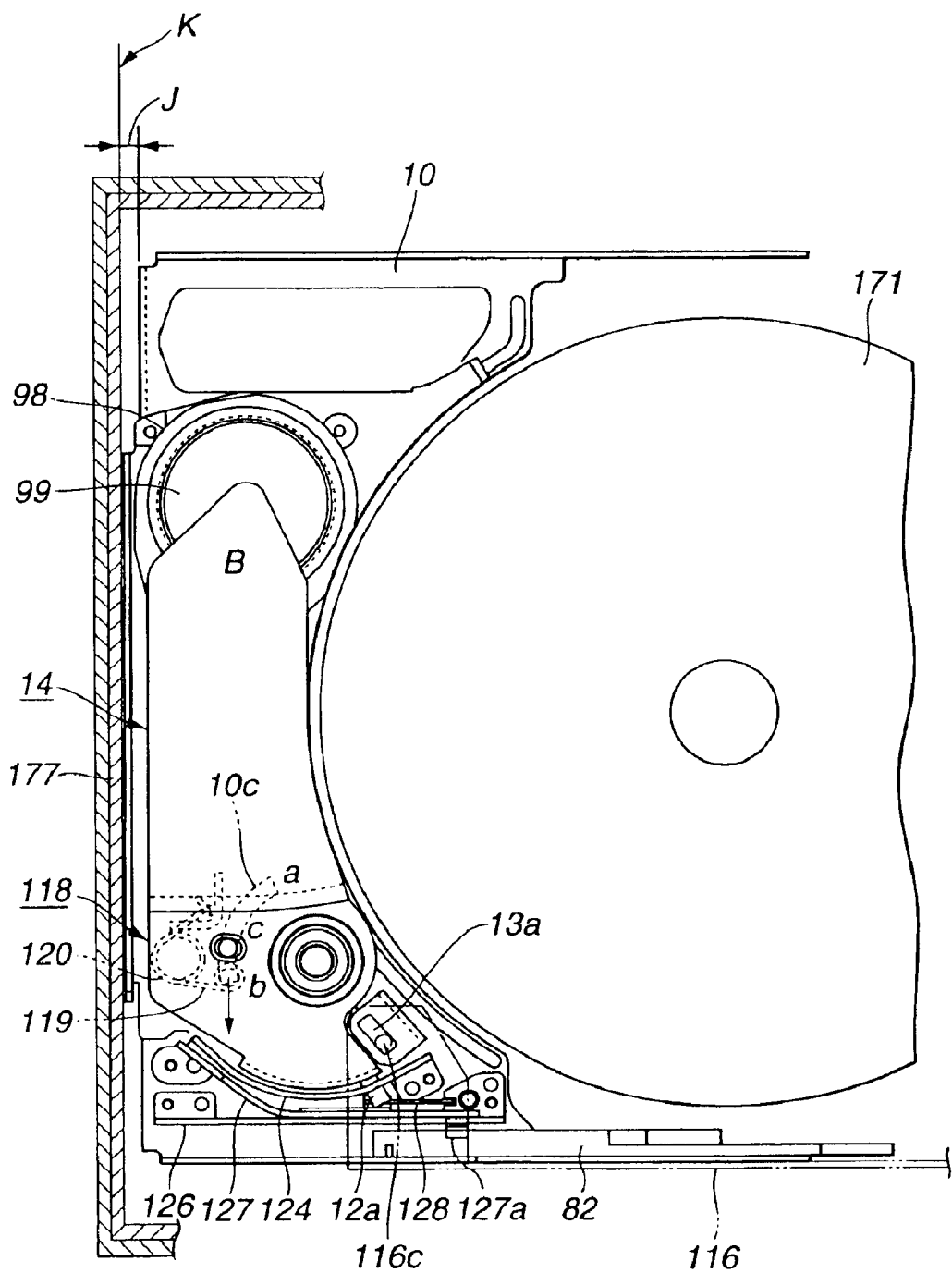
FIG. 45 is an explanatory operation view showing a state that the sandwiching means occupies a standby position.
Figure 46:
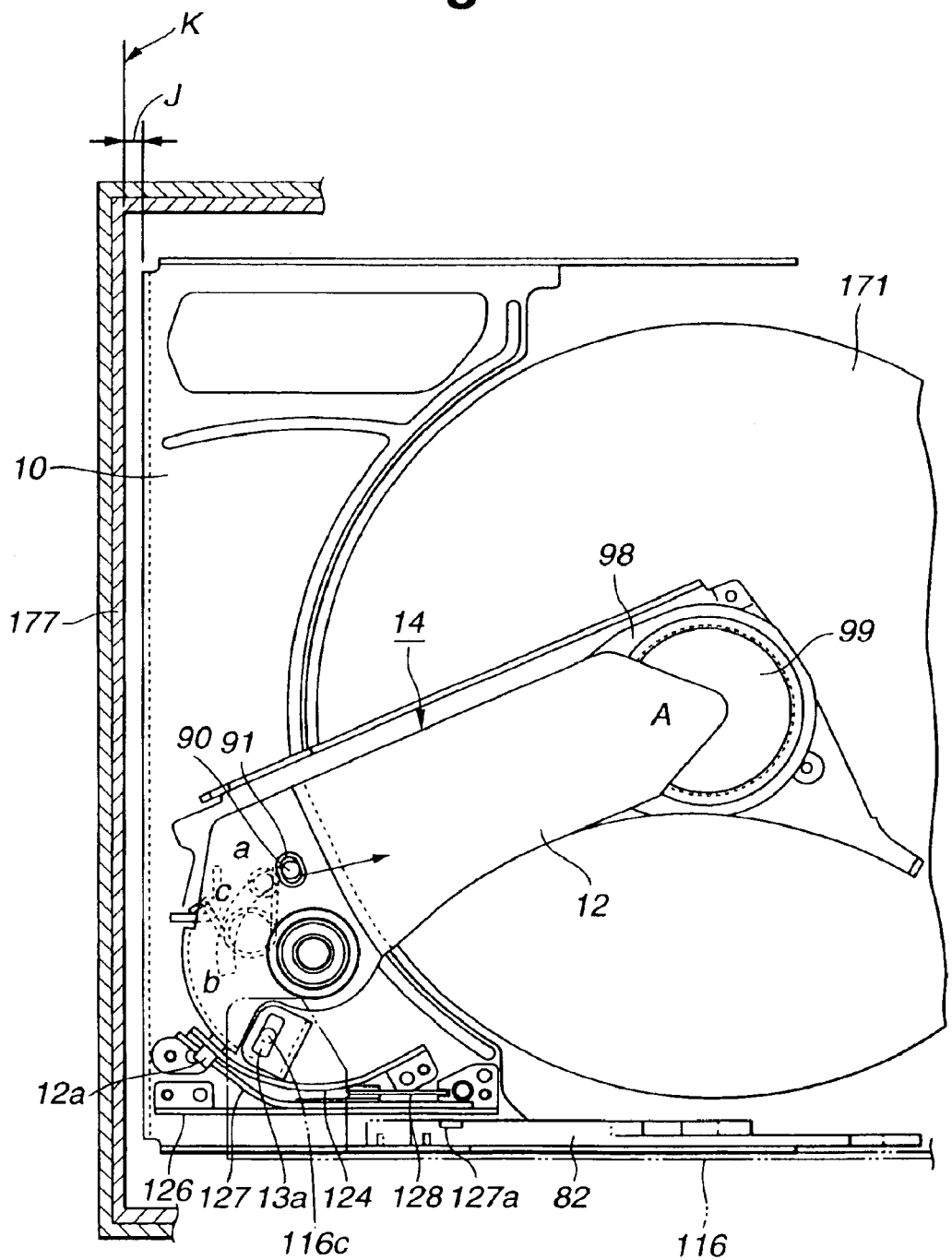
FIG. 46 is an explanatory operation view showing a state that the sandwiching means occupies a reproduction position.

Thereby, as is seen in FIG. 46, the sandwiching means 14 moves to a position A during reproduction period of the CD, causing a gap J between an inner wall K (of the case 177) and the chassis 1. Contrary to this, as is seen in FIG. 45, the sandwiching means 14 comes back to a position B during non-reproduction period of the CD, to thereby allow abutment of the inner wall K (of the case 177) on the chassis 1 (in fact, abutment on the sandwiching means 14 only). More specifically described as follows: Irrespective of reproduction period or non-reproduction period of the CD, the chassis 1 is so formed originally as to reach the inner wall K where the sandwiching means 14 is concealed, as is seen in FIG. 20. Therefore, it was necessary for defining a gap M to form an inner wall L that is assumedly disposed outside the inner wall K. However, it is only during the reproduction of the CD when the gap J is required. In other words, the original inner wall L can be shifted to the inner wall K. The above summarizes that the case 177 can be reduced by a dimension M, to thereby diminish the space occupied by the dashboard. The thus diminished space can be smaller than the conventional one.

(3) Disk Driving Means

There is provided the disk driving means 15 on an upper head face of the lower arm 13. More specifically, as is seen in FIG. 18, there is provided a spindle motor 96 having an output shaft. The turn table 97 engaging in a center hole of the CD is mounted to the output shaft of the spindle motor 96. On the other hand, as is seen in FIG. 49, a first end of a support plate 98 is fixed in the vicinity of a head end of the upper arm 12, while a second end of the support plate 98 is formed with a circular hole. Moreover, a chuck plate 99 made of resin rotatably mates in the hole from upward position. The chuck plate 99 acts as a disk holding means, and is formed with a rib protrusion circumferentially below a circular plate. There is provided a spring plate (not shown) having a first end fixed to a lower face of the upper arm 12, and a second end retaining the chuck plate 99. The CD is held by means of the turn table 97 and the chuck plate 99.

(4) Pickup Unit

The pickup unit 16 is installed on the upper face of the lower arm 13, as is seen in FIG. 20. Described hereinafter is constitution of the pickup unit 16. An optical pickup 162 is movably disposed in a longitudinal direction of the lower arm 13 by way of a guide rail 161 which is united with the lower arm 13. There is provided a means for moving the optical pickup 162 (round trip) along the guide rail 161. A screw shaft 164 is rotatably supported on the upper face of the lower arm 13 by way of a pair of bearing members 163, while a female screw (not shown) of the optical pickup 162 screws down on the screw shaft 164. The screw shaft 164 interlocks with an output shaft of a scan motor 165 which is fixed in the vicinity of the sleeve 87. More specifically, a gear 168 constituted of a worm wheel 166 united with a screw gear 167 is rotatably supported, and a worm gear 169 of the output shaft (of the scan motor 165) meshes with the worm wheel 166. On the other hand, a screw gear 170 mounted to the screw shaft 164 meshes with the screw gear 167.

(5) Rotary Force Supplying Means

Hereinafter described is constitution of the rotary force supplying means 17 for turning the sandwiching means 14 by the driving force of the conveyer motor 46. Inside the left side plate 1b of the chassis 1, there is provided a gear row 103, as is seen in FIG. 13. More specifically, the gear row 103 is constituted of a gear 103a, a gear 103b, a gear 103c, a gear 103d, a gear 103e, a gear 103f, a gear 103g, and a gear 103h. On the other hand, a gear 104 is fixed to a left end of the drive shaft 30. Inside the left side plate 1b, there is provided a plate 105 in such a manner as to move vertically. More specifically, an upper section of the plate 105 is formed with a guide hole 105a. A guide pin 106 (refer to FIG. 43) inserted into the guide hole 105a is fixed to the left side plate 1b, and is fitted with a retain ring. A lower section of the plate 105 is formed with a spring hook 105b, while the base plate 1e of the chassis 1 is formed with a spring hook 107. Between the spring hook 105b and the spring hook 107, there is provided a return spring 108 for biasing the plate 105 downward. The plate 105 is formed with a relief hole 105c for a shaft 109 of the gear 103h to penetrate through. The shaft 109 is fixed to the left side plate 1b. A base end section of a lever 110 is rotatably mounted to the shaft 109. A transitional shaft 111 is fixed to a head end of the lever 110 in such a manner as to penetrate through the lever 110. A gear 112 meshing with the gear 103h rotatably mounts to the transitional shaft 111. The plate 105 is also formed with a cam hole 105d which is disposed above the relief hole 105c. An end of the transitional shaft 111 penetrates through the cam hole 105d. Moving the plate 150 upward moves the cam hole 105d upward, to thereby move the transitional shaft 111 (through the cam hole 105d) toward the front face. With this, the gear 112 mounted to the transitional shaft 111 meshes also with the gear 104 of the drive shaft 30. For moving the plate 105 upward, a middle section of a lever 113 is pivotally supported to inside of the left side plate 1b by way of a pin 114, while a first end of the lever 113 is pivotally coupled to a lower section of the plate 105 by way of a pin 115. A second end of the lever 113 faces a lower portion of one (that is disposed on the front side) of the pair of guide holes 25 of the left side plate 1b through which the pins 22b of the disk lift base 22 are inserted. In other words, in the reproduction mode of the CD when the disk lift base 22 in its lowest position, the pin 22b presses downward the second end of the lever 113, so that the gear 112 can mesh with the gear 104.

The gear 103a that is disposed highest in the gear row 103 interlocks with the lower arm 13 of the sandwiching means 14 in the following manner: As is seen in FIG. 7, there is provided a slide bar 116 which is constituted of a long vertical section extending forward and backward, and a horizontal section which is united with a back side of the vertical section. A pair of guide holes 116a are formed in the vicinity of both ends of the vertical section of the slide bar 116. As is seen in FIG. 12, a pair of guide pins 117 fixed inside the left side plate 1b are inserted, respectively, into the pair of the guide holes 116a. Each of the guide pins 117 is fitted with a retain ring. The slide bar 116 which is thus slidable forward and backward has a front lower section formed with a rack 116b. The rack 116b meshes with the gear 103a. Moreover, an engagement pin 116c protruding downward defines an upper end which is fixed to a head end of the horizontal section disposed on the back side of the slide bar 116. As is seen in FIG. 18, the engagement pin 116c engages with a long hole 13a defining therebetween a play. The long hole 13a is formed in a horizontal section of the lower arm 13. Herein, horizontal section is united with a base end section of the lower arm 13, and extends vertically as high as the upper arm 12. As is seen in FIG. 20, the long hole 13a is formed along a line which extends in such a manner as to pass through an axial center of the sleeve 87 and which extends radially in such a manner as to form orthogonality relative to the sleeve 87.

(6) Arm Positioning Means

The disk player has two operation states, one is the insertion-ejection mode for inserting the CD into the disk receiver 3 and ejecting the CD from the disk receiver 3, the other is the reproduction mode for reproducing the CD. In the insertion-ejection mode, the sandwiching means 14 occupies the position B, as is seen in FIG. 45. In the reproduction mode, the sandwiching means 14 occupies the position A, as is seen in FIG. 46. The sandwiching means 14 is turned between the position B and the position A by way of the rotary force supplying means 17, as described above. For effecting more accurate positioning of the CD relative to the turn table 97 (on the lower arm 13), however, there is provided a positioning means 118, as is seen in FIG. 22.

Hereinafter described is constitution of the positioning means 118. As is seen in FIG. 20 and FIG. 22, an upper end of a positioning pin 119 protruding downward is fixed in the vicinity of the hollow shaft 86 on the lower arm 13. On the other hand, the pickup lift base 10 is formed with an arc hole 10c corresponding to a movable area defined by the positioning pin 119 when the positioning pin 119 is moved in accordance with pivotal movement of the sandwiching means 14. The positioning pin 119 mates with the arc hole 10c defining therebetween a play. The pickup lift base 10 is formed with a spring hook portion 10d protruding downward. A toggle spring 120 has both ends hooking respectively with the spring hook portion 10d and the positioning pin 119. Herein, the positioning pin 119 occupies a position b and position a when the sandwiching means 14 occupies, respectively the position B and the position A. In this case, a position c disposed in the middle between the position b and the position a can be defined as a change point for changing direction of movement of the positioning pin 119. The spring hook portion 10d is disposed in a position corresponding to the position c.

(7) Arm Locking Means

During the period when the CD is not reproduced, vibration attributable to the traveling vehicle may cause the sandwiching means 14 to jump out of the position B (position for receiving the sandwiching means 14 constituting the reproducing means 7) in FIG. 18. Therefore, there is provided an arm locking means for locking the sandwiching means 14 in the position B. Hereinafter described is constitution of the arm locking means. As is seen in FIG. 18, the head end of the lower arm 13 extends long along the circular arc cutout 10a of the pickup lift base 10. At the head end of the lower arm 13, there is formed an engagement portion 13b standing upward.

Figure 24:
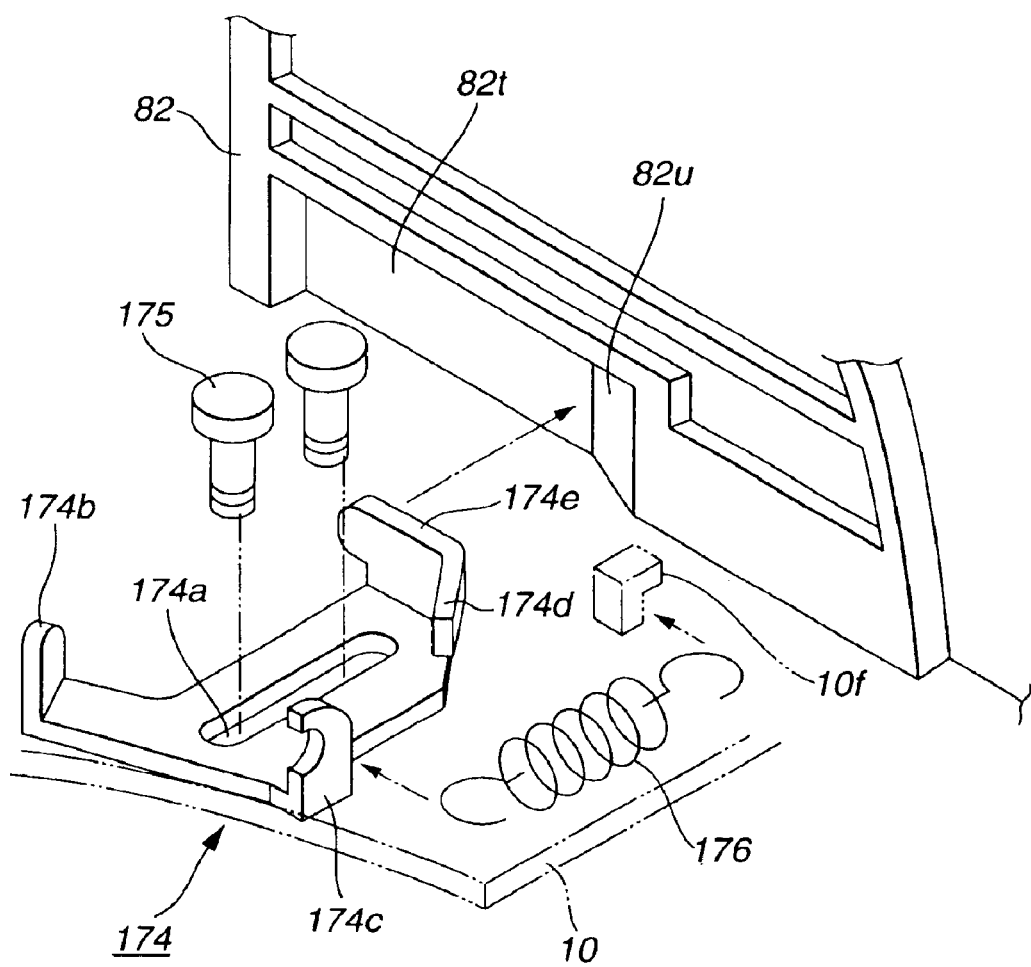
FIG. 24 is an exploded perspective view of the arm locking means.

On the other hand, there is provided a lock member 174 for locking the lower arm 13 in such a manner as to abut on the engagement portion 13b. As is seen in FIG. 24, a pair of headed pins 175 are inserted into a long hole 174a which is formed in the lock member 174, to thereby couple the lock member 174 to the pickup lift base 10. Thus, the lock member 174 is disposed in such a manner as to slide rightward and leftward, forming orthogonality relative to sliding direction of the separating cam 82. The lock member 174 is formed with a lock portion 174b (abutting on the engagement portion 13b) and a spring hook 174c. Between the spring hook 174c and a spring hook 10f (on the pickup lift base 10), there is provided a spring 176. The spring 176 acts as a returning means for biasing the lock 174b in a direction away from the engagement portion 13b. Moreover, there is provided an ejection mechanism for ejecting the lock portion 174b toward the engagement portion 13b, opposing the biasing force by the spring 176. As a driving means for driving the lock member 174, the separating cam 82 (as the controlling means 11) is utilized. Opposing the separating cam 82, the lock member 174 has a section which is formed with a taper portion 174d and a slide portion 174e standing in a form of an alphabetical L. Of the pair of the right and left separating cams 82 as is seen in FIG. 7, the right separating cam 82 is formed with a dent portion 82t for receiving the taper portion 174d and the slide portion 174e. Moreover, an inner wall of the dent portion 82t is formed with a taper face 82u.

(8) CD Positioning Means

Figure 21:
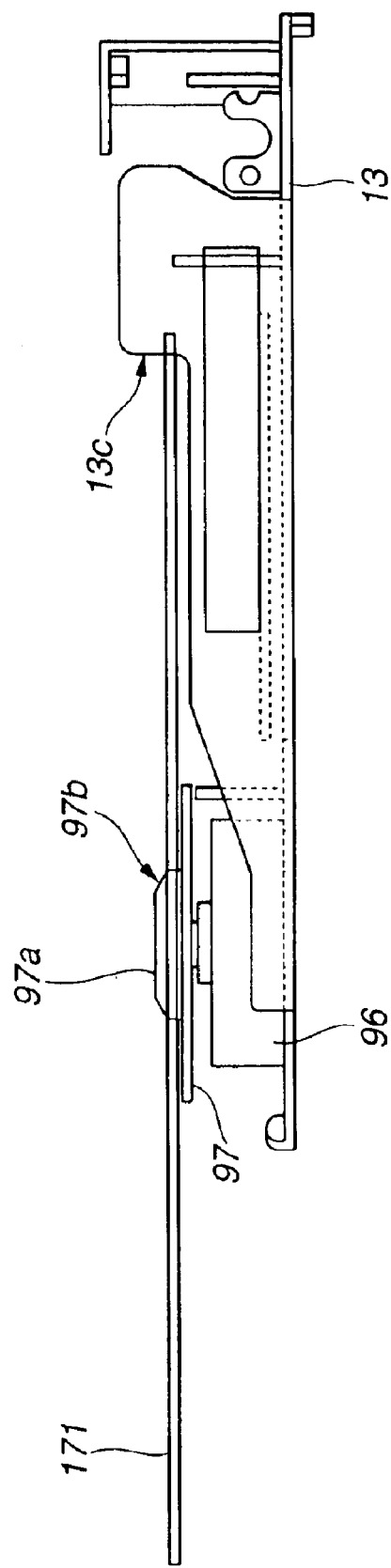
FIG. 21 is an explanatory view of a CD positioner disposed at a lower arm.
Figure 23:
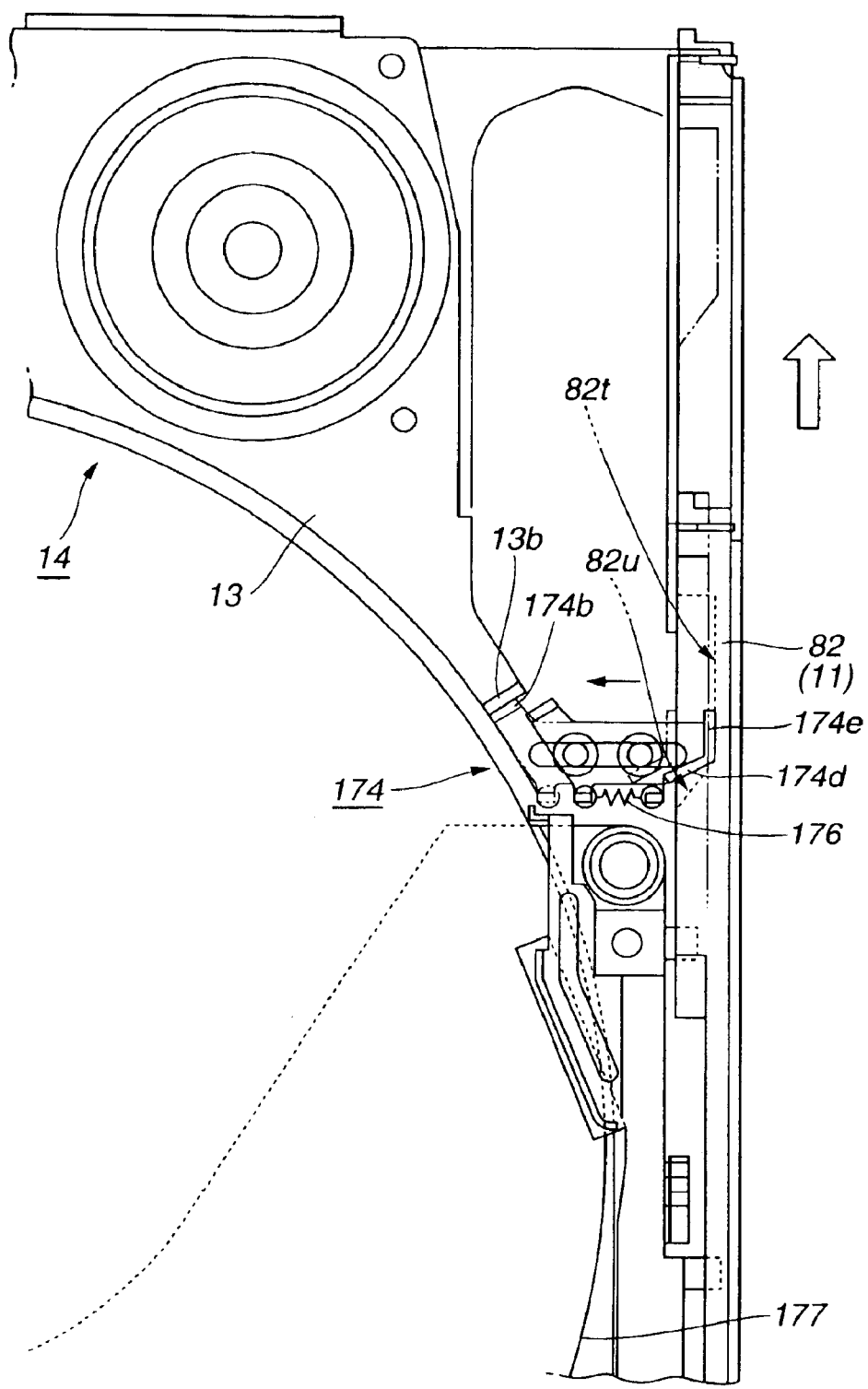
FIG. 23 is a plan view showing an area in the vicinity of arm locking means.

Positioning of the CD relative to the chassis 1 is effected by four positioning rods (FIG. 16) disposed circumferentially, as described above. On the other hand, for positioning the CD relative to the turn table 97, there is formed a CD positioner 13c, as is seen in FIG. 18. More specifically, the CD positioner 13c is disposed at a raised section on the base end side of the lower arm 13 (mounting the turn table 97) in such a manner as to form substantially orthogonality to a horizontal face of the pickup lift base 10. As is seen in FIG. 21, the CD 171 is positioned as the CD 171 lowers along an inclined face 97b of a cone frustum 97a which is formed on the turn table 97. The CD positioner 13c is determined such that a slight gap can be defined between the CD 171 and the CD positioner 13c when the CD is securely mounted. The CD positioner 13c has an outer face which is in a form of an arc R, so as not to damage the CD.

(9) Regulating Means

The upper arm 12 of the sandwiching means 14 is biased downward with the hold spring 89. As is seen in FIG. 18, there is provided the regulating means 18 for regulating timing when the biasing force of the hold spring 89 lowers the upper arm 12. More specifically described below.

On the upper face of the pickup lift base 10, there is provided a cylindrical plate 124 standing between the sandwiching means 14 and the separating cam 82. The cylindrical plate 124 is formed with a part of cylinder around the sleeve 87. As is seen in FIG. 47 and FIG. 48, the cylindrical plate 124 is formed with an alphabetically L-shaped guide hole 125 which is constituted of a horizontal portion 125a extending circumferentially and a vertical portion 125b extending axially. On the other hand, a guide pin 12a is fixed to the base end of the upper arm 12, in such a manner as to protrude radially outward around the sleeve 87. The guide pin 12a is inserted into the guide hole 125. As is seen in FIG. 18, when the sandwiching means 14 occupies the position B (standby position) and when the sandwiching means 14 moves from the position B to being on the eve of occupying the position A (reproduction position), the guide pin 12a is positioned in the horizontal portion 125a of the guide hole 125. Thus, applying the biasing force of the hold spring 89 may not lower the upper arm 12, thereby keeping the sandwiching means 14 open. On the other hand, when the sandwiching means 14 reaches the position A, the guide pin 12a is positioned in the vertical portion 125b. Thus, applying the biasing force of the hole spring 89 may lower the upper arm 12, thereby lowering the guide pin 12a to the lower end of the vertical portion 125b.

There are provided a first regulating means and a second regulating means. The first regulating means temporarily regulates downward movement of the guide pin 12a such that the sandwiching means 14 does not carry out sandwiching operation until receiving an instruction. In other words, the first regulating means prevents the sandwiching means 14 from carrying out the sandwiching operation soon after the guide pin 12a pivotally reaches the vertical portion 125b of the guide hole 125 when the sandwiching means 14 pivotally reaches the position A in FIG. 18. On the other hand, the second regulating means allows the separating cam 82 to move forward after the regulation, thereby lowering the selected CD and the selected tray 2. Then, when the selected CD is put on the turn table 97, the second regulating means cancels the regulation, to thereby sandwich the selected CD. More specifically described as follows concerning constitution of the first regulating means and the second regulating means. Between the cylindrical plate 124 and the separating cam 82 on the pickup lift base 10, there is provided a bearing plate 126 standing parallel to the separating cam 82, as is seen in FIG. 18 and FIG. 45. Inside the bearing plate 126, middle section of a constraint lever 127 is rotatably supported by way of a rotary shaft 129. A pin 127a protruding outward is fixed to a front side of the constraint lever 127. Back side of the constraint lever 127 is so bent inward as to face the vertical portion 125b of the guide hole 125. As is seen in FIG. 45, there is provided a spring 128 for biasing downward the back side of the constraint lever 127. On the other hand, the pin 127a on the front side of the constraint lever 127 mates with a cam groove 82r (formed on inside lower section of the separating cam 82) defining therebetween a play, as is seen in FIG. 47. The cam groove 82r is disposed only on the left separating cam 82 of the pair of the right and left separating cams 82. There is formed a relief section on upper back side of the cam groove 82r. More specifically, the relief section is constituted such that when the separating cam 82 moves forward and thereby the long pin 2c and the short pin 2d of the selected tray 2 mate with the respective middle mating portions 82k and 82k, the pin 127a can be moved to the relief section of the cam groove 82r. Thus, the constraint lever 127 is turned by means of the spring 128. Then, the hold spring 89 biases the upper arm 12 downward.

(G) Ejecting Means

As is seen in FIG. 33, a pair of the ejecting means 8 are disposed respectively on right side and left side in the chassis 1. Disposing the ejecting means 8 pairwise is attributable to the following causes: Firstly, when the to-beejected CD coexists with any other upper and/or lower CD(s), a lever having small height is to be used for ejecting only the to-be-ejected CD without causing interference with the other CD(s). Secondly, the biasing force of the pair of the plate springs 2e toward the tray 2 is responsible for vertical positioning of the CD. Some small external force may incline the CD, opposing the biasing force of the plate springs 2. Therefore, only a single ejecting means 8 may fail to abut on the CD. For securing abutment on the CD, the ejecting means 8 are disposed pairwise.

Figure 6:
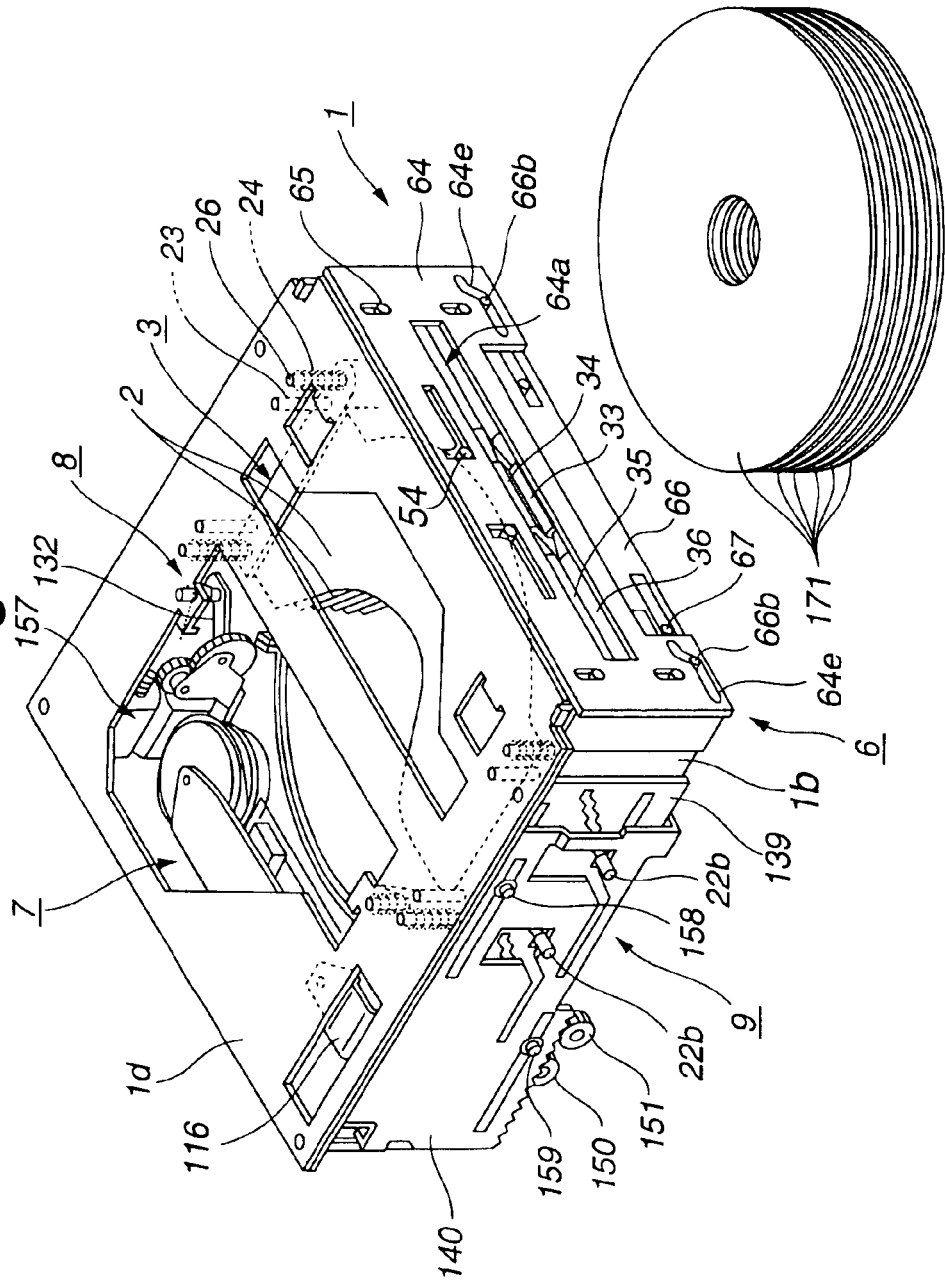
FIG. 6 is an external perspective view of a disk player, showing a disk recording and/or reproducing apparatus, according to a mode for carrying out the invention.

The pair of the right ejecting means and the left ejecting means are substantially the same in constitution. Therefore, the following description is only one of the pair of the ejecting means. As is seen in FIG. 6 and FIG. 33, an ejector lever 132 for pivotally ejecting the CD is pivotally mounted to a stationary shaft 133 protruding downward from the ceiling plate 1d of the chassis 1. The ejector lever 132 is set at a height defined between the roller 35 and the roller 36, namely insertion-ejection height. Moreover, there is provided a return spring 134 having a first end hooked with a spring hook 132a formed on the ejector lever 132, and a second end hooked with a spring hook formed on the ceiling plate 1d.

On the other hand, the ejector lever 132 is so constituted as to pivot by moving the separating cam 82 backward, opposite to forward movement of the separating cam 82 for forming the space as described above. More specifically described as follows. As is seen in FIG. 18, outside the bearing plate 126, there is provided a plate 135 in such a manner as to slide forward and backward at a predetermined distance. In other words, the bearing plate 126 is formed with a pair of guide holes 126a, while a pair of guide pins 135a inserted into the respective guide holes 126a are fixed to the plate 135. Front end of the plate 135 is bent inward in such a manner as to engage with a pressed area 132b which is united with the ejector lever 132. Back end of the plate 135 is bent outward in such a manner as to face the back of the separating cam 82.

(H) Operating Means

Hereinafter described finally is the operating means 9. In the insertion-ejection mode, the operating means 9 allows insertion-ejection of the CD on the tray 2 on each stage by moving upward and downward the disk lift base 22. Moreover in the insertion-ejection mode, the operating means 9 opens the opening-closing means 6 and operates the ejecting means 8. In the reproduction mode, the operating means 9 moves upward and downward the pickup lift base 10 so as to select the selected CD, with the disk lift base 22 kept in the lowermost position. Moreover in the reproduction mode, the operating means 9 operates the controlling means 11, and operates the regulating means 18.

As is seen in FIG. 7 and FIG. 25, outside the left side plate 1b and the right side plate 1c of the chassis 1, there are provided an inner slider 139 and an outer slider 140 which are slidable forward and backward. Since the left side plate 1b and the right side plate 1c are symmetrical, the following description is only one of the left side plate 1b and the right side plate 1c. Outer face of the outer slider 140 is formed with a pair of locked portions 210 (pins) of the lock mechanism 204. As described above, the pair of the locked portions 210 (pins) are inserted respectively into a pair of the locking portions 211 disposed in the first plate 205.

In the above description, the inner slider 139 has an upper section and a lower section formed respectively with guide holes 139a, while the outer slider 140 has an upper section and a lower section formed respectively with guide holes 140a. A guide pin 158 and a guide pin 159 are inserted into both the guide hole 139a and the guide hole 140a. The guide pin 158 and the guide pin 159 are fitted with retain rings. Back side of the inner slider 139 is formed with a pair of stepwise slits 141 for moving at six steps upward and downward the pair of the pins 77 (of the pickup lift base 10) protruding through the vertical slits 78. Front side of the inner slider 139 is formed with a pair of stepwise slits 142 for moving at six steps upward and downward the pair of the pins 22b (of the disk lift base 22) protruding through the vertical slits 25. Below each of the stepwise slits 142, there is provided a floor slit 143 which is continuous with the stepwise slit 142. In the reproduction mode, the floor slit 143 keeps the disk lift base 22 in the lowermost position, and moves only the pickup lift base 10 upward and downward. On the other hand, the outer slider 140 is formed only with slits for receiving the pair of the pins 22b (long pin) of the disk lift base 22. More specifically, the outer slider 140 is formed with a pair of insertion-ejection mode slits 144, a pair of reproduction mode slits 145, and a pair of switch slits 146. The insertion-ejection mode slits 144 are substantially square, and move upward and downward the pair of the pins 22b which are allowed in the stepwise slits 142. The reproduction mode slits 145 are substantially horizontal, and keep in the lowermost position the pair of the pins 22b which are allowed in the floor slits 143. The switch slits 146 are inclined at 45°. Each of the switch slits 146 has a lower taper face 146a and an upper taper face 146b for moving upward and downward the pin 22b with the outer slider 140 moved horizontally. The thus moved pair of the pins 22b change positions between the pair of the stepwise slits 142 and the pair of the floor slits 143. The insertion-ejection mode slit 144, the switch slit 146, and the reproduction mode slit 145 are formed continuously. Leveling one reproduction mode slit 145 with the other reproduction mode slit 145 may overlap the two reproduction mode slits 145. Thus, the following pairwise slits and pairwise pins are different in height from each other: the reproduction mode slits 145, the insertion-ejection mode slits 144, the floor slits 143, the stepwise slits 142, and the pins 22b (to be inserted into the reproduction mode slits 145, the insertion-ejection mode slits 144, the floor slits 143, and the stepwise slits 142).

Back upper portion of the outer slider 140 is bent inward orthogonally, to thereby form a protrusion 140b. Back portions of the inner slider 139 and the left side plate 1b are, respectively, formed with a relief cutout 139b and a relief slit 147, so as to allow movement of the protrusion 140b together with the outer slider 140. As is seen in FIG. 7, an engagement groove 82s extends vertically outside the back portion of the separating cam 82 and the protrusion 140b slidably mates with the engagement groove 82s, so as to allow the separating cam 82 to slide integrally with the outer slider 140 irrespective of height of the separating cam 82 which moves upward and downward together with the pickup lift base 10. Moreover, on the front side of the outer slider 140 disposed on the left side, there is formed an engagement portion 140c which is bent toward below the base plate 1e of the chassis 1. The engagement portion 140c presses the pressed portion 70c when the outer slider 140 slides backward, to thereby open the shutter 64 opposing the biasing force of the return spring 69.

Described hereinafter is a driving mechanism for allowing synchronous sliding operations of the right inner slider 139 with the left inner slider 139 as well as the right outer slider 140 with the left outer slider 140. As is seen in FIG. 7 and FIG. 13, on the back side below the base plate 1e of the chassis 1, a connector shaft 148 and a connector shaft 149 are rotatably supported by way of two pairs of bearings. The connector shaft 148 has both ends fixed with pinions 150, while the connector shaft 149 has both ends fixed with pinions 151. The pinion 150 meshes with a rack 139c which is formed at a lower back portion of the inner slider 139, while the pinion 151 meshes with a rack 140d which is formed at a lower back portion of the outer slider 140. A gear 152 is fixed to the connector shaft 148, while a gear 153 is fixed to the connector shaft 149. Moreover, the gear 152 is interlocked with an operation motor 154, while the gear 153 is interlocked with an operation motor 155. More specifically described as follows: The operation motor 154 is disposed at lower inside of the bearing plate 126 which is disposed on the right back side of the chassis 1, while the operation motor 155 is disposed at upper inside of the bearing plate 126. The operation motor 154 has an output shaft which is interlocked with the gear 152 by way of a decelerating means 156 disposed inside the bearing plate 126, while the operation motor 155 has an output shaft which is interlocked with the gear 153 by way of a decelerating means 157 disposed inside the bearing plate 126.

Described hereinafter is operation of the disk player.

(I) Overall Constitution of Operation

Operations of the disk player include what is called insertion-ejection mode and what is called reproduction mode. More specifically, the insertion-ejection mode includes inserting the CD into the disk receiver 3 and ejecting the CD from the disk receiver 3, while the reproduction mode reproduces one CD that is selected from a plurality of the CDs received in the disk receiver 3 as stock. Hereinafter described are above three operations.

(J) Insert CD (Insertion-Ejection Mode)

Inserting the CD into the disk receiver 3 takes the following steps: Select one of the numbers which are respectively assigned to the trays 2 in a manner from 1 to 6 downward. For example, select "2". Then, press a button "2" (not shown). Then, press an insertion button (not shown). Rotation of the output shaft of the operation motor 154 is conveyed to the decelerating means 156 and then to the connector shaft 148, allowing sliding movement of the pair of the inner sliders 139. Independently of the inner sliders 139, rotation of the output shaft of the operation motor 155 is conveyed to the decelerating means 157 and then to the connector shaft 149, allowing sliding movement of the pair of the outer sliders 140. The pair of the pins 22b are inserted respectively into the pair of the insertion-ejection model slits 144 of the outer slider 140. Pressing the button when the pair of the pins 22b are, for example, in a mode switching position in the disk insertion-ejection mode as is seen in FIG. 26(a) will move the inner sliders 139 backward. Thereby, as is seen in FIG. 27(a), the pair of the pins 22b move upward to the second lowest step of the respective stepwise slits 142. Together with the movement of the pins 22b, the disk lift base 22 also moves upward such that the CD on the second uppermost tray 2 is set at the insertion-ejection height. At this point in time, the pickup lift base 10 shows simultaneous upward movement, although it is an unnecessary movement. Allowing further backward movement of the inner sliders 139 moves the pickup lift base 10 upward together with the pins 22b, such that the trays 2 in order of precedence (namely, third, fourth, fifth and sixth) reach the insertion-ejection height.

In the standby position as is seen in FIG. 26(a), the locked portion 210 of the lock mechanism 204 is disposed in a location A in the lock groove 212 of the locking portion 211, as is seen in FIG. 26(b).

Then, allowing backward movement of the outer slider 140 to such an extent that the pin 22b comes to the middle position (forward-backward direction) in the insertion-ejection slit 144 from a standby position as is seen in FIG. 27(a) will cause the engagement portion 140c of the outer slider 140 to press the pressed portion 70c in FIG. 7 backward below the base plate 1e. Thereby, movement of the forward-backward slide plate 70 is conveyed to the right-left side plate 66 by way of the lever 72, to thereby move the right-left slide plate 66 leftward opposing the biasing force of the return spring 69. This moves the shutter 64 upward, to thereby open the insertion-ejection hole 4, as is seen in FIG. 31(b). The above backward movement of the outer slider 140 causes the locked portion 210 of the lock mechanism 204 to move to a location B of the lock groove 212, as is seen in FIG. 26(b).

Figure 32:
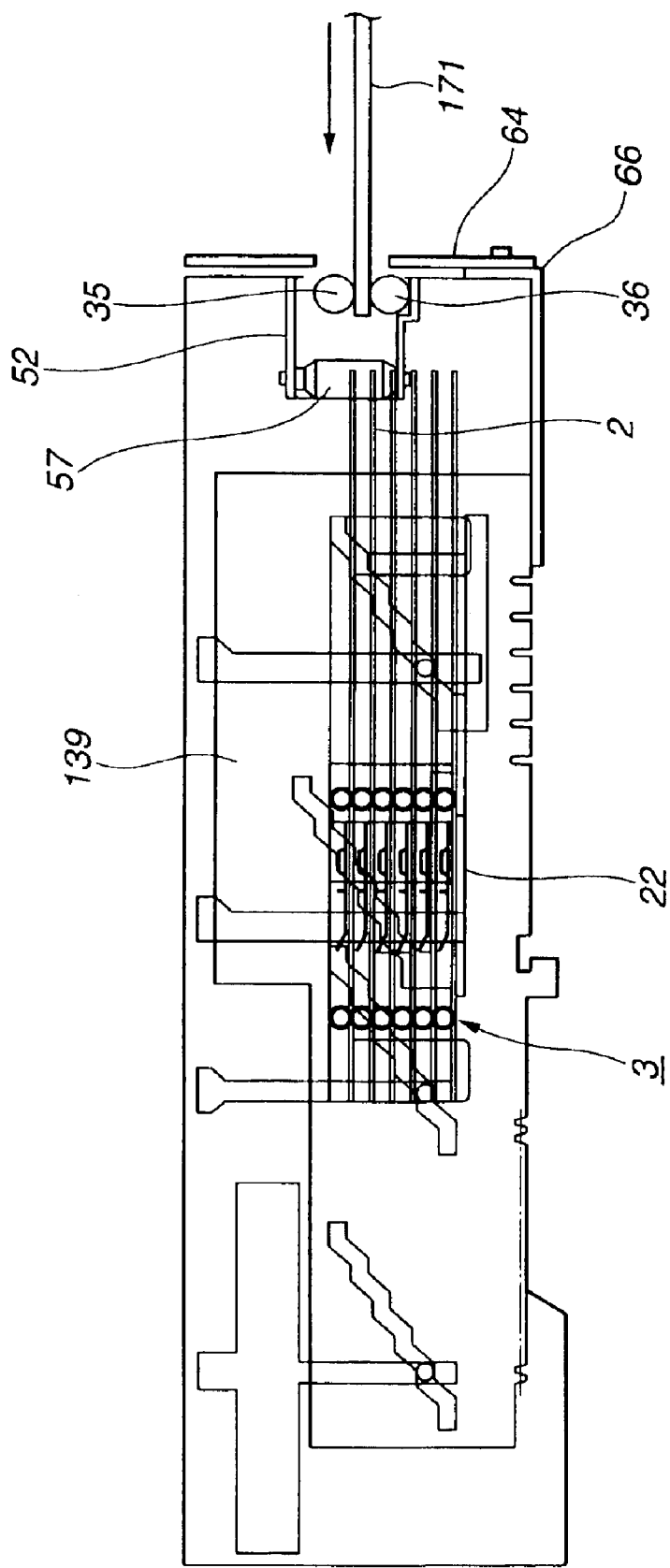
FIG. 32 is a cross sectional side view of the disk player when inserting the CD.

As a result, the above movement opens the shutter 64. As described above, the second uppermost tray 2 has been disposed at the insertion-ejection height. Therefore, inserting the CD 171 into between the roller 35 and the roller 36 as is seen in FIG. 31(a) causes a sensor (not shown) disposed in the center nearside the shutter 64 to sense the CD 171, to thereby start the conveyer motor 46 for rotation. Rotary force of the conveyer rotor 46 is conveyed to the roller 36 by way of the gears, to thereby mesh the CD 171 into between the roller 35 (which is biased toward the roller 36 by means of the spring 38) and the roller 36, as is seen in FIG. 32. Rotations of the roller 35 and the roller 36 send the CD 171 on the second uppermost tray 2 to such an extent that the CD 171 is just spaced apart from the roller 35 and the roller 36, leaving several millimeters for the CD 171 to go inward. Then, the pair of the longitudinal rollers 57 biased toward center by means of the press-in springs 60 press the CD 171 by the above several millimeters. The CD 171 is retained on the tray 2 by the suppress portions 2f of the pair of the plate springs 2e. Once the CD 171 is spaced apart from the roller 35 and the roller 36, a limit switch (not shown) operates to stop rotation of the conveyer motor 46. Simultaneously with the stop of the conveyer motor 46, the outer slider 140 starts moving forward, returning to the standby position as is seen in FIG. 27(a). Thereby, the pressed portion 70c which was pressed backward can be released from the pressing force. Then, the return spring 69 can operate to close the shutter 64. The above forward movement of the outer slider 140 allows the locked portion 210 of the lock mechanism 204 to return to the location A in the lock groove 212, as is seen in FIG. 26(b).

The pair of the pins 22b disposed at the other heights (namely, lowermost, third lowermost, fourth lowermost, fifth lowermost, sixth lowermost [uppermost]) of the stepwise slit 142 also take the same operations as described above for inserting the CD.

(K) Eject CD (Insertion-Ejection Mode)

Ejecting the CD from the disk receiver 3 requires pressing a number button, for example "2", and an ejection button. Then, the pin 22b moves from the switching position in the insertion-ejection mode in FIG. 26(a) to the standby position in FIG. 27(a), in the same manner as is observed during the insertion of the CD. Then, the CD on the second uppermost tray 2 is set at the insertion-ejection height. Then, the outer slider 140 moves backward in a manner similar to the above described for the insertion mode, to such an extent that the pin 22b comes to the position as is seen in FIG. 27(b). With the backward movement of the outer slider 140, the shutter 64 opens. The operations for ejecting the CD described thus far are completely the same as those for inserting the CD.

Figure 28:
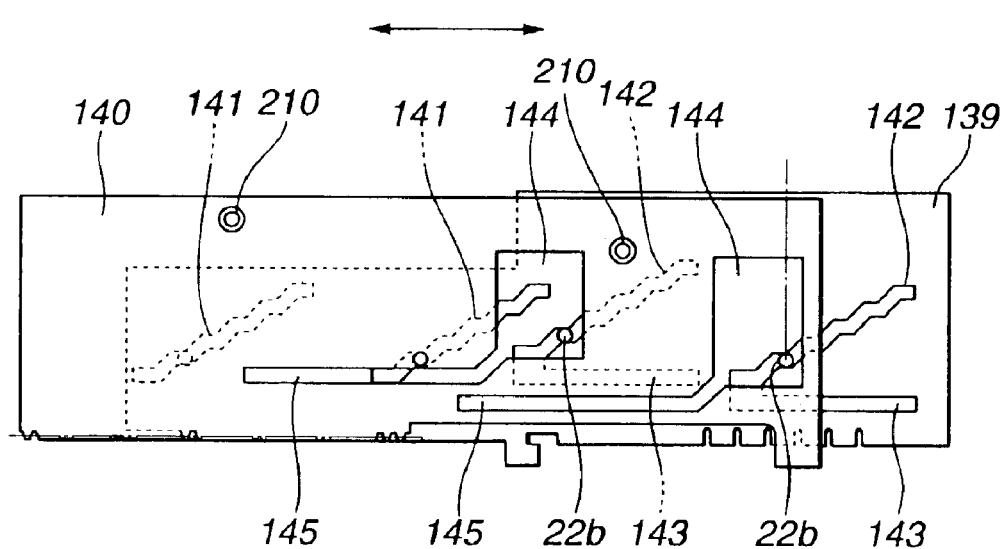
FIG. 28 is an explanatory view showing operation of the operating means when an ejector lever is turned for ejecting the second uppermost CD.
Figure 34:
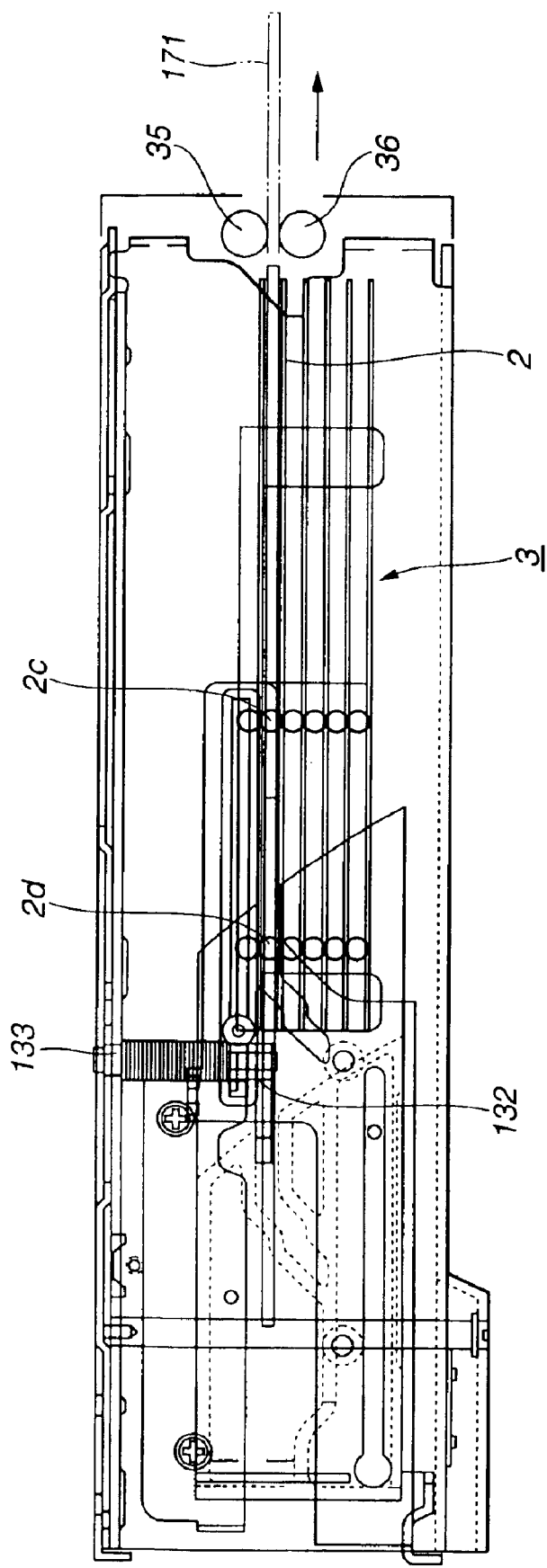
FIG. 34 is cross sectional side view of the ejecting means when the CD is ejected.

Then, as is seen in FIG. 28, the outer slider 140 further moves backward to such an extent that the pin 22b comes to the front side of the insertion mode slit 144. Then, the separating cam 82 moves backward, as is seen in FIG. 33, which is interlocked with the outer slider 140 by way of the protrusion 140b on the back side of the outer slider 140. Thereby, back face of the separating cam 82 presses the back side of the plate 135 backward. Then, the front face of the plate 135 presses the pressed area 132b of the ejector lever 132 for pivotal movement of the ejector lever 132. The pivotal movement of the ejector levers 132 presses out both sides of the second uppermost CD 171. At this point in time, the CD 171 which was pressed with the plate spring 2e is, as the case may be, inclined opposing the biasing force of the plate spring 2e. In this case, if the ejector lever 132 is singular in number, the ejector lever may be removed from the outer periphery of the CD 171, failing to eject the CD 171. Being pairwise in number, the ejector levers 132 will not be removed from the outer periphery of the CD 171. Pressing the ejector button simultaneously turns the conveyer motor 46, causing rotations of the roller 35 and the roller 36. Thus, the ejected CD 171 can be interposed between the roller 35 and the roller 36, as is seen in FIG. 34, and then ejected. A limit switch (not shown) can help prevent the CD 171 from dropping after the ejection. More specifically, when the limit switch (not shown) senses that back side of the CD 171 is partly interposed between the roller 35 and the roller 36, the conveyer motor 46 stops rotation. After a sensor (not shown) senses that the CD 171 has been ejected, the outer slider 140 moves forward such that the pin 22b returns from the position in FIG. 28 to the standby position in FIG. 27(a).

Thereafter, a backward force which was applied from the separating cam 82 to the plate 135 is released. With this, the biasing force of the return spring 134 pivots the ejector lever 132 to its original position, as is indicated by an actual line in FIG. 33(a). Then, the shutter 64 closes in the same manner as is observed after insertion of the CD.

[78]
The pair of the pins 22b disposed at the other heights (namely, lowermost, third lowermost, fourth lowermost, fifth lowermost, sixth lowermost [uppermost]) of the stepwise slit 142 also take the same operations as described above for ejecting the CD.

(L) Reproduce CD Then, as is seen in FIG. 28, the outer slider 140 further moves backward to such an extent that the pin 22b comes to the front side of the insertion-ejection mode slit 144. Then, the separating cam 82 moves backward, as is seen in FIG. 33, which is interlocked with the outer slider 140 by way of the protrusion 140b on the back side of the outer slider 140. Thereby, back face of the separating cam 82 presses the back side of the plate 135 backward. Then, the front face of the plate 135 presses the pressed area 132b of the ejector lever 132 for pivotal movement of the ejector lever 132. The pivotal movement of the ejector levers 132 presses out both sides of the second uppermost CD 171. At this point in time, the CD 171 which was pressed with the plate spring 2e is, as the case may be, inclined opposing the biasing force of the plate spring 2e. In this case, if the ejector lever 132 is singular in number, the ejector lever may be removed from the outer periphery of the CD 171, failing to eject the CD 171. Being pairwise in number, the ejector levers 132 will not be removed from the outer periphery of the CD 171. Pressing the ejector button simultaneously turns the conveyer motor 46, causing rotations of the roller 35 and the roller 36. Thus, the ejected CD 171 can be interposed between the roller 35 and the roller 36, as is seen in FIG. 34, and then ejected. A limit switch (not shown) can help prevent the CD 171 from dropping after the ejection. More specifically, when the limit switch (not shown) senses that back side of the CD 171 is partly interposed between the roller 35 and the roller 36, the conveyer motor 46 stops rotation. After a sensor (not shown) senses that the CD 171 has been ejected, the outer slider 140 moves forward such that the pin 22b returns from the position in FIG. 28 to the standby position in FIG. 27(a).

The position of the pin 22b in FIG. 29(a) relative to the outer slider 140 is not only the mode switching position, but also a CD selecting position for selecting the CD only by changing the height of the pickup lift bench 10. In other words, moving backward only the inner slider 139 from the position in FIG. 29(a) allows the pair of the pins 22b to appear to make relative forward movement in the floor slit 143. Actually, the pair of the pins 22, however, are maintained in the lowermost position of the vertical slits 25. Therefore, the disk lift base 22 remains immovable from the lowermost reproduction position. On the other hand, the pair of the pins 77 which are hidden behind the outer slider 140 may appear to move upward relatively along the stepwise slit 141. Actually, the pins 77, however, move upward stepwise in the vertical slits 78. In other words, moving the inner slider 139 backward as to dispose the pair of the pins 22b in positions which are designated by No. 1 to No. 6 for the floor slit 143 causes upward and/or downward movement of the pair of the pins 77 to height No. 1 to height No. 6 which are designated vertically, thereby allowing reproduction of the CD applicable to the height No. Shown in FIG. 29(a) is a state for reproducing the sixth CD, while shown in FIG. 29(b) is a state for reproducing the first CD.

Herein, selected is the second CD as described above. Therefore, as is seen in FIG. 30(a), the pair of the pins 77 move upward to the second uppermost position. The operations described hereinabove allows the CD to be in state for reproduction. Subsequent operations apply to any number of the CD (in other words, whatever numbered CD is selected). Moving the outer slider 140 and driving the conveyer motor 46 operate the CD.

Figure 38:
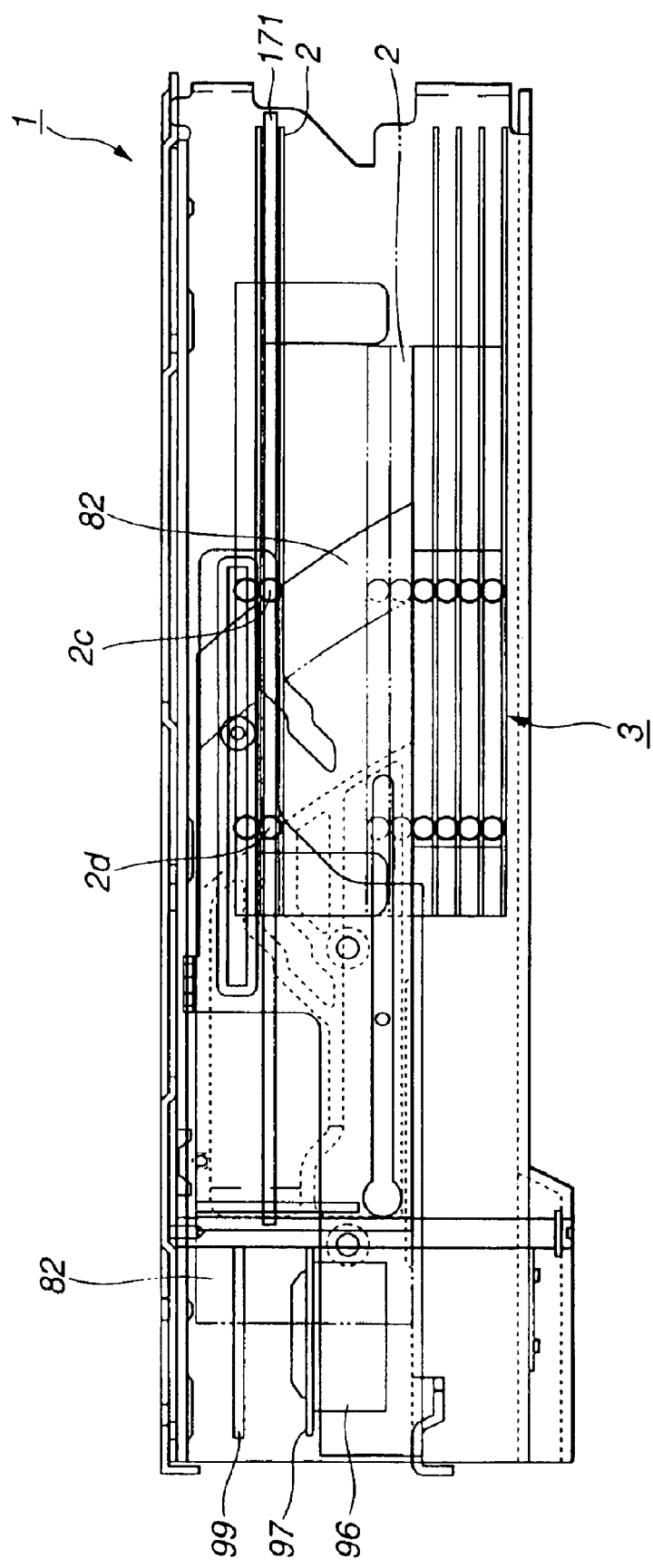
FIG. 38 is a side view showing a state that the trays are separated into two groups.
Figure 39:
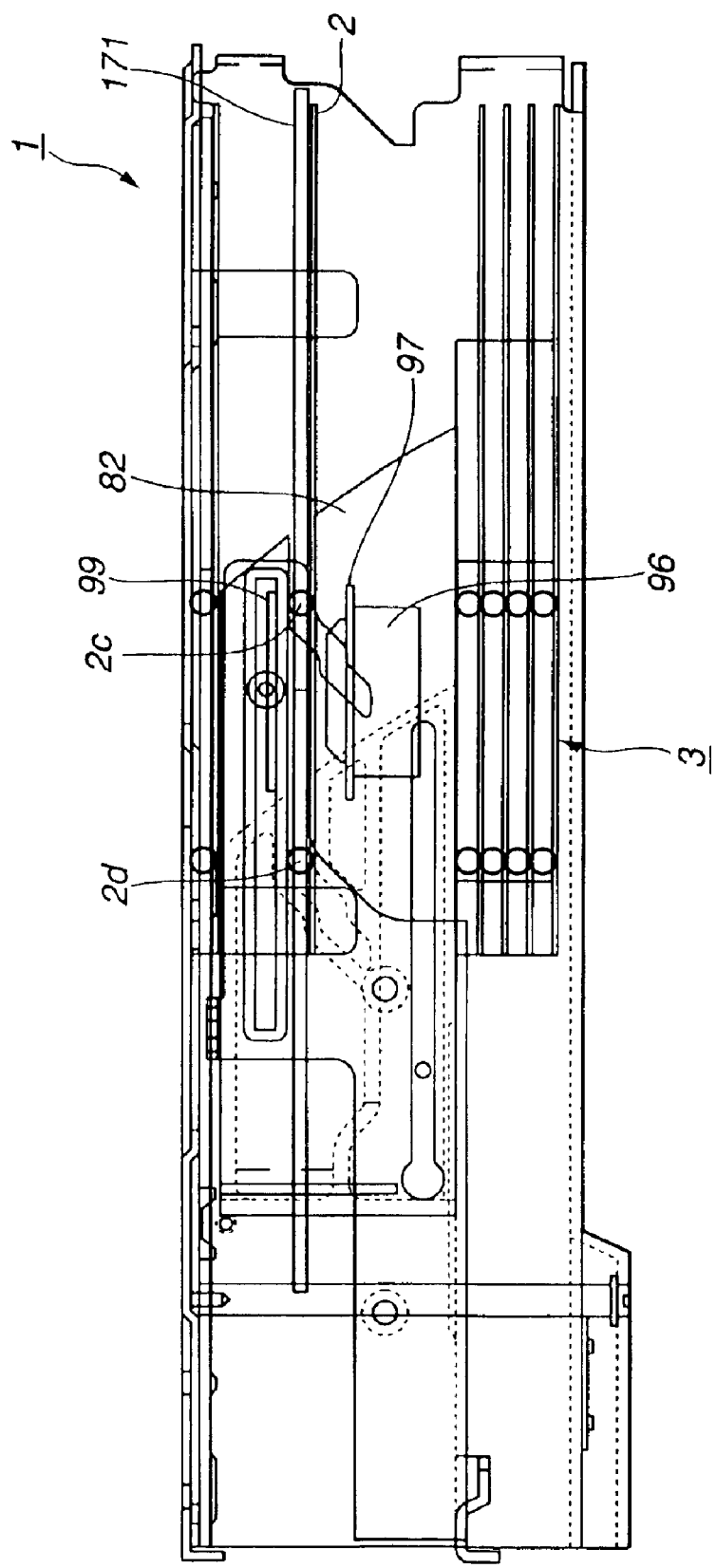
FIG. 39 is a side view showing a state that the trays are separated into three groups.

Hereinafter described is operation after the standby state as is seen in FIG. 30(a) where the second CD to be reproduced is selected. Shown in FIG. 30(a) is the standby state in which the pin 22b occupies a position D on the outer slider 140 in FIG. 30(b). In the standby state, the separating cam 82 is disposed in a position in FIG. 37. Then, the outer slider 140 moves forward to such an extent that the pin 22b comes to a position E as a first step. Herein, the separating cam 82 defines a lower head end which is formed on the back section of the separating cam 82, and a lower head end which is formed on the front section of the separating cam 82. Then in the first step, the separating cam 82 moves forward in such a manner that the lower head end on the back section of the separating cam 82 enters between the short pin 2d (of the second uppermost tray 2) and the short pin 2d (of the third uppermost tray 2) as is seen in FIG. 35(a) and FIG. 36(a), and that the lower head end on the front section of the separating cam 82 enters between the long pin 2c (of the second uppermost tray 2) and the long pin 2c (of the third uppermost tray 2). Hereinafter, operation of the long pin 2c is to be omitted since it is substantially the same as that of the short pin 2d. Then, when the pin 22b comes to a position F as a second step, the short pin 2d (of the second uppermost tray 2) is disposed on the upper mating portion 82j after sliding on the first separating controller 82c1. In this case, an upper head end of the separating cam 82 enters between the short pin 2d (of the first uppermost tray 2) and the short pin 2d (of the second uppermost tray 2), to thereby bring about a state in FIG. 38. Then, when the pin 22b comes to a position G as a third step, the short pin 2d (of the uppermost tray 2) is disposed on the upper face 82*f* after sliding on the second separating controller 82*c*2. With the pin 22*b* disposed in the position G as the third step, there are defined spaces above and below the second uppermost selected tray 2, as is seen in FIG. 39. In addition, movement of the right separating cam 82 in FIG. 7 allows the slide portion 174*e* (of the lock member 174 which is biased by the spring 176) in FIG. 24 to slide on the taper face 82*u*. As a result, the slide portion 174*e* mates in the dent portion 82*t*, as is seen in FIG. 36(*b*). Thus, the lock portion 174*b* is removed from the engagement portion 13*b* of the lower arm 13, to thereby unlock the sandwiching means 14.

Figure 44:
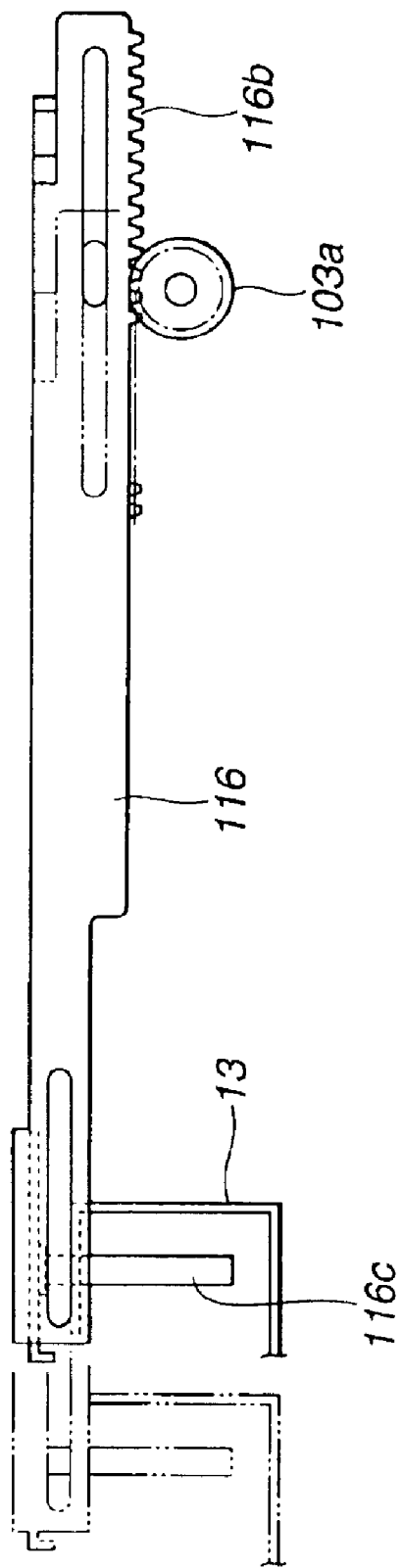
FIG. 44 is an explanatory operation view showing a state that the rotary force is supplied to the sandwiching means.

Once a sensor (not shown) senses that the pin 22*b* comes up to the position G in FIG. 30(*b*), the conveyer motor 46 starts rotation. As described above, when the mode was switched to the reproduction mode, the pair of the pins 22*b* entered the floor slits 143, thereby pressing downward the lever 113 of the rotary force supplying means 17. Therefore, the lever 113 makes a counterclockwise rotation around the pin 114 from a state shown in FIG. 43(*b*). Thus, the plate 105 moves upward, to thereby turn the lever 110 clockwise around the shaft 109. Thereby, as is and also with the gear 104. Thereby, rotation of the conveyer motor 46 is transmitted to the slide bar 116 (formed with the rack 116*b*), by way of the drive shaft 30 and the gear row 103, to thereby move backward the slide bar 116 as is seen in FIG. 44. With this, the engagement pin 116*c* (of the slide bar 116) mating with the long hole 13*a* with play allows the sandwiching means 14 to pivotally move forward. Thereafter, when the positioning pin 119 moves past the position c (inflection point) as is seen in FIG. 22(*a*), biasing force of the toggle spring 120 is applied in the opposite direction, to thereby turn the positioning pin 119 to the position a, as is seen in FIG. 22(*b*). Then, as is seen in FIG. 39, the upper arm 12 and the chuck plate 99 are inserted above the selected CD 171, while the lower arm 13 and the turn table 97 are inserted below the selected CD 171. This operation can be described in plan view, as is seen in FIG. 45 to FIG. 46. A limit switch (not shown) sensing the rotation of the sandwiching means 14 stops rotation of the conveyer motor 46.

Figure 40:
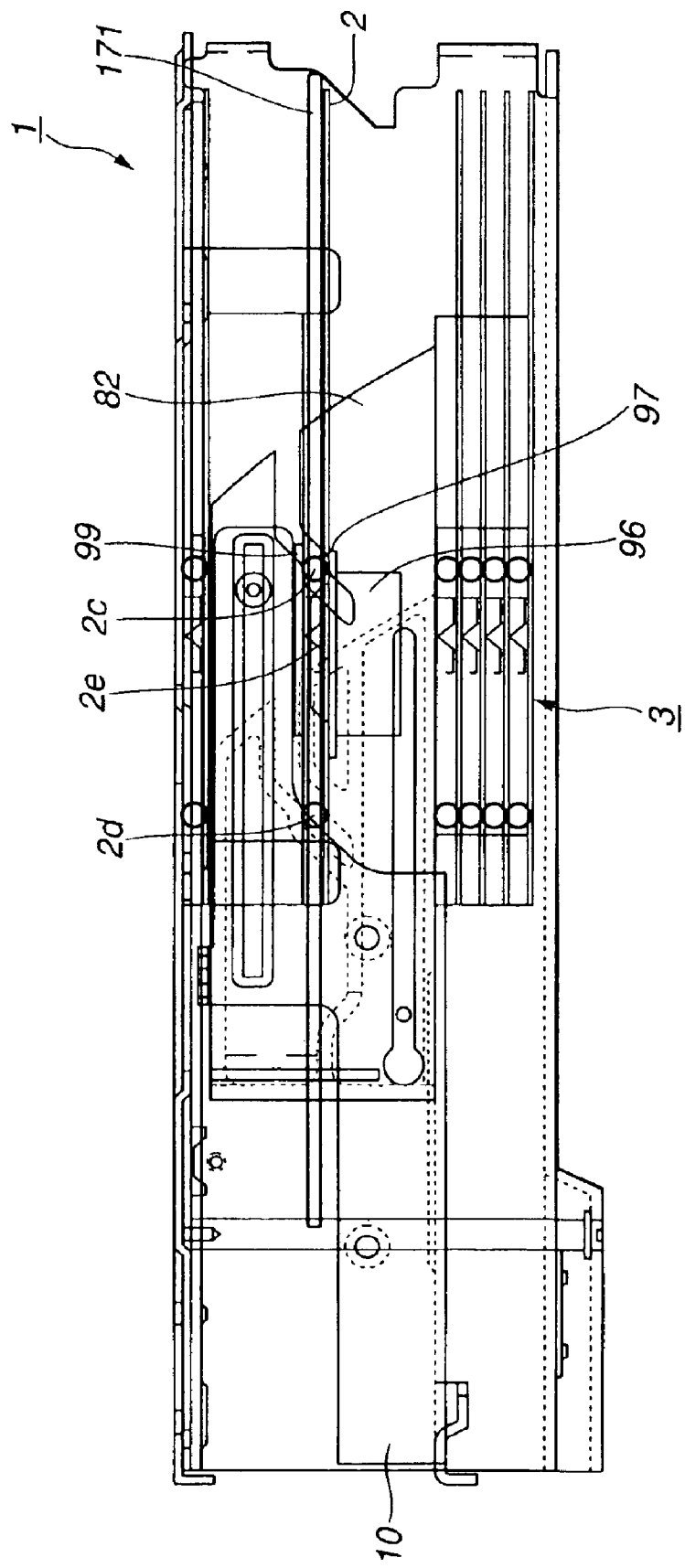
FIG. 40 is a side view showing that after the trays are separated into three groups the selected tray only is lowered, and thereafter is put on a turn table to be sandwiched with the sandwiching means.

As a fourth step, the outer slider 140 moves forward such that the pin 22*b* comes up to a position H, as is seen in FIG. 30(*b*). Then, the short pin 2*d* of the selected tray 2 drops in the middle mating portion 82*k* such that the selected tray 2 and the selected CD are lowered. Thereby, the selected CD 171 can be disposed on the turn table 97, as is seen in FIG. 40. Substantially simultaneously with the drop of the selected tray 2, the outer slider 140 together with the separating cam 82 moves forward, to thereby operate the regulating means 18. Then, operation of the hold spring 89 moves downward the upper arm 12 of the sandwiching means 14, to thereby dispose the selected CD 171 between the turn table 97 and the chuck plate 99. Sandwiching operation is more specifically described as follows. When the pin 22*b* is in the position G and the sandwiching means 14 occupies the standby position B, the guide pin 12*a* is disposed at the horizontal portion 125*a* of the guide hole 125, as is seen in FIG. 47. When the sandwiching means 14 occupies the reproduction position A, the guide pin 12*a* moves to the vertical portion 125*b* of the guide hole 125, as is seen in FIG. 48(*a*). As is seen in FIG. 35(*b*), however, the pin 127*a* cannot escape in the relief section of the cam groove 82*r*. Therefore, the back side of the constraint lever 127 prevents the guide pin 22*b* from moving downward. Thereafter, when the pin 22*b* moves to the position H, the separating cam 82 also moves forward. Thereby, the pin 127*a* can move toward the relief section of the cam groove 82*r*, as is seen in FIG. 35(*b*). Thus, as is seen in FIG. 48(*b*), the back side of the constraint lever 127 is lowered when the pin 127*a* of the constraint lever 127 biased by the spring 128 moves upward toward the relief section of the cam groove 82*r* of the separating cam 82. With this, the upper arm 12 which was biased by the hold spring 89 can lowered, as is seen in FIG. 49, to thereby sandwich the selected CD 171.

Inserting the support 92 standing on the base plate 1*e* into the hollow shaft 86 which is a pivotal center of the sandwiching means 14 accurately positions the pivotal center of the sandwiching means 14 on the base plate 1*e*. Moreover, the toggle spring 120 which keeps pressing the positioning pin 119 to the pickup lift base 10 can accurately position the turn table 97 and the chuck plate 99 circumferentially on the track. On the other hand, the guide support 23 guiding the tray 2 for carrying the CD 171 stands on the base plate 1*e*, like the support 92, to thereby accurately position the CD 171 on the base plate 1*e*. Moreover, as is seen in FIG. 16, the CD 171 can be accurately positioned relative to the chassis 1 by means of the positioning rod 61*a* (with the positioning rod 61*b*), the positioning rod 62*a* (with the positioning rod 62*b*), the positioning rod 172, the positioning rod 173 (for positioning the CD 171 at four circumferential points), and the pair of the longitudinal rollers 57. In addition, the CD positioner 13*c* formed at the raised section of the lower arm 13 as is seen in FIG. 21 positions the CD 171 relative to the lower arm 13, namely, relative to the turn table 97. Thereby, when the selected CD is lowered, upper section of the cone frustum 97*a* of the turn table 97 can be assuredly inserted into the hole of the CD 171. Thereby, the CD 171 can be assuredly fitted to the turn table 97. In sum, the to-be-reproduced CD, the turn table 97, and the chuck plate 99 can be centered accurately, to thereby sandwich the CD 171 assuredly.

Figure 41:
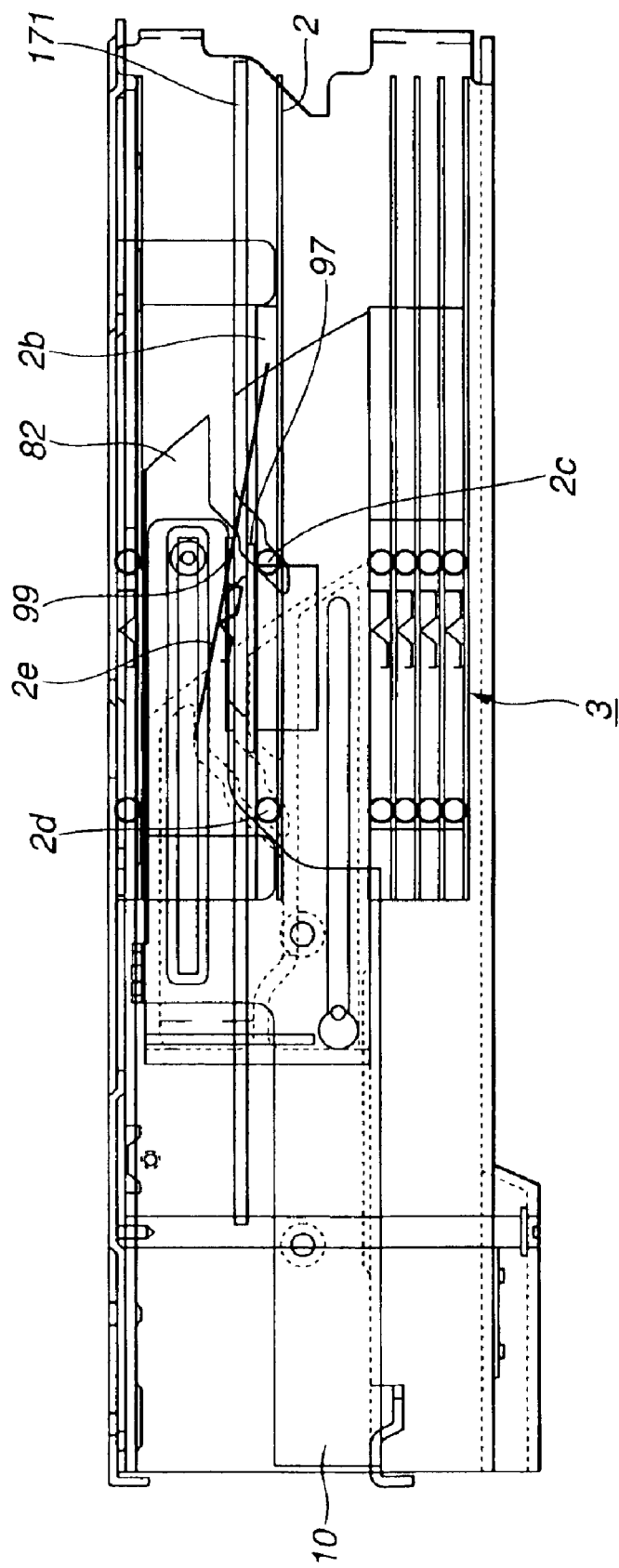
FIG. 41 is a side view showing that after the selected CD is sandwiched with the sandwiching means the selected tray only is further lowered to be spaced apart from the selected CD.
Figure 42:
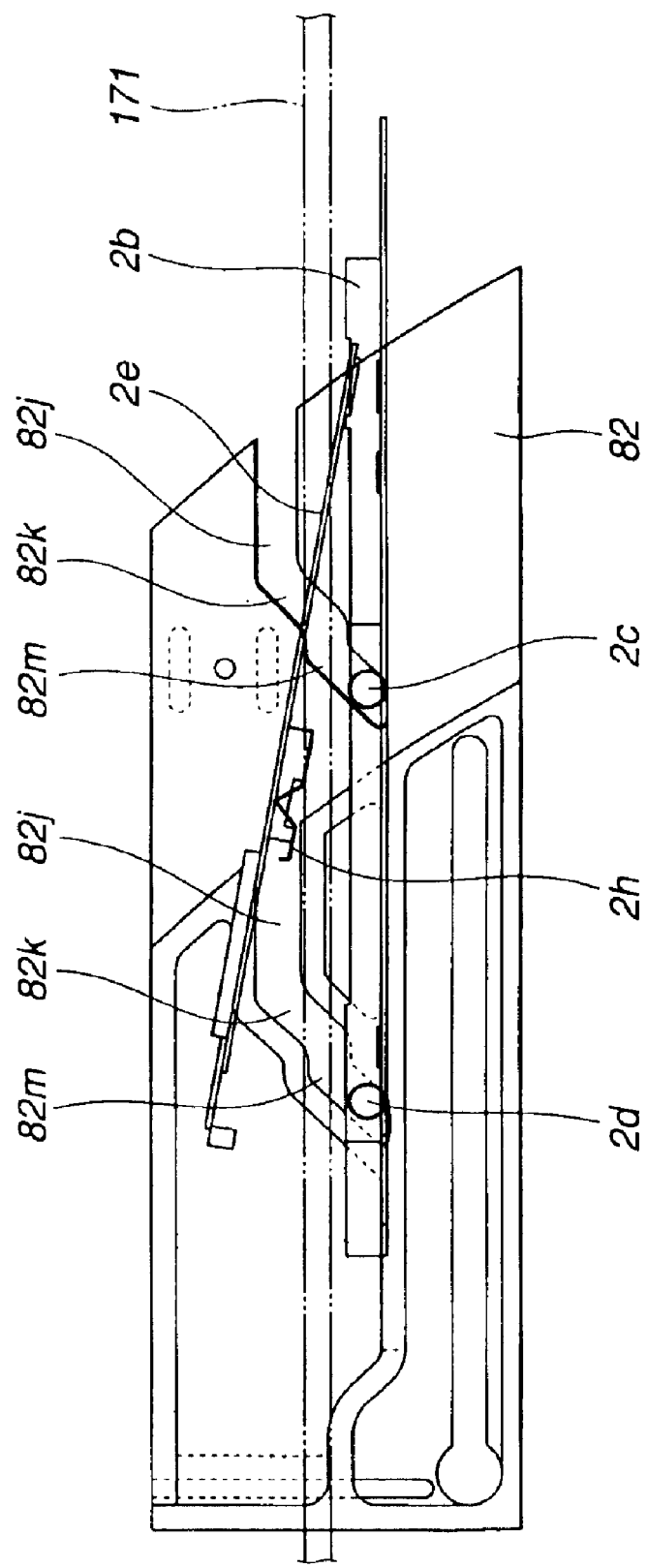
FIG. 42 is an explanatory view showing a state that the plate spring of the selected tray is lifted in a period of reproduction, thereby releasing the selected CD.

As a fifth step (final step), the outer slider 140 moves forward to such an extent that the pin 22*b* comes to a position I, as is seen in FIG. 30(*b*). Then, as is seen in FIG. 35(*a*) and FIG. 36(*a*), the short pin 2*d* of the selected tray 2 is lowered to the lower mating portion 82*m*. The selected tray 2 which was thus far in contact with the selected CD 171 is lowered and thereby spaced apart from the selected CD 171, as is seen in FIG. 41. Simultaneously with this, the receiving portion 2*h* (of the plate spring 2*e*) which kept pressing the selected CD 171 is pressed upward by a lower face the upper mating portion 82*j* on the back side of the separating cam 82, to thereby release the selected CD 171. At this point in time, the trays 2 below the selected tray 2 are pressed by the lower face 82*h* of the separating cam 82, while the trays 2 above the selected tray 2 are biased downward by the coil spring 24. Thereby, the trays 2 can be free from any vibration which may be caused by vehicular vibration.

From the first step to the fifth step, the locked portion 210 of the lock mechanism 204 moves from the location C in FIG. 26(*b*) toward the other end of the unlock groove 213. At the fifth step, the locked portion 210 of the lock mechanism 204 moves up to a location D at the other end of the unlock groove 213 to stop there.

After the selected CD is sandwiched by the sandwiching means 14 as described above, reproduction of the CD starts in a state that the sandwiching means 14 is kept in the position A, as is seen in FIG. 46. At first, rotation of the spindle motor 96 turns the CD by way of the turn table 97. Then, rotation of the scan motor 165 of the pickup unit 16 is transmitted to the screw shaft 164, to thereby move the optical pickup 162 along the screw shaft 164 from radial inside toward radial outside of the CD. With this, the CD can be reproduced. During the reproduction of the CD, the sandwiching means 14 is disposed in the position A, as is seen in FIG. 46. Thus, unlike in FIG. 45, the sandwiching means 14 in FIG. 46 is spaced apart from the inner wall K of the case 177, causing a floatable state. With this, the CD can be reproduced in a state free from any direct vibration from the travelling vehicle, effecting a comfortable reproduction.

Figure 37:
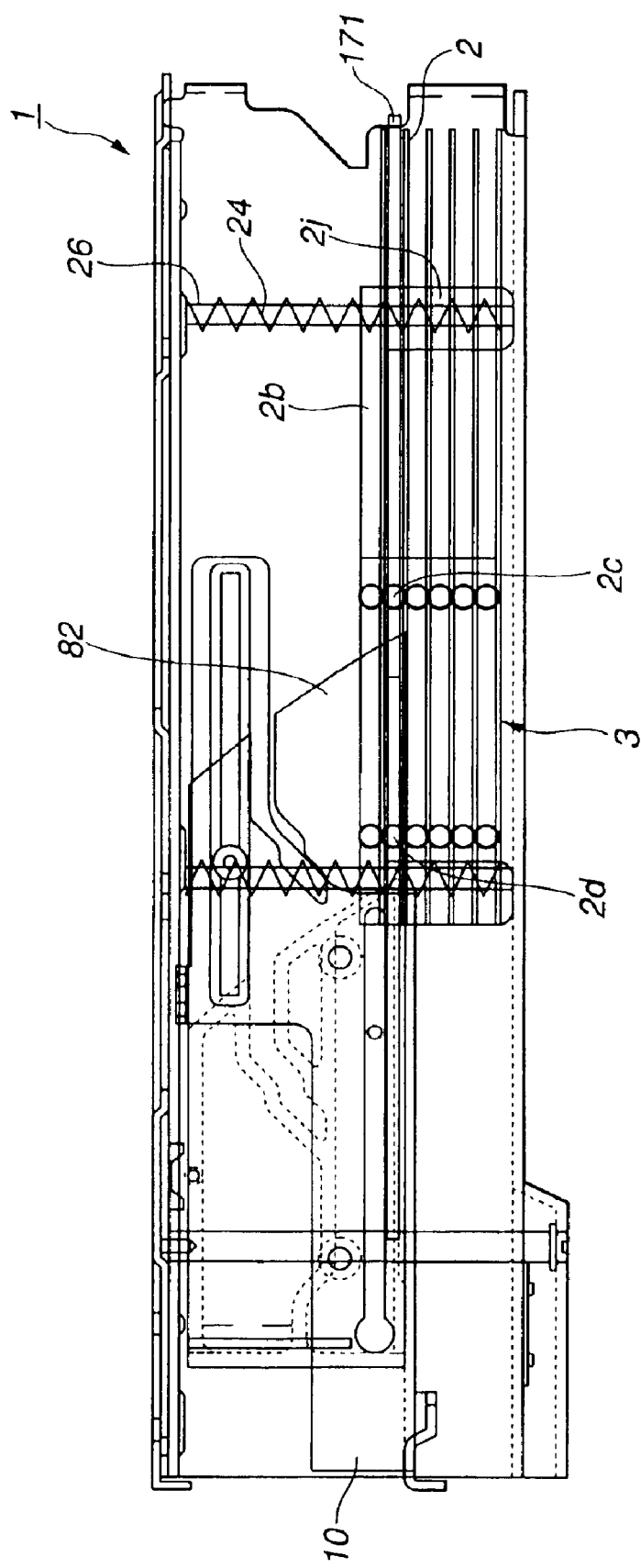
FIG. 37 is a side view showing a state that the separating cam starts separating the trays.

After completion of reproducing the CD, the screw shaft 164 makes a reverse rotation such that the optical pickup 162 can return to its original position. Then, the scan motor 165 stops rotation, and the spindle motor 96 stops rotation. Thereafter, the outer slider 140 moves backward, and the separating cam 82 also moves backward, namely, in steps opposite to the steps described above. Then, the pin 127a returns from the position H to the position G, as is seen in FIG. 35(b). Then, the pin 127a of the constraint lever 127 which was disposed in the position as is seen in FIG. 48(b) moves downward from the relief section of the cam groove 82r of the separating cam 82 as is seen in FIG. 48(a), to thereby lift the back side of the constraint lever 127. With this, the guide pin 12a protruding outward from the sandwiching means 14 moves upward along the vertical portion 125b of the guide hole 125, allowing the sandwiching means 14 to be rotatable. Thereafter, a sensor (not shown) senses the upward movement of the guide pin 12a, thus turning the conveyer motor 46 in a direction opposite to the direction described above for turning the sandwiching means 14 backward. Then, the positioning pin 119 which occupied the position b in FIG. 22(b) moves past the position c (inflection point), to thereby allow the biasing force of the toggle spring 120 to act in the opposite direction. Thus, the positioning pin 119 moves to the position b, as is seen in FIG. 22(a). With this, the sandwiching means 14 returns to the standby position B. A limit switch (not shown) sensing rotation of the sandwiching means 14 stops rotation of the conveyer motor 46. Even in the standby position B, the sandwiching means 14 can keep biased backward by means of the toggle spring 120. Thus, the sandwiching means 14 can be kept free from any influence by vehicle vibration. Thereafter, movement of the separating cam 82 causes the lock member 174 to ride on the taper face 82u, to thereby move the lock member 174 opposing the biasing force of the spring 176. Thus, the lock portion 174b abuts on the engagement portion 13b, to thereby lock the sandwiching means 14 non-pivotable. When the outer slider 140 moves backward such that the pin 22b returns to the standby position D as is seen in FIG. 30(b), the separating cam 28 also moves backward such that the first tray 2 to the third tray 2 are lowered to bring about the state as is seen in FIG. 37 where the six trays 2 are not separated. With this, the sandwiching means 14 protrudes leftward from the chassis 1 to abut on the inner wall K of the case 177, as is seen in FIG. 45. Thus, the chassis 1 is not in the floatable state, and is therefore, subjected to vibration from the vehicle. Even in this case, however, no trouble is caused since the CD is not in the state of reproduction.

Reproducing the CD other than the second uppermost CD takes the following operations: From the state shown in FIG. 30(a), move the inner slider 140 forward or backward such that the pin 22b moves relatively to the position denoted by any one of 1, 3, 4, 5, and 6. Thereafter, move the outer slider 140 in such a manner that the position D to position I can sequentially mate with the pin 22a, as is seen in FIG. 30(b). With this, operations same as described above can be repeated.

In case the selected CD to be reproduced occupies the insertion-ejection height in FIG. 16, positioning by means of the positioning rod 61a, the positioning rod 61b, the positioning rod 62a, and the positioning rod 62b cannot be effected. In this case, however, the pair of the longitudinal rollers 57 can replace the positioning rod 61a, the positioning rod 61b, the positioning rod 62a, and the positioning rod 62b. At both ends of the longitudinal roller 57, there are provided the taper faces 57a, as is seen in FIG. 17. Thus, the CD can be free from interference with the longitudinal rollers 57 even when each of the CDs moves upward and downward before and after the reproduction.

The mode for carrying out the invention has been so exemplified that the disk recording and/or reproducing apparatus is applied to the sound reproducing disk player. The mode for carrying out the invention is, however, also applicable to a sound recording apparatus; or a sound recording and reproducing apparatus. Moreover, not limited to the sound, the mode for carrying out the invention is applicable to a video recording and/or reproducing apparatus. Furthermore, it has been exemplified that the trays overlap vertically. However, the trays can overlap horizontally. Still furthermore, the disk used is 12 cm in dimension. However, the disk can be in other dimensions such as 8 cm.

Moreover, the mode for carrying out the invention exemplifies that the trays constituting the disk receiver are six in number. However, the trays can be less than or equal to five in number, or more than or equal to seven in number. Moreover, the mode for carrying out the invention exemplifies that one piece of tray 2 is used for the disk carrying means, as is seen in FIG. 8(a) and FIG. 9. However, the disk carrying means can be such that two-dot lines in FIG. 8(a) and FIG. 9 sever the tray in order to form a pair of carrying pieces which are constituted of only both end sections (of the aluminum plate 2a) for carrying thereon outer periphery of the CD, with the middle section (of the aluminum plate 2a) removed.

INDUSTRIAL APPLICABILITY

Other than the magnetic disk, the present invention is widely applicable to recording and/or reproducing apparatuses such as photomagnetic disk, optical disk, digital versatile (DVD) and the like.

What is claimed is:

1. A disk recording and/or reproducing apparatus comprising:
   a mechanical deck comprising:
   a disk receiver in which a disk carrying means for carrying a disk is stacked, and
   a disk recording and/or reproducing section for recording and/or reproducing the disk received in the disk receiver; and
   an outer case casing the mechanical deck, characterized in that a relaxation mechanism and a lock mechanism are disposed between the mechanical deck and the outer case, the relaxation mechanism preventing vibration from being transmitted mutually between the mechanical deck and the outer case, the lock mechanism locking the mechanical deck to the outer case in such a manner as to oppose a relaxing operation of the relaxation mechanism, wherein the lock mechanism locks the mechanical deck in a disk insertion-election mode, and unlocks the mechanical deck in a mode other than the disk insertion-ejection mode where the mechanical deck is in operation, wherein the lock mechanism includes;
   a locked portion disposed at the mechanical deck,
   a locking portion disposed at the outer case, the locking portion locking the locked portion in the disk insertion-election mode and unlocking the locked portion in the mode other than the disk insertion-ejection mode where the mechanical deck is in operation, and a slider moving the locked portion between a lock position and an unlock position, and wherein the locking portion is formed with;

a lock groove with which the locked portion engages in the disk insertion-election mode, and an unlock groove for disengaging the locked portion in the mode other than the disk insertion-election mode.

2. The disk recording and/or reproducing apparatus as described in claim 1, characterized in that the relaxation mechanism comprises:

a first plate mounted to the outer case, a second plate mounted to the mechanical deck, a damper interposed between the first plate and the second plate, and the second plate, and a spring having a first end engaging with the first plate and a second end engaging with the second plate such that the mechanical deck is in a hanging state relative to the outer case.

3. The disk recording and/or reproducing apparatus as described in claim 1, characterized in that the locked portion is slidably disposed on a side face of the mechanical deck.

* * * * *